(12) United States Patent
Kimura et al.

(10) Patent No.: US 8,619,227 B2
(45) Date of Patent: Dec. 31, 2013

(54) LIQUID CRYSTAL DISPLAY DEVICE

(75) Inventors: Hajime Kimura, Kanagawa (JP); Hideki Uochi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 35 days.

(21) Appl. No.: 13/442,932

(22) Filed: Apr. 10, 2012

(65) Prior Publication Data

US 2012/0194758 A1 Aug. 2, 2012

Related U.S. Application Data

(63) Continuation of application No. 13/015,991, filed on Jan. 28, 2011, now Pat. No. 8,164,729, which is a continuation of application No. 12/848,247, filed on Aug. 2, 2010, now Pat. No. 7,880,848, which is a continuation of application No. 11/566,005, filed on Dec. 1, 2006, now Pat. No. 7,773,182.

(30) Foreign Application Priority Data

Dec. 5, 2005 (JP) ................................. 2005-350147

(51) Int. Cl.
*G02F 1/1343* (2006.01)
*G02F 1/1335* (2006.01)

(52) U.S. Cl.
USPC ........................................ 349/141; 349/114

(58) Field of Classification Search
None
See application file for complete search history.

(56) References Cited

U.S. PATENT DOCUMENTS

| 5,870,160 | A | 2/1999 | Yanagawa et al. |
| 6,034,757 | A | 3/2000 | Yanagawa et al. |
| 6,108,066 | A | 8/2000 | Yanagawa et al. |
| 6,469,765 | B1 | 10/2002 | Matsuyama et al. |
| 6,590,627 | B2 | 7/2003 | Tomioka et al. |
| 6,747,722 | B2 | 6/2004 | Ono et al. |
| 6,914,656 | B2 | 7/2005 | Sakamoto et al. |
| 6,924,876 | B2 | 8/2005 | Kubo et al. |
| 6,950,158 | B2 | 9/2005 | Chang |
| 6,958,799 | B2 | 10/2005 | Tomioka et al. |

(Continued)

FOREIGN PATENT DOCUMENTS

| EP | 1 793 266 A1 | 6/2007 |
| EP | 2 270 583 A2 | 1/2011 |

(Continued)

OTHER PUBLICATIONS

Rubio Lu et al., "4.4: Transflective Liquid Crystal Display Using In-plane Switching Effect", IDRC 06, Sep. 2006, pp. 39-42.

(Continued)

*Primary Examiner* — Tina Wong
(74) *Attorney, Agent, or Firm* — Fish & Richardson P.C.

(57) ABSTRACT

It is an object of the present invention to apply a sufficient electrical field to a liquid crystal material in a horizontal electrical field liquid crystal display device typified by an FFS type. In a horizontal electrical field liquid crystal display, an electrical field is applied to a liquid crystal material right above a common electrode and a pixel electrode using plural pairs of electrodes rather than one pair of electrodes. One pair of electrodes includes a comb-shaped common electrode and a comb-shaped pixel electrode. Another pair of electrodes includes a common electrode provided in a pixel portion and the comb-shaped pixel electrode.

43 Claims, 112 Drawing Sheets

(56) References Cited

U.S. PATENT DOCUMENTS

| | | | |
|---|---|---|---|
| 6,970,222 B2 | 11/2005 | Nakayoshi et al. | |
| 7,016,002 B2 | 3/2006 | Lee et al. | |
| 7,084,943 B2 | 8/2006 | Kubo et al. | |
| 7,088,409 B2 | 8/2006 | Itou et al. | |
| 7,158,196 B2 | 1/2007 | Song | |
| 7,248,324 B2 | 7/2007 | Ono et al. | |
| 7,251,005 B2 | 7/2007 | Ono et al. | |
| 7,307,673 B2 | 12/2007 | Nakayoshi et al. | |
| 7,362,400 B2 | 4/2008 | Itou et al. | |
| 7,403,255 B2 | 7/2008 | Ono et al. | |
| 7,423,701 B2 | 9/2008 | Nakayoshi et al. | |
| 7,605,876 B2 | 10/2009 | Nakayoshi et al. | |
| 7,630,046 B2 | 12/2009 | Ono et al. | |
| 7,696,529 B2 | 4/2010 | Choo | |
| 7,773,182 B2 | 8/2010 | Kimura et al. | |
| 7,872,696 B2 | 1/2011 | Nakayoshi et al. | |
| 7,880,848 B2 | 2/2011 | Kimura et al. | |
| 8,164,729 B2 | 4/2012 | Kimura et al. | |
| 2003/0103181 A1 | 6/2003 | Imayama et al. | |
| 2003/0218664 A1 | 11/2003 | Sakamoto et al. | |
| 2004/0066481 A1* | 4/2004 | Hong et al. | 349/141 |
| 2004/0189922 A1 | 9/2004 | Ono et al. | |
| 2005/0001959 A1 | 1/2005 | Chang | |
| 2005/0030451 A1 | 2/2005 | Liu | |
| 2005/0105033 A1 | 5/2005 | Itou et al. | |
| 2005/0128389 A1 | 6/2005 | Yang | |
| 2005/0128390 A1 | 6/2005 | Yang | |
| 2005/0140867 A1 | 6/2005 | Choi | |
| 2005/0157231 A1 | 7/2005 | Yang et al. | |
| 2005/0243251 A1 | 11/2005 | Yang et al. | |
| 2005/0253978 A1* | 11/2005 | Chae et al. | 349/43 |
| 2005/0264720 A1 | 12/2005 | Itou et al. | |
| 2005/0264731 A1 | 12/2005 | Itou et al. | |
| 2006/0001812 A1* | 1/2006 | Lee et al. | 349/141 |
| 2006/0092356 A1 | 5/2006 | Morimoto et al. | |
| 2006/0092363 A1 | 5/2006 | Hasegawa et al. | |
| 2006/0146250 A1 | 7/2006 | Wu et al. | |
| 2006/0152666 A1 | 7/2006 | Ono et al. | |
| 2006/0164575 A1 | 7/2006 | Su et al. | |
| 2006/0187371 A1 | 8/2006 | Nakayoshi et al. | |
| 2006/0192912 A1 | 8/2006 | Itou et al. | |
| 2006/0215086 A1 | 9/2006 | Kurasawa | |
| 2006/0215087 A1 | 9/2006 | Matsushima et al. | |
| 2006/0267891 A1 | 11/2006 | Nishimura et al. | |
| 2007/0002226 A1 | 1/2007 | Sakamoto et al. | |
| 2007/0040978 A1 | 2/2007 | Nakayoshi et al. | |
| 2007/0153175 A1 | 7/2007 | Chang et al. | |
| 2007/0296901 A1* | 12/2007 | Seo et al. | 349/141 |
| 2008/0180616 A1 | 7/2008 | Igeta et al. | |

FOREIGN PATENT DOCUMENTS

| | | |
|---|---|---|
| JP | 09-105918 A | 4/1997 |
| JP | 2000-047256 A | 2/2000 |
| JP | 2000-352712 A | 12/2000 |
| JP | 2002-258262 A | 9/2002 |
| JP | 2003-140188 A | 5/2003 |
| JP | 2003-149664 A | 5/2003 |
| JP | 2003-195352 A | 7/2003 |
| JP | 2003-344837 A | 12/2003 |
| JP | 2005-055863 A | 3/2005 |
| JP | 2005-106967 A | 4/2005 |
| JP | 2005-338256 A | 12/2005 |
| JP | 2006-126551 A | 5/2006 |
| JP | 2006-126602 A | 5/2006 |
| JP | 2006-184325 A | 7/2006 |
| JP | 2006-243144 A | 9/2006 |
| JP | 2006-276110 A | 10/2006 |
| JP | 2006-276112 A | 10/2006 |
| JP | 2007-004126 A | 1/2007 |
| JP | 4801569 A | 10/2011 |
| JP | 5194071 A | 5/2013 |
| KR | 2001-0111841 A | 12/2001 |
| KR | 2004-0055246 A | 6/2004 |
| KR | 2005-0060568 A | 6/2005 |
| TW | 594310 B | 6/2004 |
| WO | WO 2005/006068 A1 | 1/2005 |

OTHER PUBLICATIONS

Gak Seok Lee et al., "6.3: Design of Wide-Viewing-Angle Transflective IPS LCD", IDRC 06, Sep. 2006, p. 75-77.

Gak Seok Lee et al., "Optical Configurations of Horizontal-Switching Transflective LCDs in Double Cellgap Structure", IDW/AD '05, vol. 1, pp. 111-114.

Norio Aoki, "16.3: Invited Paper: Advanced IPS Technology for Mobile Applications," SID 06 Digest, Jun. 2006, vol. 37, pp. 1087-1090.

Michiaki Sakamoto et al., "L-6: Late-News Paper: Development of the Novel Transflective LCD Module Using Super-Fine-TFT Technology", SID 06 Digest, Jun. 2006, vol. 37, pp. 1669-1672.

Osamu Itou et al., "P-231L: Late-News Poster: A Wide Viewing Angle Transflective IPS LCD Applying New Optical Design," SID 06 Digest, Jun. 2006, vol. 37, pp. 832-835.

European Search Report (Application No. 06024061.1-2205) dated Apr. 18, 2007.

J.H. Song et al.; "Electro-optic Characteristics of Fringe-Field Driven Transflective LCD with Dual Cell Gap"; IDW/AD '05; vol. 1, pp. 103-106; 2005.

S.H. Lee et al., "29.2: 18.1. Ultra-FFS TFT-LCD with Super Image Quality and Fast Response Time," SID '01 Digest, vol. 32, pp. 484-487; 2001.

M.O. Choi et al.; "P-110: A Single Gap Transflective Display using a Fringe-Field Driven Homogeneously Aligned Nematic Liquid Crystal Display"; SID '05 Digest; vol. 36, pp. 719-721; 2005.

Y.H. Yeong et al.; "P-111: Voltage and Rubbing Angle Dependent Behavior of the Single Cell Gap Transflective Fringe Field Switching (FFS) Mode"; SID 05 Digest; 2005; pp. 723-725; vol. 36.

Taiwanese Office Action (TW Patent Application No. 95143775) mailed Nov. 19, 2012 with full English translation.

European Search Report (EP Patent Application No. 10010385.2) dated Jun. 19, 2013, 12 pages.

Korean Office Action (KR Application No. 2013-0089041) dated Oct. 28, 2013, with English translation (11 pages).

* cited by examiner reflective region A

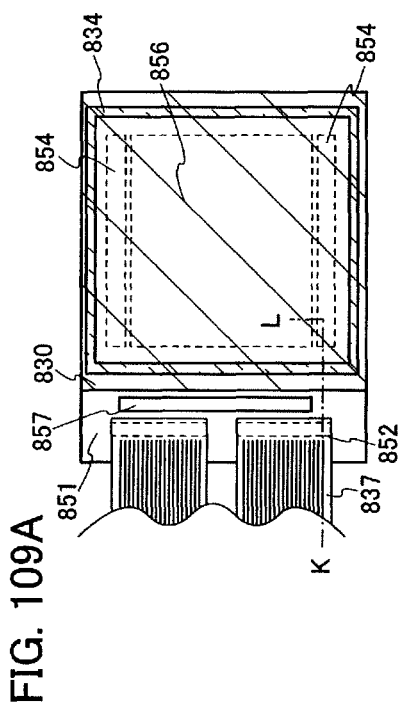
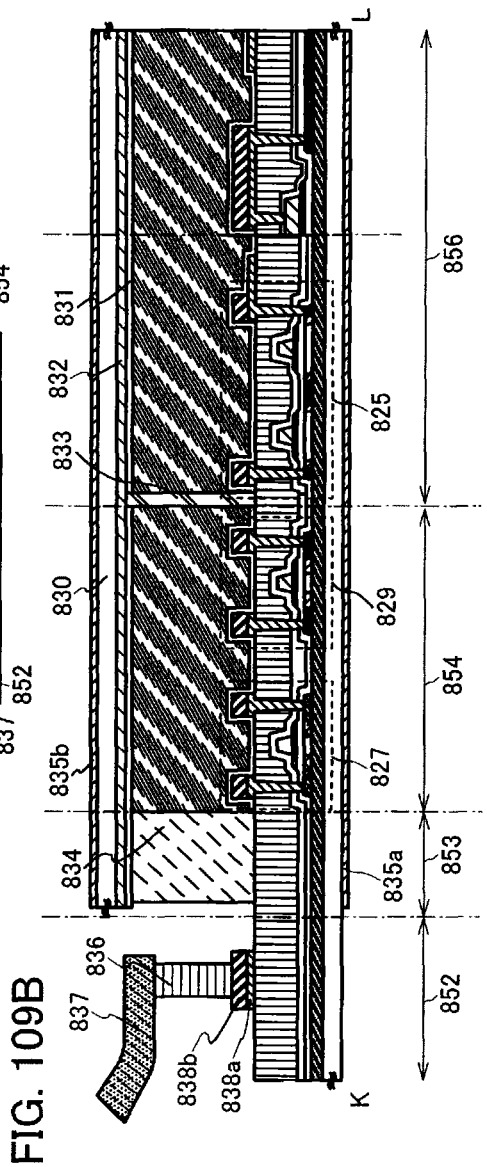
FIG. 109A
FIG. 109B

LIQUID CRYSTAL DISPLAY DEVICE

CROSS-REFERENCE TO RELATED APPLICATIONS

This application is a continuation of U.S. application Ser. No. 13/015,991, filed Jan. 28, 2011, now allowed, which is a continuation of U.S. application Ser. No. 12/848,247, filed Aug. 2, 2010, now U.S. Pat. No. 7,880,848, which is a continuation of U.S. application Ser. No. 11/566,005, filed Dec. 1, 2006, now U.S. Pat. No. 7,773,182, which claims the benefit of a foreign priority application filed in Japan as Serial No. 2005-350147 on Dec. 5, 2005, all of which are incorporated by reference.

BACKGROUND OF THE INVENTION

1. Field of the Invention

The present invention relates to a liquid crystal display device. In particular, the present invention relates to a liquid crystal display device having a wide viewing angle.

2. Description of the Related Art

A display device includes a self-light emitting display device and a light receiving display device. A liquid crystal display device is the most typical light receiving display device. A driving method for liquid crystal in a liquid crystal display device includes a vertical electrical field type in which voltage is applied perpendicularly to a substrate and a horizontal electrical field type in which voltage is applied approximately parallel to the substrate. Each of a vertical electrical field type and a horizontal electrical field type has an advantage and disadvantage. For example, a horizontal electrical field type has characteristics such as a wide viewing angle, high contrast, high gradation display, and the like compared with a vertical electrical field type typified by a TN type, and is used for a monitor or television. These kinds of liquid crystal display devices coexist in the field of liquid crystal, and product development has been made. In addition, each of a liquid crystal material for a horizontal electrical field type and a liquid crystal material for a vertical electrical field type is developed and has different material characteristics according to a direction of applied voltage.

In addition, a horizontal electrical field liquid crystal display device includes an IPS (In-Plane Switching) type and an FFS (Fringe Field Switching) type. In an IPS type, a pixel electrode having a comb-shape or a slit and a common electrode having a comb-shape or a slit are alternately arranged and an electrical field approximately parallel to a substrate is generated between the pixel electrode and the common electrode, whereby a liquid crystal display device is driven (see Patent Document 1). On the other hand, in an FFS type, a pixel electrode having a comb-shape or a slit is placed over a common electrode which having a plane-shape that is formed in a whole pixel portion. An electrical field approximately parallel to a substrate is generated between the pixel electrode and the common electrode, whereby a liquid crystal display device is driven.

It is shown that an FFS liquid crystal display device has high transmittance, a wide viewing angle, low power consumption, and no crosstalk (see Non-Patent Document 1).

[Patent Document 1] Japanese Published Patent Application No. H9-105918

[Non-Patent Document 1] Ultra-FFS TFT-LCD with Super Image Quality and Fast Response Time, 2001 The Society For Information Display pp. 484-487

In a horizontal electrical field type liquid crystal display device which is typified by a conventional horizontal electrical field type liquid crystal display device, an electrical field applied to a liquid crystal material is not sufficient. This is because an electrical field is not well applied to a liquid crystal material which is right above a common electrode and a pixel electrode.

In addition, a wide viewing angle technique using a horizontal electrical field type such as an IPS type or an FFS type is used mostly for television; therefore, the technique is applied only to a transmissive type. However, a reflective type or a semitransmissive type is needed when reducing power consumption or outdoors use is required. However, a reflective or a semitransmissive type is realized by using a vertical electrical field type typified by a TN type.

SUMMARY OF THE INVENTION

Therefore, it is an object of the present invention to provide a structure of a horizontal electrical field type liquid crystal display device, in which a sufficient electrical field is applied to a liquid crystal material.

In addition, it is an object of the present invention to provide a liquid crystal display device with a wide viewing angle and less color-shift, and which can display an image favorably recognized both indoors and outdoors.

In view of the foregoing problems, in the present invention, an electrical field is applied to a liquid crystal material using plural pairs of electrodes rather than one pair of electrodes. The one pair of electrodes includes a comb-shaped common electrode and a comb-shaped pixel electrode. Another pair of electrodes includes a common electrode formed in a pixel portion and a comb-shaped pixel electrode. The common electrode provided in the pixel portion can be provided in a region except the thin film transistor. In addition, the common electrode provided in the pixel portion may be comb-shaped. In such a liquid crystal display device, an electrical field applied to a liquid crystal material can be controlled by using another pair of electrodes, as well as the one pair of electrodes.

A liquid crystal display device of the present invention includes a first region in which display is conducted by light transmission and a second region in which a display is conducted by light reflection. In addition, a liquid crystal layer includes a liquid crystal molecule rotating in a plane parallel to an electrode surface, that is, parallel to a substrate, when an electric potential difference is generated between two electrodes in a liquid crystal element which are provided below the liquid crystal layer.

Note that in the present invention, the phrase "rotation parallel to an electrode surface" means that a parallel rotation which includes a deviation unrecognizable by human eyes. In other words, the phrase "rotation parallel to an electrode surface" means that a rotation which mainly includes a vector component parallel to the electrode surface but also includes a few vector component normal to the electrode surface.

When an electric potential difference is generated between electrodes 803 and 804 provided below a liquid crystal layer 801, a liquid crystal molecule 802 contained in the liquid crystal layer 801 rotates by an effect of a horizontal electrical field. A state shown in FIG. 77A changes into that shown in FIG. 77B or the state shown in FIG. 77B changes into that shown in FIG. 77A, as the liquid crystal molecule 802 rotates. FIGS. 77A and 77B are cross-sectional views. The rotation seen from above is shown by an arrow in FIG. 77C.

In a similar manner, when an electric potential difference is generated between electrodes 9803 and 9805 and between electrodes 9804 and 9805 provided below a liquid crystal layer 9801, a liquid crystal molecule 9802 contained in the liquid crystal layer 9801 rotates by an effect of a horizontal electrical field and a state shown in FIG. 112A changes into that shown in FIG. 112B or the state shown in FIG. 112B changes into that shown in FIG. 112A as the liquid crystal molecule 9802 rotates. FIGS. 112A and 112B show cross-sectional views. The rotation seen from above is shown by an arrow in FIG. 112C.

Note that a positional relationship or the like of the electrodes 803 and 804 is not limited to those shown in FIGS. 77A to 77C.

In a similar manner, a positional relationship or the like of the electrodes 9803, 9804, and 9805 is not limited to those shown in FIGS. 112A to 112C.

In the first region described above, one pair of electrodes provided below a liquid crystal layer includes electrodes provided in different layers. In the first region, two electrodes in a liquid crystal element are provided below the liquid crystal layer and the electrodes are provided in different layers. One of the electrodes serves as a reflector or a reflector is provided so as to overlap with the electrodes, whereby light is reflected. In the second region, two electrodes in a liquid crystal element are formed below the liquid crystal layer. Both of the electrodes are transparent and provided over one layer or over different layers with an insulating layer interposed therebetween.

A specific structure of the present invention is shown below.

One mode of the present invention is a liquid crystal display device, including a first common electrode, an insulating layer provided over the first common electrode, a pixel electrode and a second common electrode provided over the insulating layer, and a liquid crystal material provided over the pixel electrode and the second common electrode, in which tilting of the liquid crystal material is controlled by an electrical field between the pixel electrode and the first common electrode and an electrical field between the pixel electrode and the second common electrode.

Another mode of the present invention is a liquid crystal display device, including an insulating substrate, a thin film transistor formed over the insulating substrate, a first common electrode provided in the same layer as a semiconductor layer of the thin film transistor, an insulating layer provided to cover the first common electrode, a pixel electrode and a second common electrode provided over the insulating layer, and a liquid crystal material provided over the pixel electrode and the second common electrode, in which the pixel electrode is controlled by the thin film transistor, the first common electrode and the second common electrode are electrically connected, and tilting of the liquid crystal material is controlled by an electrical field between the pixel electrode and the first common electrode and an electrical field between the pixel electrode and the second common electrode.

Another mode of the present invention is a liquid crystal display device, including an insulating substrate, a thin film transistor formed over the insulating substrate, a first common electrode provided in the same layer as source and drain electrodes of the thin film transistor, a conductive layer connected to the first common electrode, an insulating layer provided over the first common electrode and the conductive layer, a pixel electrode and a second common electrode provided over the insulating layer, and a liquid crystal material provided over the pixel electrode and the second common electrode, in which tilting of the liquid crystal material is controlled by an electrical field between the pixel electrode and the first common electrode and an electrical field between the pixel electrode and the second common electrode.

Another mode of the present invention is a liquid crystal display device, including an insulating substrate, a thin film transistor formed over the insulating substrate, a first common electrode provided in the same layer as a semiconductor layer of the thin film transistor, a conductive layer connected to the first common electrode, an insulating layer provided over the first common electrode and the conductive layer, a pixel electrode and a second common electrode provided over the insulating layer, and a liquid crystal material provided over the pixel electrode and the second common electrode, in which tilting of the liquid crystal material is controlled by an electrical field between the pixel electrode and the first common electrode and an electrical field between the pixel electrode and the second common electrode.

In a structure of the present invention, the thin film transistor can include a crystalline semiconductor layer.

In a structure of the present invention, a passivation layer provided over the first common electrode and the thin film transistor, a color filter provided over the first common electrode with the passivation layer therebetween, and a black matrix provided over the thin film transistor with the passivation layer therebetween can be further included.

In a structure of the present invention, a passivation layer provided over the first common electrode and the thin film transistor, a color filter provided over the first common electrode and the thin film transistor with the passivation layer therebetween, a counter substrate provided to face the insulating substrate, and a black matrix provided over the thin film transistor can be further included.

In a structure of the present invention, a passivation layer provided over the thin film transistor, a color filter provided over the passivation layer, a first common electrode provided over the color filter, and a black matrix provided over the thin film transistor over the passivation layer can be further included.

Another mode of the present invention is a liquid crystal display device, including an insulating substrate, a gate electrode formed over the insulating substrate, a first common electrode formed in the same layer as the gate electrode, an insulating layer provided to cover the gate electrode and the first common electrode, a semiconductor layer provided over the gate electrode with the insulating layer therebetween, source and drain electrodes formed in the semiconductor layer, a conductive layer provided in the same layer as the source and drain electrodes to be in contact with the first common electrode, a pixel electrode connected to one of the source and drain electrodes, a second common electrode connected to the first common electrode with the conductive layer therebetween, and a liquid crystal material provided over the pixel electrode and the second common electrode, in which tilting of the liquid crystal material is controlled by an electrical field between the pixel electrode and the first common electrode and an electrical field between the pixel electrode and the second common electrode.

One mode of the present invention is a liquid crystal display device, including an insulating substrate, a gate electrode formed over the insulating substrate, a conductive layer formed in the same layer as the gate electrode, a first common electrode provided in contact with the conductive layer, an insulating layer provided to cover the gate electrode and the first common electrode, a semiconductor layer provided over the gate electrode with the insulating layer therebetween; source and drain electrodes formed in the semiconductor layer, a pixel electrode connected to one of the source and drain electrodes, a second common electrode connected to the first common electrode with the conductive layer therebetween, and a liquid crystal material provided over the pixel electrode and the second common electrode, in which tilting of the liquid crystal material is controlled by an electrical field between the pixel electrode and the first common electrode and an electrical field between the pixel electrode and the second common electrode.

In a structure of the present invention, the semiconductor layer can have an amorphous semiconductor layer.

In a structure of the present invention, a passivation layer provided over the first common electrode, a color filter provided over the first common electrode with the passivation layer therebetween, and a black matrix provided over the source and drain electrodes can be further included.

In a structure of the present invention, a passivation layer provided over the first common electrode and the gate electrode; a color filter provided over the source and drain electrodes and over the first common electrode with the passivation layer therebetween, a counter substrate provided to face the insulating substrate, and a black matrix provided over the counter substrate can be further included.

In a structure of the present invention, the pixel electrode can be comb-shaped.

In a structure of the present invention, the first common electrode can be comb-shaped.

In a structure of the present invention, the second common electrode can be comb-shaped.

In a structure of the present invention, the pixel electrode may be formed of a transparent material.

In a structure of the present invention, the first common electrode may be formed of a transparent material.

In a structure of the present invention, the second common electrode may be formed of a transparent material.

According to the present invention, an electrical field can be applied sufficiently to a liquid crystal material using two or more pairs of electrodes. Then, tilting of the liquid crystal material can be controlled by electrical fields generated by two pairs of electrodes, whereby gray-scale display can be conducted.

In addition, according to the present invention, an image with a wide viewing angle and less color-shift due to the angle at which the display screen is watched, and which is favorably recognized outdoors in the sun and dark indoors (or outdoors at night) can be provided.

BRIEF DESCRIPTION OF DRAWINGS

FIG. 78 is a cross-sectional view of a liquid crystal display device of the present invention;
FIG. 87 is a cross-sectional view of a liquid crystal display device of the present invention;
FIG. 90 is a cross-sectional view of a liquid crystal display device of the present invention;
FIG. 92 is a cross-sectional view of a liquid crystal display device of the present invention;
FIG. 101 is a cross-sectional view of a liquid crystal display device of the present invention;
FIG. 102 is a cross-sectional view of a liquid crystal display device of the present invention;
FIGS. 109A and 109B are cross-sectional views of a liquid crystal display device of the present invention.

DETAILED DESCRIPTION OF THE INVENTION

Figure 1:
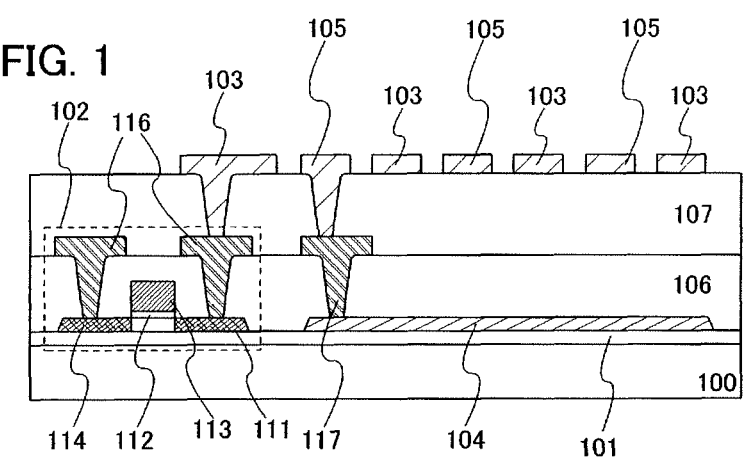
FIG. 1 is a cross-sectional view of a liquid crystal display device of the present invention.

Hereinafter, the embodiment modes of the present invention is described with reference to the accompanying drawings. The present invention can be carried out in many different modes, and it is easily understood by those skilled in the art that modes and details herein disclosed can be modified in various ways without departing from the purpose and the scope of the present invention. Accordingly, the present invention should not be interpreted as being limited to the description of the embodiment modes to be given below. Note that like portions in the different drawings are denoted by the like reference numerals when describing embodiment modes with reference to the drawings, and repeated explanations thereof are omitted.

In the present invention, a type of applicable transistor is not limited. It is thus possible to apply a thin film transistor (TFT) using a non-single crystalline semiconductor film typified by amorphous silicon or polycrystalline silicon, a MOS transistor, a junction type transistor, a bipolar transistor, which are formed using a semiconductor substrate or an SOI substrate a transistor using an organic semiconductor or a carbon nanotube, or the like. In addition, the type of substrate over which a transistor is provided is not limited and the transistor can be formed over a single crystalline substrate, an SOI substrate, a glass substrate, or the like.

In the present invention, a connection is synonymous to an electrical connection. Accordingly, in a structure disclosed in the present invention, another element which enables electrical connection (such as different element, a switch, a transistor, a capacitor, a resistor, or a diode) may be interposed between elements having a predetermined connection relationship.

A switch shown in the present invention may be any switch such as an electrical switch or a mechanical switch. It may be anything as long as it can control current flow. It may be a transistor, a diode, or a logic circuit that is a combination thereof. Therefore, in the case of using a transistor as a switch, a polarity (conductivity) thereof is not particularly limited because it operates as a mere switch. However, when an off current is preferred to be small, a transistor of a polarity with small off current is desirably used. A transistor having an LDD region, a transistor having a multiage structure, and the like are given as a transistor with small off current. Further, it is desirable that an N-channel transistor is employed when a potential of a source terminal of the transistor serving as a switch is closer to the low potential side power source (Vss, Vgnd, 0 V or the like), and a P-channel transistor is desirably employed when the potential of the source terminal is closer to the high potential side power source (Vdd or the like). This helps a transistor to easily serve as a switch as the absolute value of the gate-source voltage can be increased. Note that a CMOS switch can also be applied by using both N-channel and P-channel transistors.

As described above, a transistor of the present invention may be any type of transistors and may be formed over any type of substrate. Therefore, all circuits driving a pixel may be formed over a glass substrate, a plastic substrate, a single crystalline substrate, an SOI substrate, or any other substrates. Alternatively, some of the circuits driving the pixel may be formed over one substrate while other circuits may be formed over another substrate. That is, not all of the circuits are required to be formed over the same substrate. For example, a pixel portion and a gate line driver circuit may be formed with a TFT over a glass substrate while a signal line driver circuit (or a part thereof) may be formed over a single crystalline substrate, then, an IC chip thereof is connected to the glass substrate by COG (Chip On Glass). Alternatively, the IC chip may be connected to the glass substrate using TAB (Tape Automated Bonding) or a printed board.

Note that an element arranged in a pixel is not specifically limited. As a display element arranged in a pixel, any display element may be used, such as an EL (electroluminescence) element (also referred to as OLED (organic light emitting diode), an organic EL element, an inorganic EL, or the like), an element used in a field emission display (FED), an SED (Surface-conduction Electron-emitter Display) that is one kind of field emission display (FED), a liquid crystal display (LCD), a grating light valve (GLV), a plasma display (PDP), an electronic paper display, a digital micromirror device (DMD), or a piezoelectric ceramic display.

Note that a semiconductor device refers to a device having a semiconductor element such as a transistor or a diode. A display device refers to a device having a display element such as a liquid crystal element or an EL element. A light emitting device refers to a device having a light emitting element such that used in an EL element or FED.

Embodiment Mode 1

An example of a liquid crystal display device of the present invention is described with reference to FIG. 78. In a liquid crystal display device, a plurality of pixels is provided in matrix. An example of a cross-sectional structure of one pixel is shown in FIG. 78.

Figure 78:
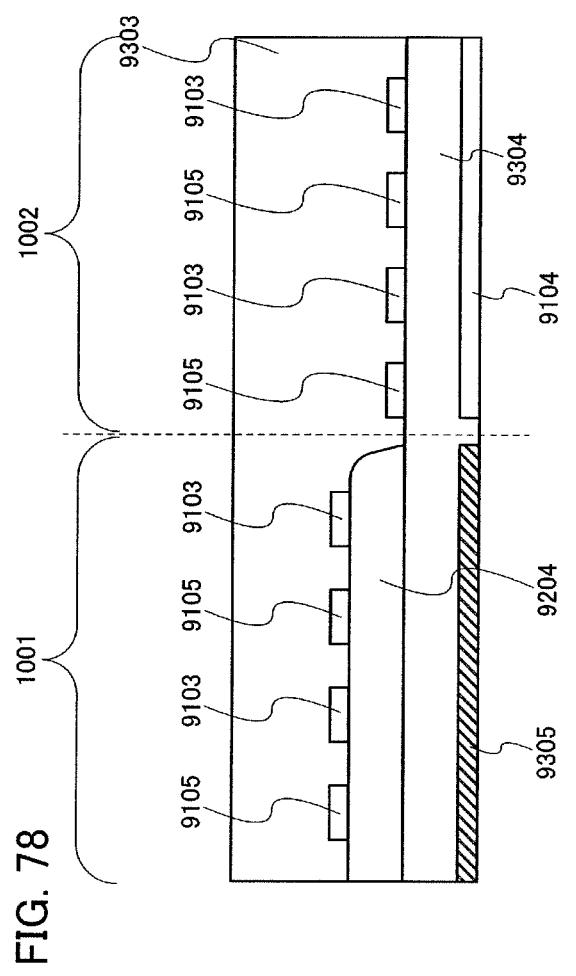

As shown in FIG. 78, a pixel includes a portion which conducts display by reflecting light (reflective portion) 1001 and a portion which conducts display by having light pass therethrough (transmissive portion) 1002. In each region, an electrode serving as a pixel electrode and an electrode serving as a common electrode are provided.

The electrode serving as a pixel electrode has a comb-shape or a slit. On the other hand, the electrode serving as a common electrode includes a portion which has a plain-shape and a portion having a comb-shape or a slit. However, it is not limited to this combination.

When voltage is supplied to the electrode serving as a pixel electrode and the electrode serving as a common electrode, an electrical field is generated. The electrical field has many components parallel to a substrate. A liquid crystal molecule rotates in a plane parallel to the substrate according to the electrical field. Thus, transmittance and reflectance of light can be controlled, thereby displaying a gray-scale.

When the electrode serving as a common electrode is provided in plural, it is desirably to form an opening (contact hole) in an insulating layer or overlap the electrodes in order to electrically connect the electrodes to each other.

When the electrode serving as a pixel electrode and the electrode serving as a common electrode are provided with an insulating layer therebetween, the overlapped portion can serve as a capacitor. The capacitor can serve as a holding capacitor for holding an image signal.

In the portion which conducts display by reflecting light (reflective portion) 1001, a reflective electrode is provided. A display is conducted by reflecting light by the reflective electrode. The reflective electrode may serve as the common electrode as well. In such a case, the reflective electrode may be connected to the common electrode to be supplied with voltage. Needless to say, the reflective electrode and the common electrode may be separately provided. In such a case where the reflective electrode and the common electrode are separated, the reflective electrode may be supplied with no voltage or may be supplied with another voltage.

In the portion which conducts display by having light pass therethrough (transmissive portion) 1002, a transparent electrode may be provided. A display is conducted by having light pass therethrough or through an aperture in the transparent electrode. The transparent electrode may serve as the common electrode as well. In such a case, the transparent electrode may be connected to the common electrode to be supplied with voltage. Needless to say, the transparent electrode and the common electrode may be separately provided. In such a case where the transparent electrode and the common electrode are separated, the transparent electrode may be supplied with no voltage or may be supplied with another voltage. In addition, the transparent electrode may serve as the pixel electrode as well.

A structure shown in FIG. 78 is described. In the reflective portion 1001, an electrode 9103 in a liquid crystal element and an electrode 9305 in a liquid crystal element are overlapped with insulating layers 9204 and 9304 therebetween. In the transmissive portion 1002, the electrode 9103 in a liquid crystal element and an electrode 9104 in a liquid crystal element are overlapped with an insulating layer 9304 therebetween.

In the reflective portion 1001 and the transmissive portion 1002, the electrode 9103 in a liquid crystal element and an electrode 9105 in a liquid crystal element are alternately arranged.

The electrodes 9103 and 9105 in a liquid crystal element are formed to be comb-shaped and the electrodes 9305 and 9104 in a liquid crystal element are plain-shaped. However, it is not limited thereto. The electrodes 9305 and 9104 in a liquid crystal element may each have a slit-like aperture, a hole, or may be comb-shaped.

The electrode 9103 in a liquid crystal element serves as the pixel electrode and the electrodes 9305, 9104, and 9105 in a liquid crystal element serve as the common electrodes. However, it is not limited thereto and the electrode 9103 in a liquid crystal element may serve as the common electrode and the electrodes 9305, 9104, and 9105 in a liquid crystal element may serve as the pixel electrodes.

It is desirable that each of the common electrodes be connected electrically by forming a contact hole in the insulating layer or overlapping the electrodes each other.

The electrode 9305 in a liquid crystal element is formed of a conductive material which reflects light. Therefore, the electrode 9305 in a liquid crystal element serves as the reflective electrode. In addition, the electrode 9104 in a liquid crystal element is formed of a transparent material which has light pass therethrough. Therefore the electrode 9104 in a liquid crystal element serves as the transparent electrode.

The electrodes 9103 and 9105 in a liquid crystal element are desirably formed of a material which is conductive as well as transparent. This is because they can contribute to a portion which displays an image when they can have light pass therethrough. Note that the electrodes 9103 and 9105 in a liquid crystal element may be formed of a material which reflects light. In such a case, even the transmissive portion 1002 can serve as the reflective portion since the transmissive portion 1002 reflects light.

Note that the electrodes 9103 and 9105 in a liquid crystal element are desirably formed at the same time. It is because when the electrodes 9103 and 9105 in a liquid crystal element are formed at the same time, the process can be simplified, the number of masks (reticles) can be reduced, and cost can be reduced. However, it is not limited thereto and the electrodes 9103 and 9105 in a liquid crystal element may be separately formed. In such a case, it is possible that one of the electrodes 9103 and 9105 in a liquid crystal element is transparent and the other reflects light.

When the electrode serving as the pixel electrode (the electrode 9103 in a liquid crystal element) and the electrodes serving as the common electrodes (the electrodes 9305, 9104, and 9105 in a liquid crystal element) are provided with the insulating layer therebetween, the overlapped portion can serve as a capacitor. The capacitor can serve as a holding capacitor for holding an image signal.

Figure 77A:
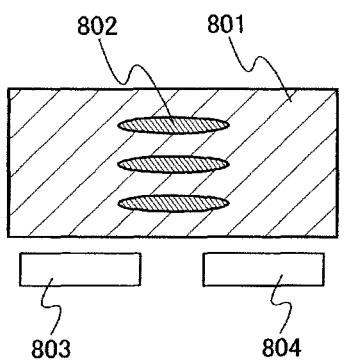
FIGS. 77A to 77C are views of a liquid crystal display device of the present invention.
Figure 77B:
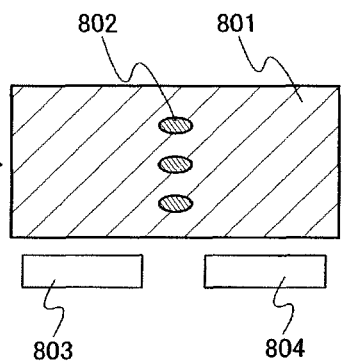
Figure 77C:
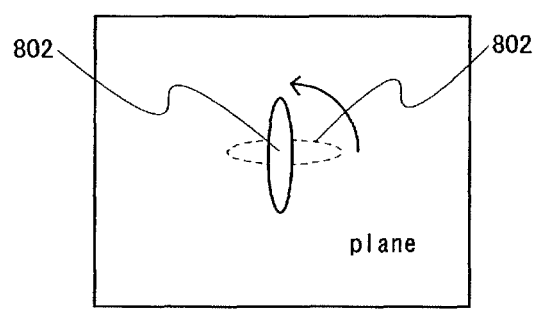
Figure 79:
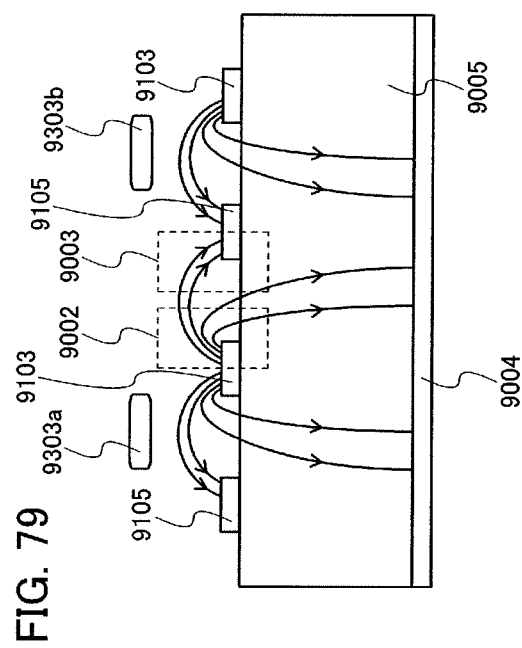
FIG. 79 is a cross-sectional view of a liquid crystal display device of the present invention.
Figure 112A:
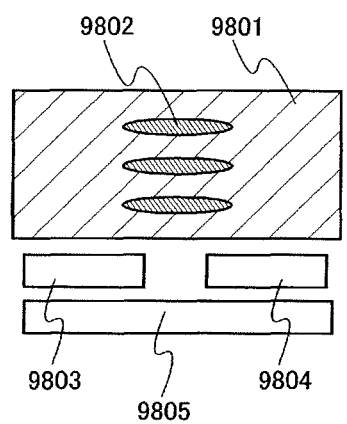
FIGS. 112A to 112C are cross-sectional views of a liquid crystal display device of the present invention.
Figure 112B:
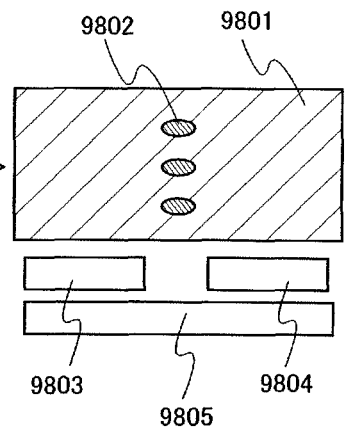
Figure 112C:
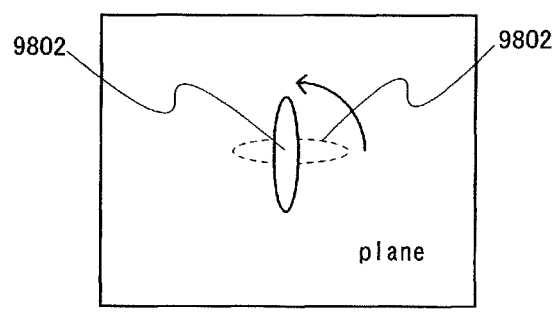

As shown in FIGS. 78 and 79, when an electric potential difference is generated between the electrodes 9103 and 9305 in a liquid crystal display, and between the electrodes 9103 and 9105 in a liquid crystal element, liquid crystal molecules (9303a and 9303b) in a liquid crystal layer 9303 rotate in a direction parallel to surfaces of the electrodes 9103, 9305, and 9104 in a liquid crystal element (that is, in a plane parallel to the substrate). Therefore, an amount of light which passes the liquid crystal layer 9303 can be controlled. That is, a polarization state of light can be controlled and an amount of light which passes a polarizing plate which is provided over an outer side of the substrate can be controlled. FIG. 79 corresponds to FIGS. 77A and 112A. The liquid crystal molecules (9303a and 9303b) shown in FIG. 79 rotate in a similar manner to liquid crystal molecules shown in FIGS. 77A, 77B, 112A, and 112B. Light enters the liquid crystal display device from outside and passes the liquid crystal layer 9303, passes the electrode 9103 in a liquid crystal element and the insulating layers 9204 and 9304, reflects off the electrode 9305 in a liquid crystal element, passes the insulating layers 9204 and 9304 and the electrode 9103 in a liquid crystal element, and exits from the liquid crystal display device, in this order.

Note that an electrode 9004 in FIG. 79 corresponds to the electrodes 9305 and 9104 in a liquid crystal element in FIG. 78. An insulating layer 9005 in FIG. 79 corresponds to the insulating layers 9204 and 9304 in FIG. 78.

As shown in FIG. 79, since an electrode serving as a common electrode is provided below an electrode serving as a pixel electrode, in a crosswise direction, or in an oblique direction (including an upper oblique direction and a lower oblique direction) of the electrode serving as a pixel electrode, more electrical field component parallel to the substrate is generated, in regions 9002 and 9003. As a result, a viewing angle characteristic is further improved.

Note that since the insulating layers 9204 and 9304 hardly have refractive index anisotropy, when light passes therethrough, the polarization state does not change.

Note that in the portion which conducts display by reflecting light (reflective portion) 1001 and the portion which conducts display by having light pass therethrough (transmissive portion) 1002, a color filter is provided in a light path, thereby making light having a desired color. Light emitted from each pixel is mixed to display an image.

The color filter may be provided over a counter substrate which is provided over the liquid crystal layer 9303 or over the electrode 9103 in a liquid crystal element. Alternatively, the color filter may be provided over the insulating layer 9304 or as a part thereof.

Note that a black matrix may be provided as well as the color filter.

Note that in the portion which conducts display by reflecting light (reflective portion) 1001, light passes the liquid crystal layer 9303 twice. That is, external light enters the liquid crystal layer 9303 from the counter substrate side, reflects off the electrode 9305 in a liquid crystal element, enters the liquid crystal layer 9303 again, and then exits through the counter substrate side. In this manner, light passes the liquid crystal layer 9303 twice.

On the other hand, in the portion which conducts display by having light pass therethrough (transmissive portion) 1002, light passes the electrode 9104 in a liquid crystal element, enters the liquid crystal layer 9303, and then exits through the counter substrate. That is, light passes the liquid crystal layer 9303 once.

The liquid crystal layer 9303 has refractive index anisotropy, therefore, a polarization state of light changes depending on the distance traveled by the light in the liquid crystal layer 9303, which leads to inaccurate image display. Therefore, the polarization state of light needs to be adjusted. The thickness of the liquid crystal layer 9303 (so-called cell gap) in the portion which conducts display by reflecting light (reflective portion) 1001 is thinned so that the distance traveled by light in the liquid crystal layer 9303 can be prevented from being too long even when the light passes therethrough twice.

Note that the insulating layers 9204 and 9304 hardly have refractive index anisotropy; therefore, a polarization state of light passing therethrough does not change. Accordingly, presence and thickness of the insulating layers 9204 and 9304 do not have much influence.

To make the thickness of the liquid crystal layer 9303 (so-called cell gap) thin, a film for adjusting the thickness thereof may be provided. In FIG. 78, the insulating layer 9204 corresponds to such a film. That is, in the portion which conducts display by reflecting light (reflective portion) 1001, the insulating layer 9204 is a layer provided for adjusting the thickness of the liquid crystal layer. Providing the insulating layer 9204 can make the liquid crystal layer in the reflective portion 1001 thinner than that in the transmissive portion 1002.

Note that the thickness of the liquid crystal layer 9303 in the reflective portion 1001 is desirably half of that of the transmissive portion 1002. Here, the half may include a deviation unrecognizable by human eyes.

Note that light is not always emitted in a direction perpendicular, that is, in a direction normal to the substrate. Light is often emitted obliquely. Therefore, with all cases considered, the distance traveled by light needs to be approximately the same in the reflective portion 1001 and the transmissive portion 1002. Therefore, the thickness of the liquid crystal layer 9303 in the reflective portion 1001 is desirably approximately one-third to two-thirds of that of the transmissive portion 1002.

Thus, if a film for adjusting the thickness of the liquid crystal layer 9303 is placed over the substrate side where the electrode 9103 in a liquid crystal element is provided, the formation thereof becomes easier. That is, on the substrate side where the electrode 9103 in a liquid crystal element is provided, various wires, electrodes, and films are formed. The film for adjusting the thickness of the liquid crystal layer 9303 can be formed by using such wires, electrodes, and films; therefore, the film can be formed with few difficulties. Besides, a film having another function can be formed in the same step, therefore, the process can be simplified and the cost can be reduced.

A liquid crystal display device of the present invention with the foregoing structure has a wide viewing angle and less color-shift due to the angle at which its display screen is watched. In addition, a liquid crystal display device of the present invention can provide an image which is favorably recognized outdoors in the sun and dark indoors (or outdoors at night).

Although the electrodes 9305 and 9104 in a liquid crystal element are arranged in the same plane in FIG. 78, it is not limited thereto. They may be formed in different planes.

Note that in FIG. 78 the electrodes 9305 and 9104 in a liquid crystal element are arranged apart from each other. However, it is not limited thereto. The electrodes 9305 and 9104 in a liquid crystal element may be arranged in contact with each other, or they may be formed of one electrode. Alternatively, the electrodes 9305 and 9104 in a liquid crystal element may be electrically connected to each other. In addition, the electrodes 9105 and 9104 in a liquid crystal element may be electrically connected to each other.

In FIG. 78, the insulating layer 9204 is placed as a film for adjusting the thickness of the liquid crystal layer 9303. However, it is not limited thereto and the film for adjusting the thickness of the liquid crystal layer 9303 may be provided on the counter substrate side.

Although the film is provided to thin the liquid crystal layer 9303, the film may be removed in a predetermined portion so as to thicken the liquid crystal layer 9303.

The reflective electrode may have an even surface, but desirably has an uneven surface. With the uneven surface, it is possible to diffuse and reflect light. As a result, light can be scattered and luminance can be improved.

Figure 80:
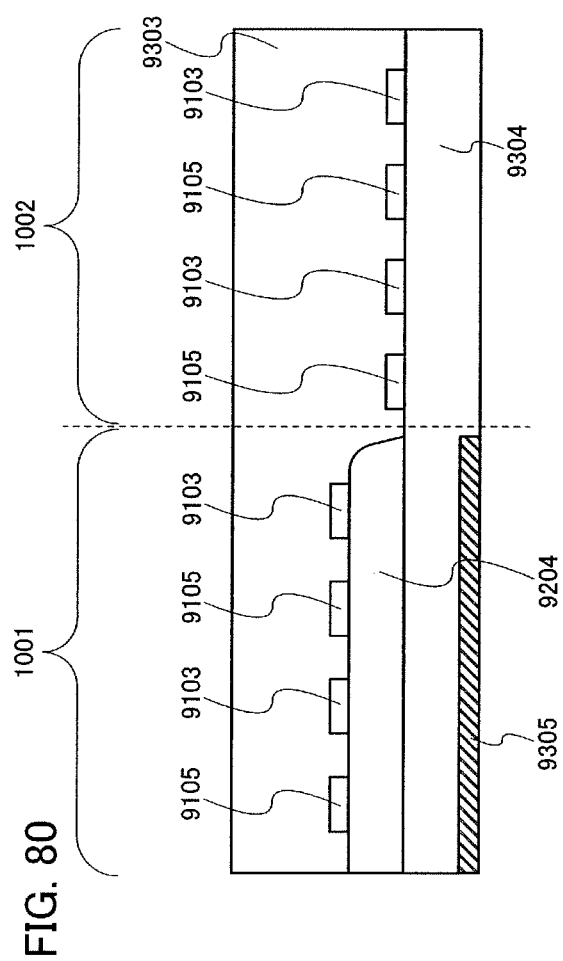
FIG. 80 is a cross-sectional view of a liquid crystal display device of the present invention.

Note that as shown in FIG. 80, in the transmissive portion 1002, the electrode 9104 in a liquid crystal element is not necessarily provided.

Figure 81:
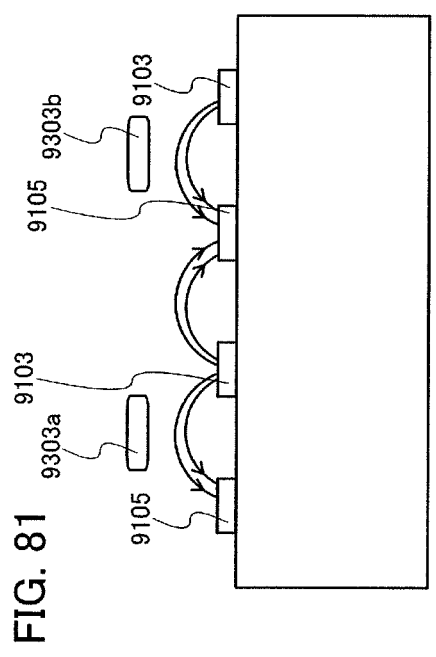
FIG. 81 is a cross-sectional view of a liquid crystal display device of the present invention.

In that case, as shown in FIG. 81, voltage is applied between the electrodes 9105 and 9103 in a liquid crystal element to control the liquid crystal molecules (9303$a$ and 9303$b$).

As described above, since the electrode 9104 in a liquid crystal element is not provided in the transmissive portion 1002, the process can be simplified, the number of masks (reticles) can be reduced, and the cost can be reduced.

Embodiment Mode 2

An example of a liquid crystal display device of the present invention having a structure different from that of Embodiment Mode 1 is described. A portion having the same function as that of Embodiment Mode 1 is denoted by the same reference numeral.

Figure 82:
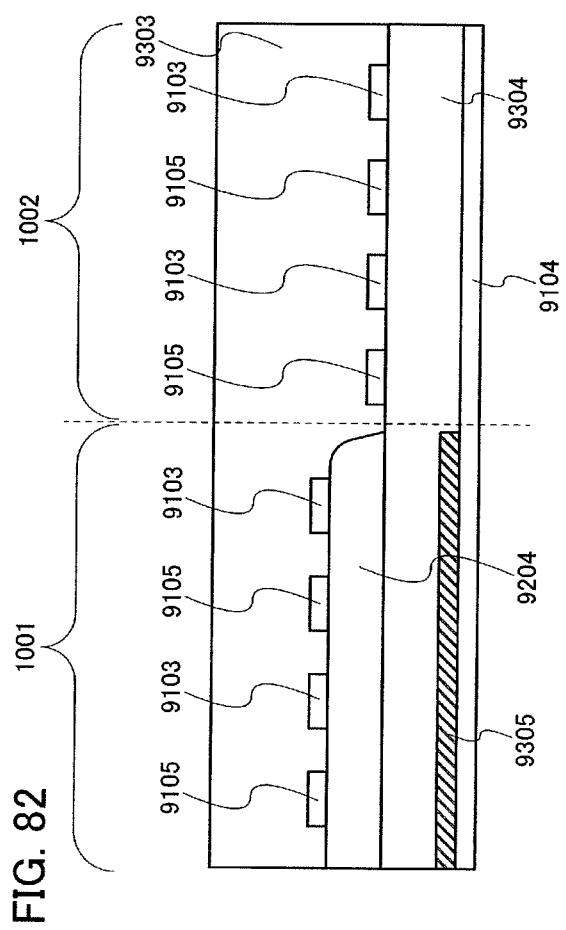
FIG. 82 is a cross-sectional view of a liquid crystal display device of the present invention.

FIG. 82 shows an example of a liquid crystal display device which is different from that shown in FIG. 78 in that the electrodes 9305 and 9104 in a liquid crystal element are stacked. When the electrodes 9305 and 9104 in a liquid crystal element are required to have the same electric potential, they may be stacked to be connected electrically to each other.

Although the electrode 9104 in a liquid crystal element is placed below the electrode 9305 in a liquid crystal element, it is not limited thereto. The electrode 9104 in a liquid crystal element may be placed over the electrode 9305 in a liquid crystal element.

Although the electrode 9104 in a liquid crystal element is placed in the whole region below the electrode 9305 in a liquid crystal element, it is not limited thereto. The electrode 9104 in a liquid crystal element may be placed over and below a part of the electrode 9305 in a liquid crystal element.

In a case where the electrode 9104 in a liquid crystal element is placed in the whole region below the electrode 9305 in a liquid crystal element, both the electrodes 9305 and 9104 in a liquid crystal element can be formed using one mask. In general, the electrodes 9305 and 9104 in a liquid crystal element are each formed using different masks. However, in this case, a mask such as a halftone or graytone is used and by changing thickness of a resist by region, the electrodes 9305 and 9104 in a liquid crystal element can be formed with one mask. As a result, the process can be simplified, the number of steps can be reduced, and the number of masks (the number of reticles) can be reduced, so that the cost can be reduced.

Figure 83:
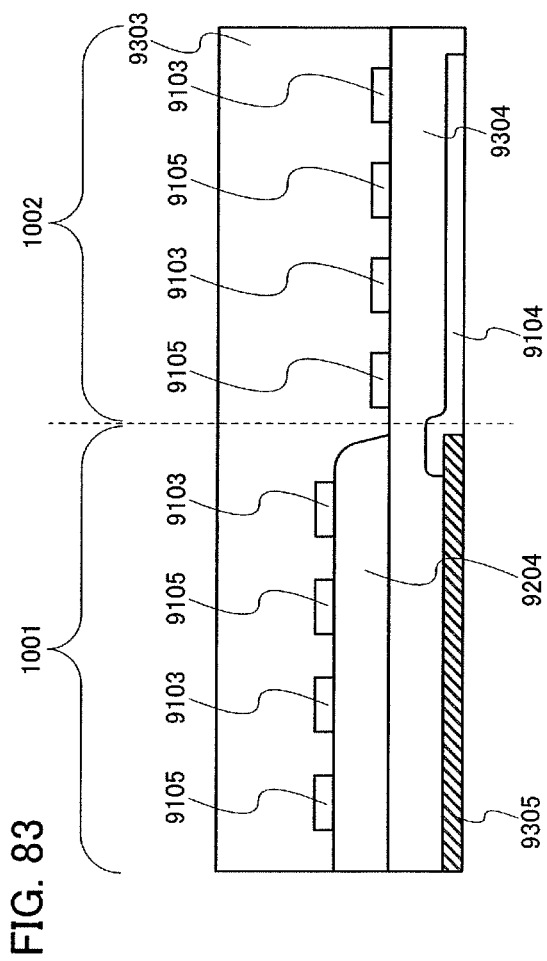
FIG. 83 is a cross-sectional view of a liquid crystal display device of the present invention.

In FIG. 83, a liquid crystal display device is shown in which the electrodes 9305 and 9104 in a liquid crystal element are electrically connected by being partially overlapped with each other. The electrodes 9305 and 9104 in a liquid crystal element may be electrically connected in such a structure.

Although the electrode 9104 in a liquid crystal element is placed over electrode 9305 in a liquid crystal element to be in contact with each other, it is not limited thereto. The electrode 9305 in a liquid crystal element may be placed over the electrode 9104 in a liquid crystal element to be in contact with each other.

In this manner, by not arranging the electrode 9104 in a liquid crystal element in a wide region over the electrode 9305 in a liquid crystal element, loss of light therein can be reduced.

Figure 84:
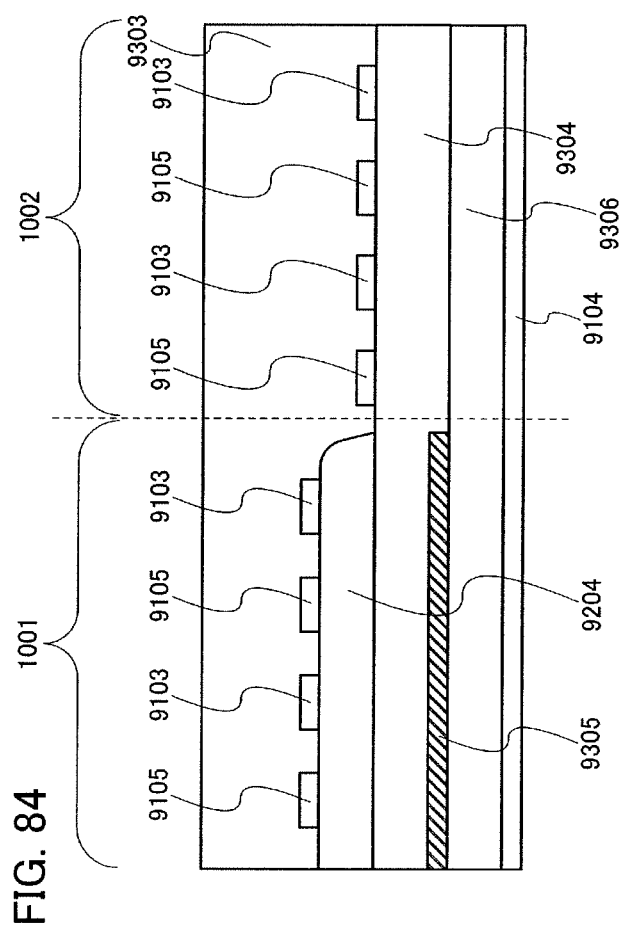
FIG. 84 is a cross-sectional view of a liquid crystal display device of the present invention.

In FIG. 84, the electrodes 9305 and 9104 in a liquid crystal element are provided in different layers with an insulating layer 9306 therebetween. As in FIG. 85, the electrodes 9305 and 9104 in a liquid crystal element may be provided in different layers.

When the electrodes 9305 and 9104 in a liquid crystal element are formed in different layers, the distance between the electrodes 9305 and 9104 in a liquid crystal element in the reflective portion 1001 is approximately the same as that in the transmissive portion 1002. Therefore, the gap between the electrodes in the reflective portion 1001 and that in the transmissive portion 1002 can be approximately the same. Since application and intensity of electrical filed change according to the gap between electrodes, when the gaps between the electrodes are approximately the same in the reflective portion 1001 and the transmissive portion 1002, approximately the same level of electrical fields can be applied thereto. Therefore, liquid crystal molecules can be controlled with accuracy. In addition, since the liquid crystal molecules rotate in approximately the same manner in the reflective portion 1001 and the transmissive portion 1002, an image with approximately the same gray-scale can be viewed whether the image is displayed or viewed by the liquid crystal display device used as a transmissive type or as a reflective type.

Although the electrode 9104 in a liquid crystal element is placed in the whole region below the electrode 9305 in a liquid crystal element, it is not limited thereto. The electrode 9104 in a liquid crystal element needs to be provided at least in the transmissive portion 1002.

Note that a contact hole may be formed in the insulating layer 9306 to connect the electrodes 9104 and 9305 in a liquid crystal element.

Figure 85:
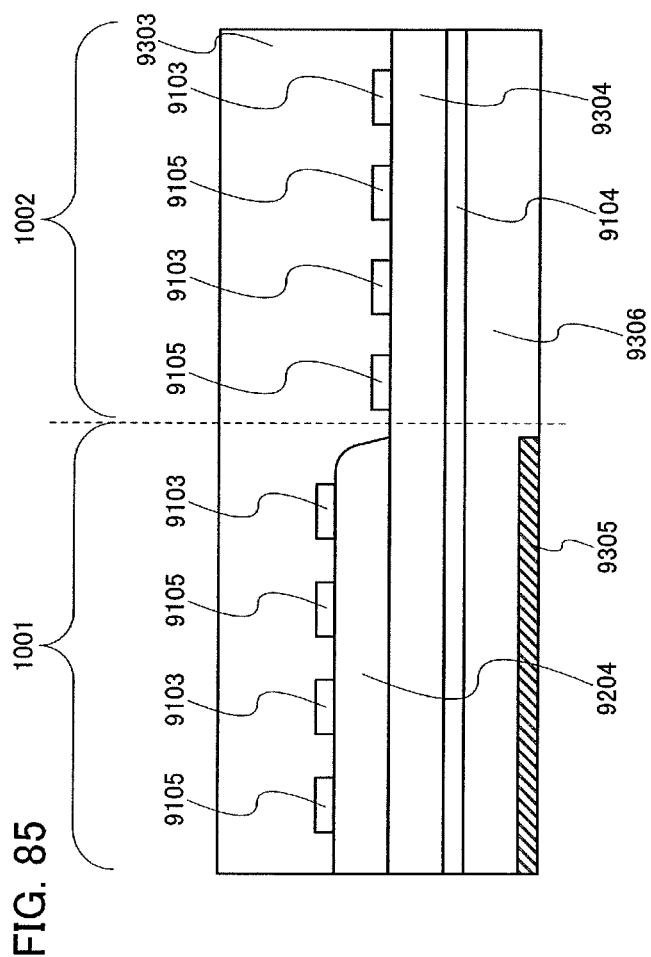
FIG. 85 is a cross-sectional view of a liquid crystal display device of the present invention.

FIG. 85 shows an example of a liquid crystal display device which is different from that shown in FIG. 84 in that the electrode 9305 in a liquid crystal element is provided in a layer lower than the electrode 9104 (a layer further away from the liquid crystal layer 9303) in a liquid crystal element.

Although the electrode 9104 in a liquid crystal element is also formed in the reflective portion 1001, it is not limited thereto. The electrode 9104 in a liquid crystal element needs to be provided at least in the transmissive portion 1002.

Note that in the case where the electrode 9104 in a liquid crystal element is also formed in the reflective portion 1001, the liquid crystal layer 9303 is controlled according to the voltage between the electrodes 9104 and 9103 in a liquid crystal element. In that case, the electrode 9305 in a liquid crystal element serves only as the reflective electrode and the electrode 9104 in a liquid crystal element serves as the common electrode in the reflective portion 1001.

Therefore, in that case, voltage supplied to the electrode 9305 in a liquid crystal element is arbitrary. The same voltage as the electrode 9104 in a liquid crystal element or the electrode 9103 in a liquid crystal element may be supplied to the electrode 9305 in a liquid crystal element. In that case, a capacitor is formed between the electrodes 9305 and 9104 in a liquid crystal element, which may serve as a holding capacitor for holding an image signal.

Note that a contact hole may be formed in the insulating layer 9306 to connect the electrodes 9104 and 9305 in a liquid crystal element to each other.

Figure 86:
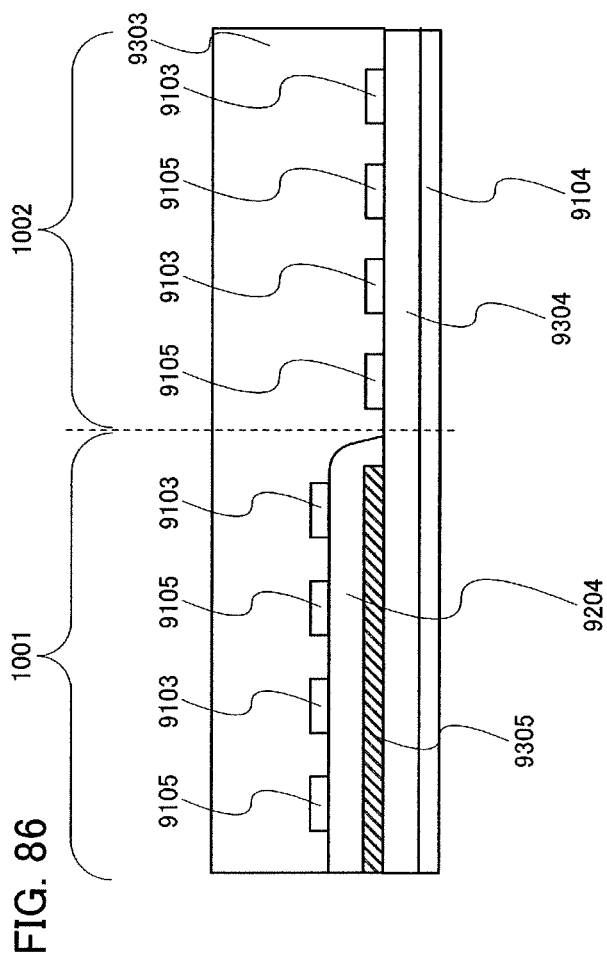
FIG. 86 is a cross-sectional view of a liquid crystal display device of the present invention.

In FIG. 86, the electrode 9305 in a liquid crystal element in the reflective portion 1001 and the electrodes 9103 and 9105 in a liquid crystal element in the transmissive portion 1002 are formed over the insulating layer 9304. In addition, the insulating layer 9204 is formed over the electrode 9305 in a liquid crystal element and the electrodes 9103 and 9105 in a liquid crystal element in the reflective portion are formed thereover. The electrode 9104 in a liquid crystal element is formed below the insulating layer 9304.

Although the electrode 9104 in a liquid crystal element is also formed in the reflective portion 1001, it is not limited thereto. The electrode 9104 in a liquid crystal element needs to be provided at least in the transmissive portion 1002.

Note that a contact hole may be formed in the insulating layer 9304 to connect the electrodes 9104 and 9305 in a liquid crystal element to each other.

Figure 93:
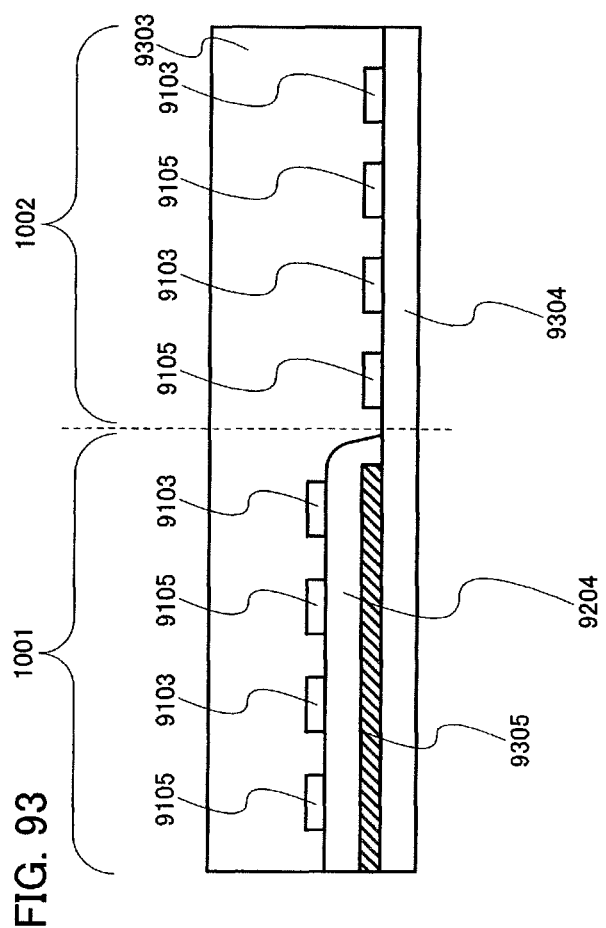
FIG. 93 is a cross-sectional view of a liquid crystal display device of the present invention.

Note that as shown in FIG. 93, the electrode 9104 in a liquid crystal element is not necessarily provided in the transmissive portion 1002.

In such a case, as shown in FIG. 81, voltage is applied between the electrodes 9105 and 9103 in a liquid crystal element to control the liquid crystal molecules (9303a and 9303b).

As described above, since the electrode 9104 in a liquid crystal element is not provided in the transmissive portion 1002, the process can be simplified, the number of masks (reticles) can be reduced, and the cost can be reduced.

Note that in FIGS. 78 to 86 and 93, although unevenness of surfaces of the electrodes are not shown, the surfaces of the electrodes 9103, 9305, 9104, and 9105 in a liquid crystal element are not limited to be flat. Their surfaces may be uneven.

Note that in FIGS. 78 to 86 and 93, although unevenness of surfaces of the insulating layers 9204, 9304, and 9306 are not shown, the surfaces of the insulating layers 9204, 9304, and 9306 are not limited to be flat. Their surfaces may be uneven.

Note that by making the surface of the reflective electrode be very uneven, light can be diffused. As a result, luminance of the display device can be improved. Therefore, the reflective electrode and the transparent electrode (the electrodes 9305 and 9104 in a liquid crystal element) shown in FIGS. 78 to 86 and 93 may have uneven surfaces.

Note that the uneven surface preferably has a shape with which light can be diffused as easily as possible.

In the transmissive portion 1002, the transparent electrode desirably does not have unevenness so as not to affect application of an electrical field. Note that even if there is unevenness, there is no problem if display is not affected.

Figure 88:
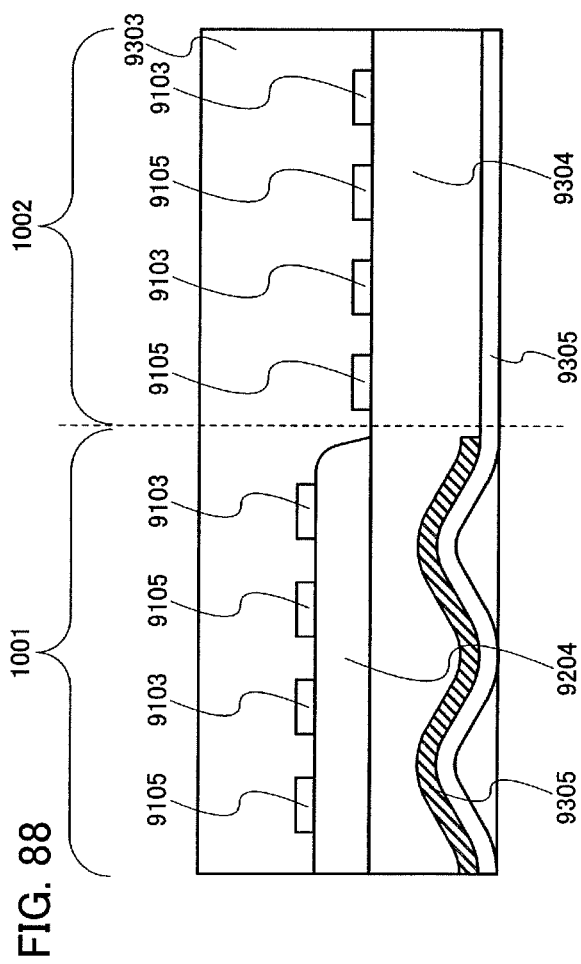
FIG. 88 is a cross-sectional view of a liquid crystal display device of the present invention.
Figure 89:
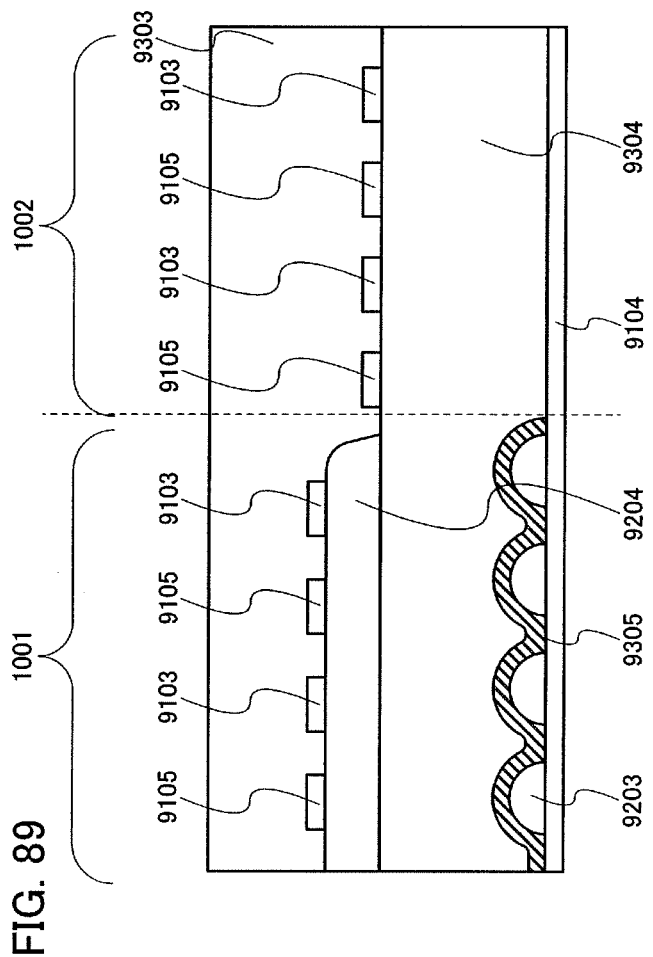
FIG. 89 is a cross-sectional view of a liquid crystal display device of the present invention.
Figure 91:
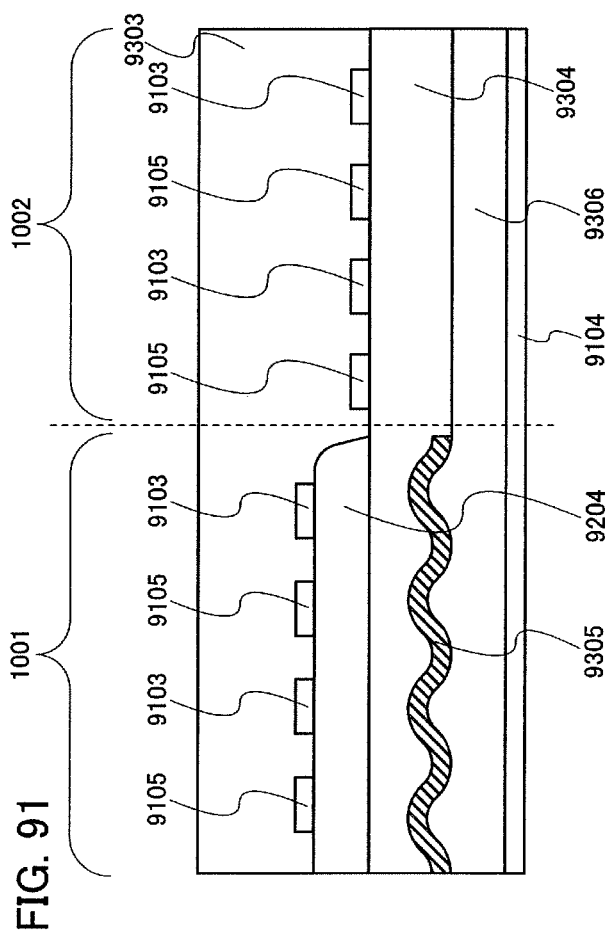
FIG. 91 is a cross-sectional view of a liquid crystal display device of the present invention.

FIG. 87 shows a case where the surface of the reflective electrode in FIG. 78 is uneven. Each of FIGS. 88 and 89 shows a case where the surface of the reflective electrode in FIG. 82 is uneven. FIG. 90 shows a case where the surface of the reflective electrode in FIG. 83 is uneven. FIG. 91 shows a case where the surface of the reflective electrode in FIG. 84 is uneven. FIG. 92 shows a case where the surface of the reflective electrode in FIG. 85 is uneven.

The description of FIGS. 78 to 86 and 93 where the surface of the reflective electrode is not uneven can be applied to FIGS. 86 to 92.

Figure 87:
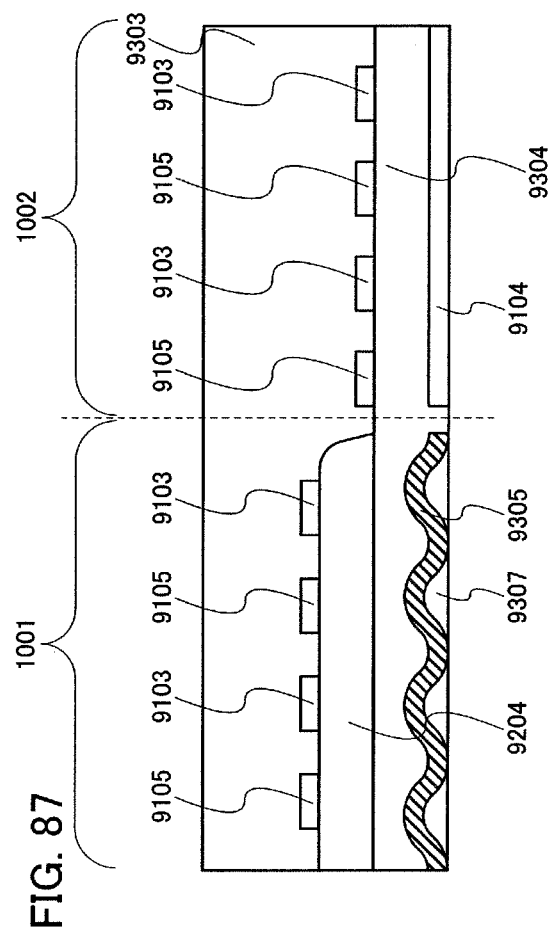

FIG. 87 shows an example of a liquid crystal display device which is different from that shown in FIG. 78 in that a convex-shaped scatterer 9307 is provided below the electrode 9305 in a liquid crystal element. By providing the convex-shaped scatterer, the electrode 9305 in a liquid crystal element has an uneven surface, and light is scattered and degradation of contrast and glare due to reflection of light can be prevented; thereby improving luminance.

Note that the shape of the scatterer 9307 desirably has a shape with which light is diffused as easily as possible. However, since an electrode and a wire may be formed thereover, a smooth shape is desirable so as to prevent breaking of the electrodes and wires.

FIG. 89 shows an example of a liquid crystal display device which is different from that shown in FIG. 88 in that the electrodes 9305 and 9104 in a liquid crystal element are stacked.

Since the electrodes 9104 and 9305 in a liquid crystal element stick together in a large area, contact resistance can be reduced.

Figure 90:
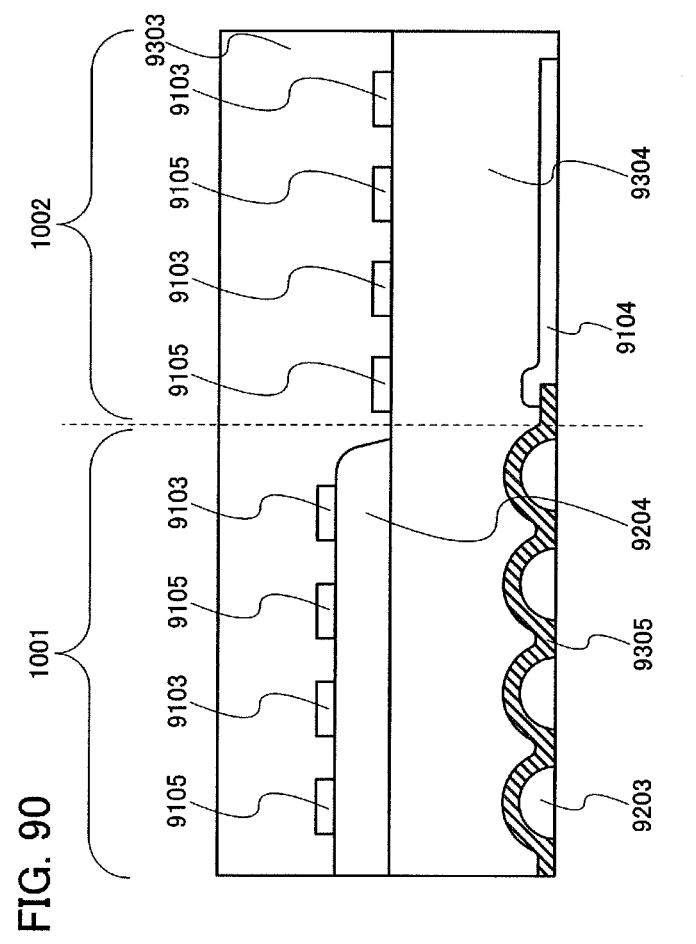

FIG. 90 shows an example of a liquid crystal display device which is different from that shown in FIG. 89 in that a scatterer 9203 is provided between the electrodes 9305 and 9104 in a liquid crystal element.

Since the scatterer 9203 is formed after forming the electrode 9104 in a liquid crystal element, the electrode 9104 in a liquid crystal element can be flattened in the reflective portion 1001.

FIG. 90 shows an example of a liquid crystal display device which is different from that shown in FIG. 83 in that the convex-shaped scatterer 9203 is provided below the electrode 9305 in a liquid crystal element.

FIG. 91 shows an example of a liquid crystal display device which is different from that shown in FIG. 84 in that the surface of the insulating layer 9306 is partially uneven. The surface of the electrode 9305 in a liquid crystal element becomes uneven, reflecting such the shape of the insulating layer 9306.

Figure 92:
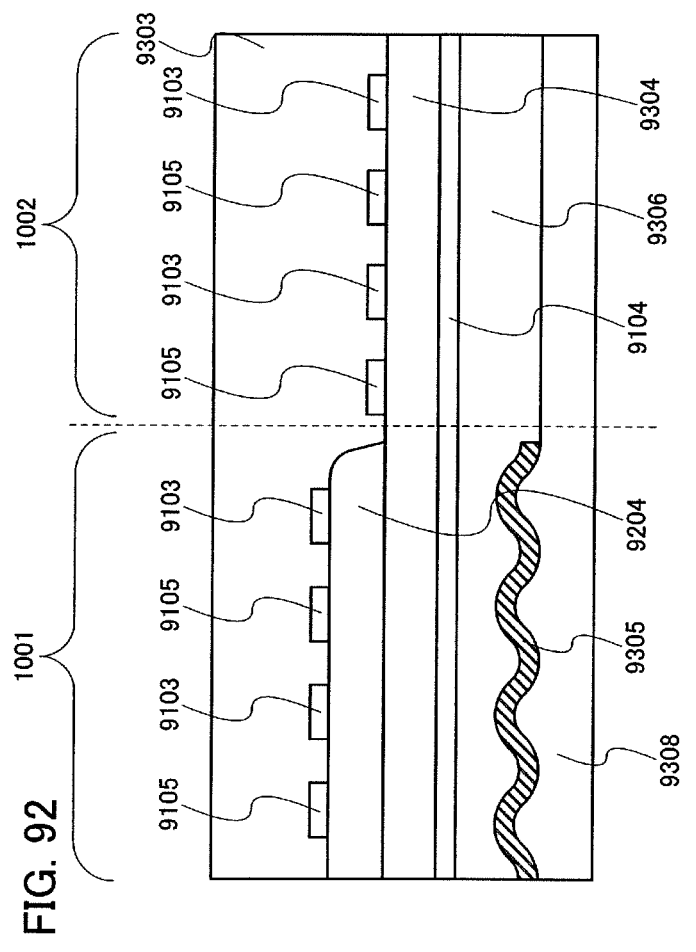

FIG. 92 shows an example of a liquid crystal display device which is different from that shown in FIG. 85 in that the surface of the electrode 9305 in a liquid crystal element becomes uneven by providing an insulating layer 9308 having a partially uneven surface below the electrode 9305 in a liquid crystal element.

Figure 94:
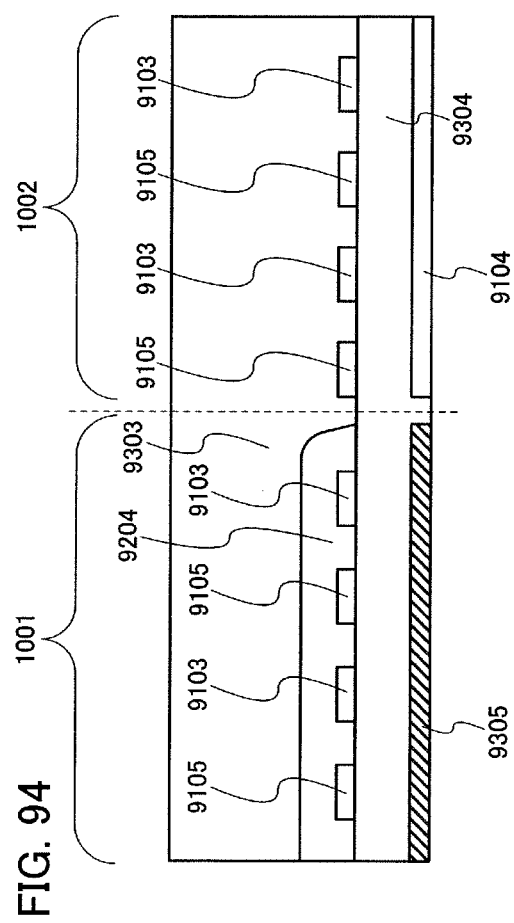
FIG. 94 is a cross-sectional view of a liquid crystal display device of the present invention.

Although in FIGS. 78 to 93, the film for adjusting the thickness of the liquid crystal layer 9303 is formed below the electrode 9103 in a liquid crystal element, it is not limited thereto. As shown in FIG. 94, the insulating layer 9204 for adjusting the thickness of the liquid crystal layer 9303 may be placed over the electrodes 9103 and 9105 in a liquid crystal element.

Figure 95:
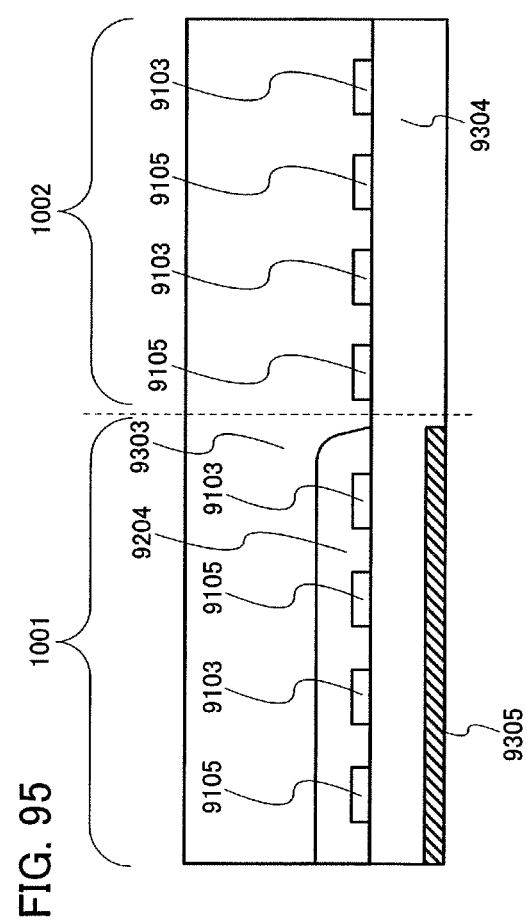
FIG. 95 is a cross-sectional view of a liquid crystal display device of the present invention.

In that case, as shown in FIG. 95, the electrode 9104 in a liquid crystal element is not necessarily provided in the transmissive portion 1002.

In such a case, as shown in FIG. 81, voltage is applied between the electrodes 9105 and 9103 in a liquid crystal element to control the liquid crystal molecules (9303a and 9303b).

As described above, since the electrode 9104 in a liquid crystal element is not provided in the transmissive portion 1002, the process can be simplified, the number of masks (reticles) can be reduced, and the cost can be reduced.

FIG. 94 corresponds to FIG. 78. In FIGS. 82 to 92, as in the case of FIG. 94, the insulating layer 9204 for adjusting the thickness of the liquid crystal layer 9303 can be placed over the electrode 9103 in a liquid crystal element.

Although in many drawings in FIGS. 78 to 94, the film for adjusting the thickness of the liquid crystal layer 9303 is provided on the substrate side where the electrode 9103 in a liquid crystal element is formed, it is not limited thereto. The film for adjusting the thickness of the liquid crystal layer 9303 may be placed over a counter substrate side.

By placing the film for adjusting the thickness of the liquid crystal layer 9303 on the counter substrate side, the electrode 9103 in a liquid crystal element can be arranged in the same plane in the reflective portion 1001 and that in the transmissive portion 1002. Therefore, the distances between the electrodes in the reflective portion 1001 and the transmissive portion 1002 can be approximately the same. Since application and intensity of electrical filed change according to a distance between electrodes, when the gaps between the electrodes are approximately the same in the reflective portion 1001 and the transmissive portion 1002, approximately the same level of electrical fields can be applied thereto. Therefore, liquid crystal molecules can be controlled with accuracy. In addition since the liquid crystal molecules rotate in approximately the same manner in the reflective portion 1001 and the transmissive portion 1002, an image with approximately the same gray-scale can be viewed whether the image is displayed or viewed by the liquid crystal display device used as a transmissive type or as a reflective type.

When the film for adjusting the thickness of the liquid crystal layer 9303 is provided, there is a possibility that an alignment state of the liquid crystal molecules becomes disordered and a defect such as disclination may be caused. However, placement of the film for adjusting the thickness of the liquid crystal layer 9303 over a counter substrate 9202 can set the counter substrate 9202 apart from the electrode 9103 in a liquid crystal element and therefore, an electrical field applied to the liquid crystal layer is not weakened, the alignment state of the liquid crystal molecules is hardly disordered, and an image can be prevented from being hardly recognizable.

Note that the number of steps for forming the counter substrate is small since only the color filter, the black matrix, and the like are provided thereto. Therefore, even if the film for adjusting the thickness of the liquid crystal layer 9303 is provided to the counter substrate 9202, a yield is not easily reduced. Even if a defect is generated, since the number of steps is small and the cost is low, waste of the manufacturing cost can be suppressed.

Note that in a case where the film for adjusting the thickness of the liquid crystal layer 9303 is provided to the counter substrate 9202, particles serving as a scattering material may be contained in the film for adjusting the thickness of the liquid crystal layer 9303 so that light is diffused and luminance is improved. The particles are formed of a transparent resin material which has a refractive index different from a base material (such as an acrylic resin) forming a film for adjusting a gap. When the particles are contained, light can be scattered and contrast and luminance of a displayed image can be improved.

Figure 96:
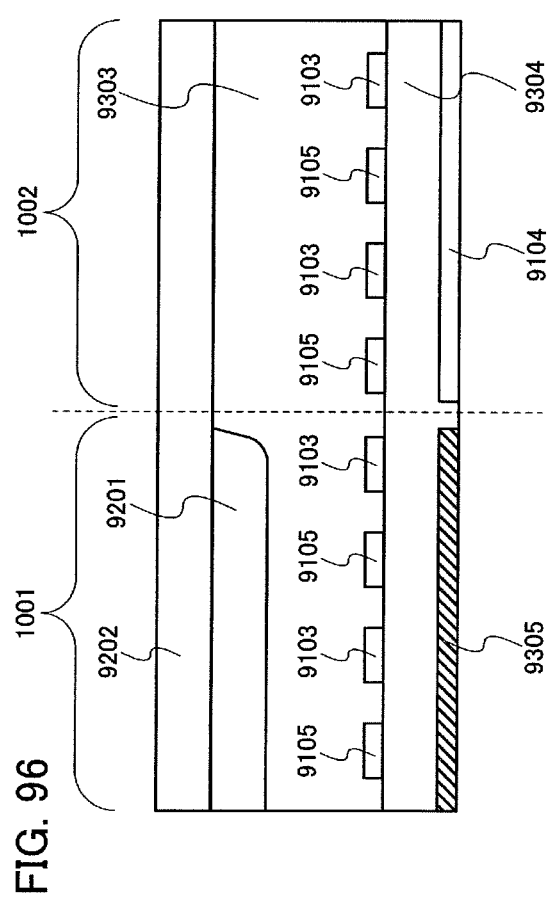
FIG. 96 is a cross-sectional view of a liquid crystal display device of the present invention.
Figure 97:
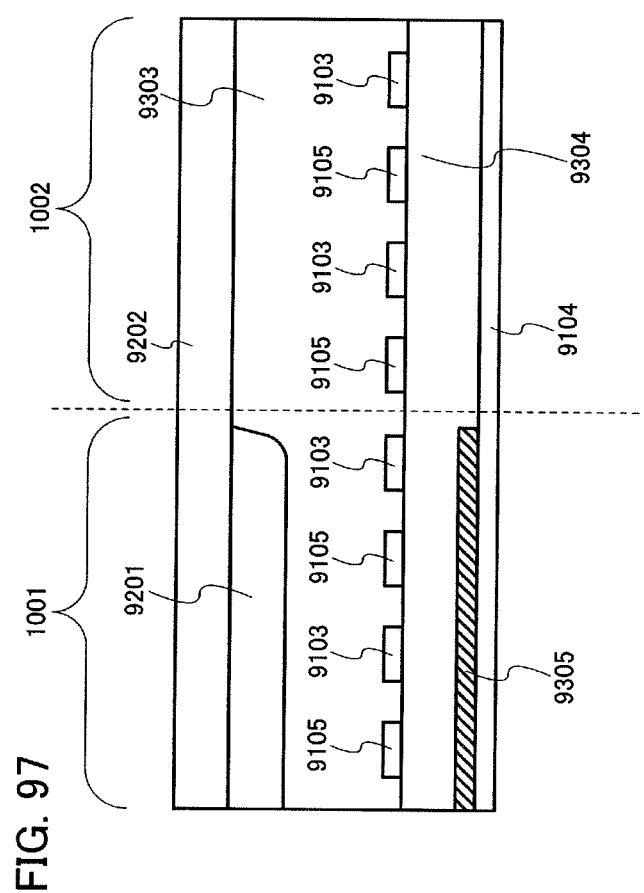
FIG. 97 is a cross-sectional view of a liquid crystal display device of the present invention.
Figure 98:
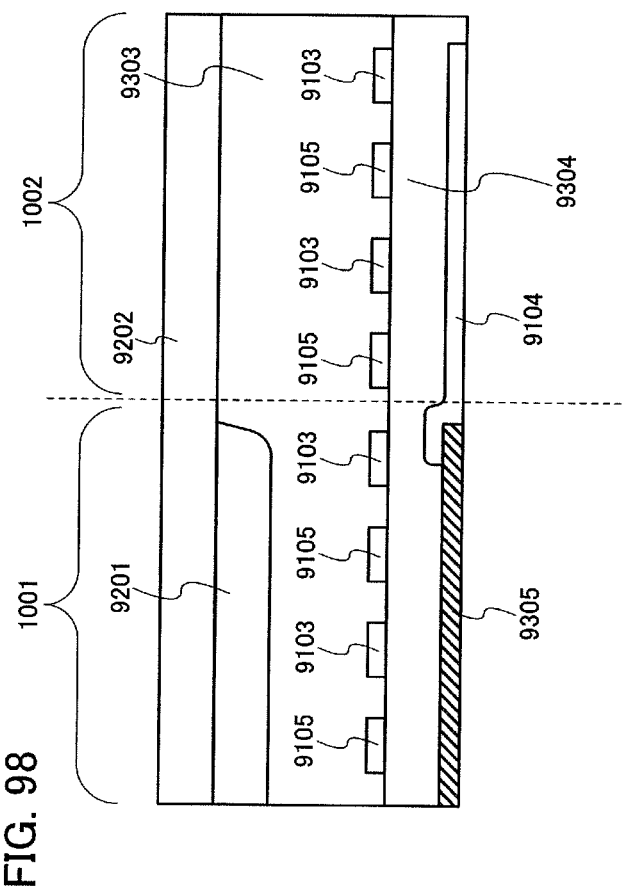
FIG. 98 is a cross-sectional view of a liquid crystal display device of the present invention.
Figure 99:
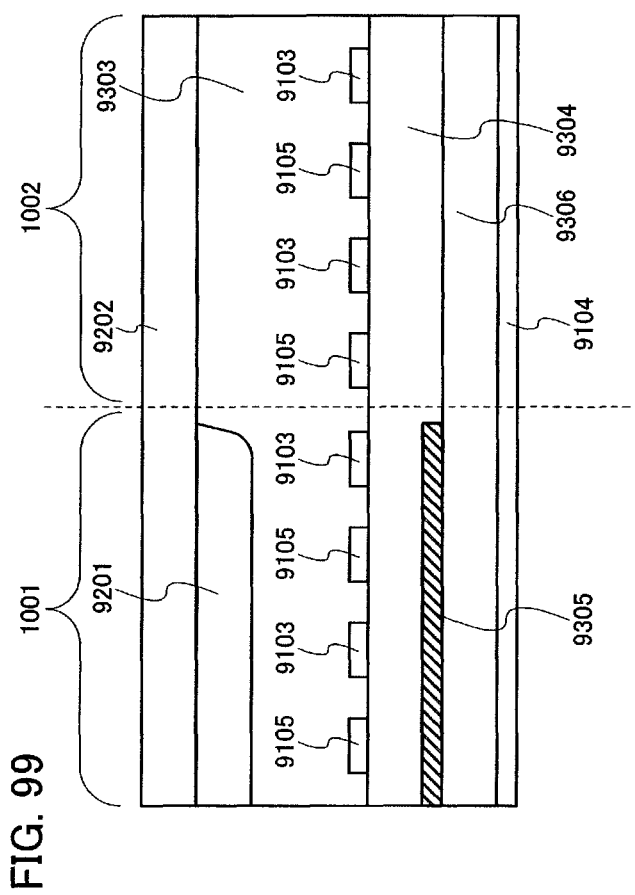
FIG. 99 is a cross-sectional view of a liquid crystal display device of the present invention.
Figure 100:
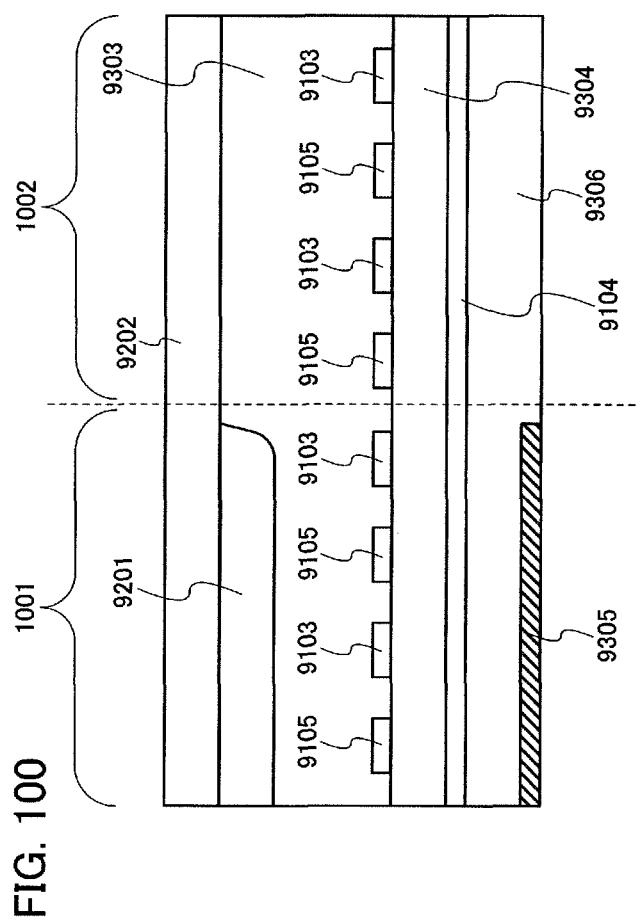
FIG. 100 is a cross-sectional view of a liquid crystal display device of the present invention.

FIG. 96 shows a case where the film for adjusting the thickness of the liquid crystal layer is provided to the counter substrate in FIG. 78. FIG. 97 shows a case where the film for adjusting the thickness of the liquid crystal layer is provided to the counter substrate in FIG. 82. FIG. 98 shows a case where the film for adjusting the thickness of the liquid crystal layer is provided to the counter substrate in FIG. 83. FIG. 99 shows a case where the film for adjusting the thickness of the liquid crystal layer is provided to the counter substrate in FIG. 84. FIG. 100 shows a case where the film for adjusting the thickness of the liquid crystal layer is provided to the counter substrate in FIG. 85. FIG. 101 shows a case where the film for adjusting the thickness of the liquid crystal layer is provided to the counter substrate in FIG. 80.

Therefore, the description on FIGS. 78 to 86 can be applied to FIGS. 96 to 101.

FIG. 96 shows an example of a liquid crystal display device which is different from that shown in FIG. 78 in that an insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is provided over the insulating layer 9304.

FIG. 97 shows an example of a liquid crystal display device which is different from that shown in FIG. 82 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

FIG. 98 shows an example of a liquid crystal display device which is different from that shown in FIG. 83 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

FIG. 99 shows an example of a liquid crystal display device which is different from that shown in FIG. 84 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

FIG. 100 shows an example of a liquid crystal display device which is different from that shown in FIG. 87 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

Figure 101:
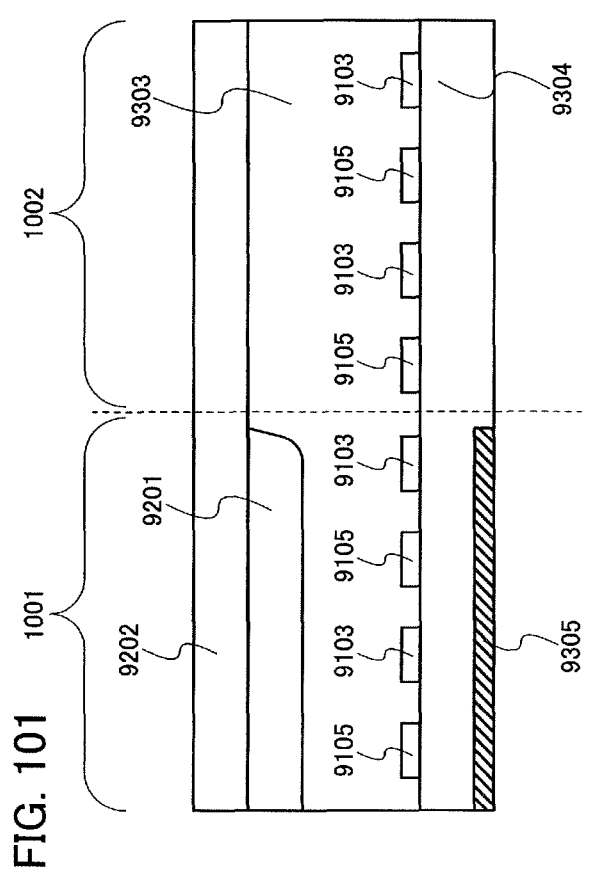

FIG. 101 shows an example of a liquid crystal display device which is different from that shown in FIG. 80 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

Note that in FIGS. 96 to 101, although unevenness of surfaces of the electrodes are not shown, the surfaces of the electrodes 9103, 9305, 9104, and 9105 in a liquid crystal element are not limited to be flat. Their surfaces may be uneven.

Note that in FIGS. 96 to 101, although unevenness of surfaces of the insulating layers 9204, 9304, and 9306 are not shown, the surfaces of the insulating layers 9204, 9304, and 9306 are not limited to be flat. Their surfaces may be uneven.

Note that by making the surface of the reflective electrode be very uneven, light can be diffused. As a result, luminance of the display device can be improved. Therefore, the reflective electrode and the transparent electrode (the electrode 9305 in a liquid crystal element and the electrode 9104 in a liquid crystal element) shown in FIGS. 96 to 101 may have uneven surfaces.

Note that the uneven surface preferably has a shape with which light can be diffused as easily as possible.

In the transmissive portion 1002, the transparent electrode desirably does not have unevenness so as not to affect application of an electrical field to the liquid crystal layer. Note that even if there is unevenness, there is no problem if display is not affected.

Note that as in the case of FIGS. 78 to 86, in which the reflective electrode may have an uneven surface as shown in FIGS. 87 to 92, the reflective electrode in FIGS. 96 to 101 may have an uneven surface. FIG. 102 shows a case where the reflective electrode in FIG. 96 has unevenness. Similarly, the reflective electrode in FIGS. 97 to 101 may have unevenness.

The description of FIG. 96 where the surface of the reflective electrode is not uneven can be applied to FIG. 102.

Figure 102:
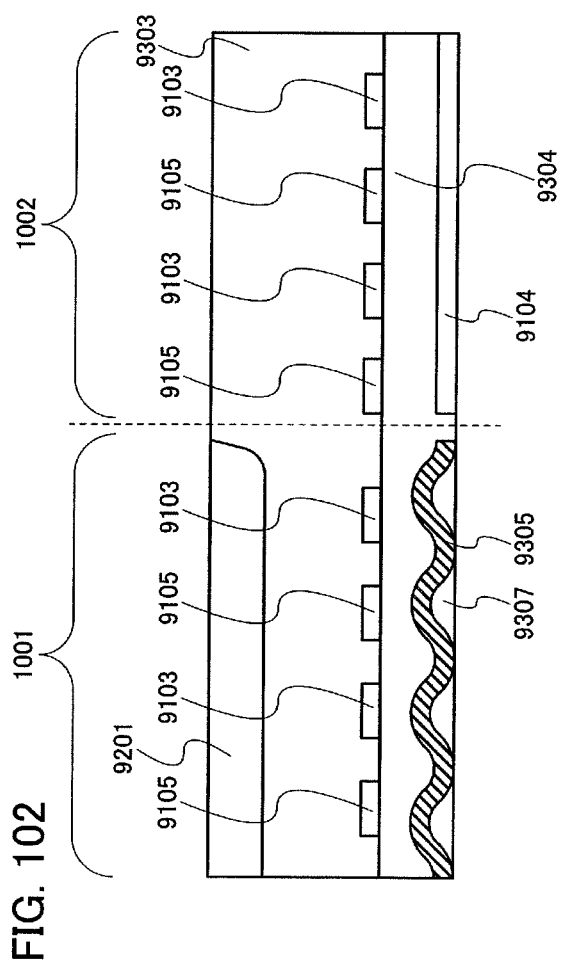

FIG. 102 shows an example of a liquid crystal display device which is different from that shown in FIG. 96 in that the insulating layer 9201 for adjusting the thickness of the liquid crystal layer 9303 is provided on another side of the liquid crystal layer 9303 than a side of which the electrode 9103 in a liquid crystal element is provided, and the electrode 9103 in a liquid crystal element is formed over the insulating layer 9304.

Figure 103:
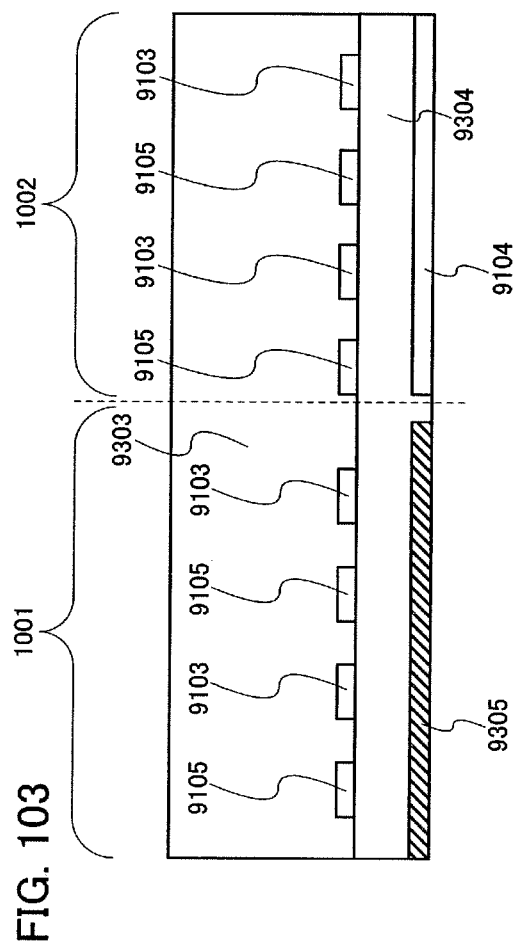
FIG. 103 is a cross-sectional view of a liquid crystal display device of the present invention.

In FIGS. 78 to 102, there are cases where the film for adjusting the thickness of the liquid crystal layer 9303 is placed on the substrate side where the electrode 9103 in a liquid crystal element is provided or the counter substrate side, but it is not limited thereto. The film for adjusting the thickness of the liquid crystal layer 9303 itself is not necessarily formed, as shown in FIG. 103. FIG. 103 corresponds to FIGS. 78 and 96. Besides in the cases shown in FIGS. 78 and 96, the film for adjusting the thickness of the liquid crystal layer 9303 itself is not necessarily formed in the cases shown in FIGS. 79 to 95 and 97 to 102.

When the film for adjusting the thickness of the liquid crystal layer 9303 itself is not provided, a distance traveled by light in the liquid crystal layer in the reflective portion is different from that in the transmissive portion. Therefore, it is desirable to provide, for example, a retardation film (such as a quarter-wave plate) or a material with refractive index anisotropy (such as liquid crystal) in a light path so as to change a polarization state of light. For example, if a retardation film is provided between the counter substrate and the polarizing plate on the side of the counter substrate on which the liquid crystal layer is not provided, the light transmission state can be the same in the reflective portion and the transmissive portion.

Although the electrodes 9103 in a liquid crystal element may be formed in the same plane in the transmissive portion 1002 in FIGS. 78 to 103 and the foregoing description, it is not limited thereto. The 9103 electrodes in a liquid crystal element may be formed on different planes.

Although the electrodes 9105 in a liquid crystal element may be formed in the same plane in the transmissive portion 1002 in FIGS. 78 to 103 and the foregoing description, it is not limited thereto. The electrodes 9105 in a liquid crystal element may be formed on different planes.

Although the electrodes 9103 in a liquid crystal element may be formed in the same plane in the reflective portion 1001, in FIGS. 78 to 103 and the foregoing description it is not limited thereto. The electrodes 9103 in a liquid crystal element may be formed on different planes.

Although the electrodes 9105 in a liquid crystal element may be formed in the same plane in the reflective portion 1001, in FIGS. 78 to 103 and the foregoing description it is not limited thereto. The electrodes 9105 in a liquid crystal element may be formed on different planes.

Although the electrodes 9305 and 9104 in a liquid crystal element in the reflective portion 1001 may be formed to be plain-shaped in FIGS. 78 to 103 and the foregoing description, it is not limited thereto. The electrodes 9305 and 9104 in a liquid crystal element may be formed to have a comb-shape, a slit, or an aperture.

Although the electrode 9104 in a liquid crystal element in the transmissive portion 1002 may be formed to be plain-shaped in FIGS. 78 to 103 and the foregoing description, it is not limited thereto. The electrode 9104 in a liquid crystal element may be formed to have a comb-shape, a slit, or an aperture.

Although the electrodes 9305 and 9104 in a liquid crystal element may be formed below the electrode 9103 in a liquid crystal element in the reflective portion 1001 in FIGS. 79 to 104 and the foregoing description, it is not limited thereto. If the electrodes 9305 and 9104 in a liquid crystal have a comb-shape, a slit, or an aperture, they may be formed in the same level as the electrode 9103 in a liquid crystal element or over the electrode 9103 in a liquid crystal element.

Although the electrodes 9305 and 9104 in a liquid crystal element may be formed below the electrode 9105 in a liquid crystal element in the reflective portion 1001 in FIGS. 78 to 103 and the foregoing description, it is not limited thereto. If the electrodes 9305 and 9104 in a liquid crystal element have a comb-shape, a slit, or an aperture, they may be formed in the same level as the electrode 9105 in a liquid crystal element or over the electrode 9105 in a liquid crystal element.

Although the electrodes 9305 and 9104 in a liquid crystal element may be formed below the electrode 9103 in a liquid crystal element in the transmissive portion 1002 in FIGS. 78 to 103 and the foregoing description, it is not limited thereto. If the electrodes 9305 and 9104 in a liquid crystal element have a comb-shape, a slit, or an aperture, they may be formed in the same level as the electrode 9103 in a liquid crystal element or over the electrode 9103 in a liquid crystal element.

Although the electrodes 9305 and 9104 in a liquid crystal element may be formed below the electrode 9105 in a liquid crystal element in the transmissive portion 1002 in FIGS. 78 to 103 and the foregoing description, it is not limited thereto. If the electrodes 9305 and 9104 in a liquid crystal element have a comb-shape, a slit, or an aperture, they may be formed in the same level as the electrode 9105 in a liquid crystal element or over the electrode 9105 in a liquid crystal element.

Note that in the foregoing structure such as structures shown in FIGS. 78 to 103 and combination thereof, a color filter may be provided over the counter substrate which is provided over the liquid crystal layer 9303 or may be provided over the substrate over which the electrode 9103 in a liquid crystal element is provided.

For example, a color filter may be provided in the insulating layers 9304, 9204, 9306, and 9308 or as a part thereof.

Note that a black matrix may be provided in a similar manner to a color filter. Needless to say, both a color filter and a black matrix may be provided.

Thus, if the insulating layer serves as the color filter or the black matrix, a material cost can be reduced.

When the color filter or the black matrix is placed over the substrate over which the electrode 9103 in a liquid crystal element is provided, a margin of arrangement of the counter substrate is enhanced.

Note that a variety of positions, kinds, and shapes of the electrode in a liquid crystal element, and positions and shapes of the insulating layer can be employed. That is, a position of the electrode in a liquid crystal element in one drawing and a position of the insulating layer in another drawing can be combined so as to make many variations. For example, the example shown in FIG. 88 is formed by changing the shape of the electrode 9305 in a liquid crystal element in FIG. 79 to have an uneven shape. For another example, the position and the shape of the electrode 9104 in a liquid crystal element in FIG. 79 are changed, so that the example shown in FIG. 87 is formed. In the foregoing drawings, each part in each drawing can be combined with the corresponding part in another drawing; therefore, enormous numbers of variations can be formed.

Embodiment Mode 3

In Embodiment Modes 1 and 2, a description is made of a case where the reflective portion and the transmissive portion are provided, that is, the case where a semi transmissive liquid crystal display device is provided, but it is not limited thereto.

When one of the electrodes 9305 and 9104 in a liquid crystal element is removed and the other is provided over the whole surface, a reflective or a transmissive liquid crystal display device can be formed.

When the electrode 9305 in a liquid crystal element is removed and the electrode 9104 in a liquid crystal element is provided over the whole surface, a transmissive liquid crystal element is formed. When the transmissive liquid crystal display device is used indoors, bright and beautiful display can be conducted since an aperture ratio thereof is high.

When the electrode 9104 in a liquid crystal element is removed and the electrode 9305 in a liquid crystal element is provided over the whole surface, a reflective liquid crystal display device is formed. When the reflective liquid crystal display device is used outdoors, clear display can be conducted since reflectance thereof is high; therefore, a display device with low power consumption can be realized. When the reflective liquid crystal display device is used indoors, display can be conducted by providing a front light over a display portion.

When the liquid crystal display device is used as a reflective liquid crystal display device or transmissive liquid crystal display device, a distance traveled by light does not vary in one pixel. Therefore, the insulating layer 9204 for adjusting the thickness of the liquid crystal layer (cell gap) is not required.

Figure 104:
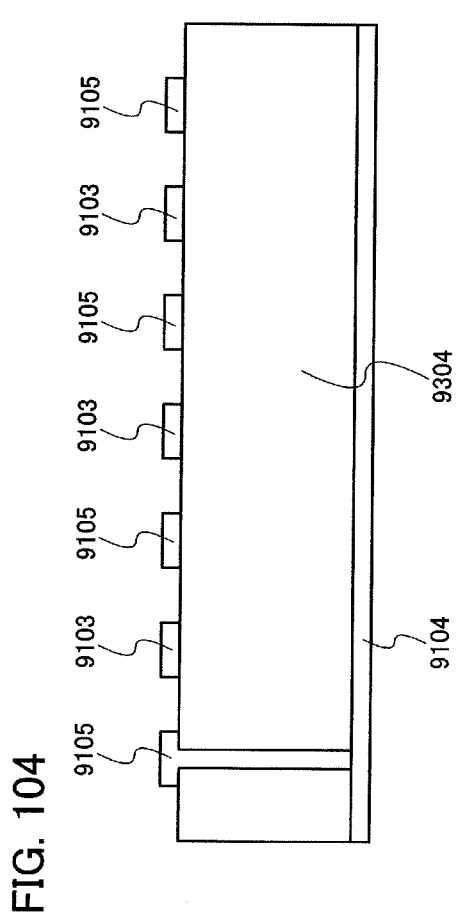
FIG. 104 is a cross-sectional view of a liquid crystal display device of the present invention.
Figure 105:
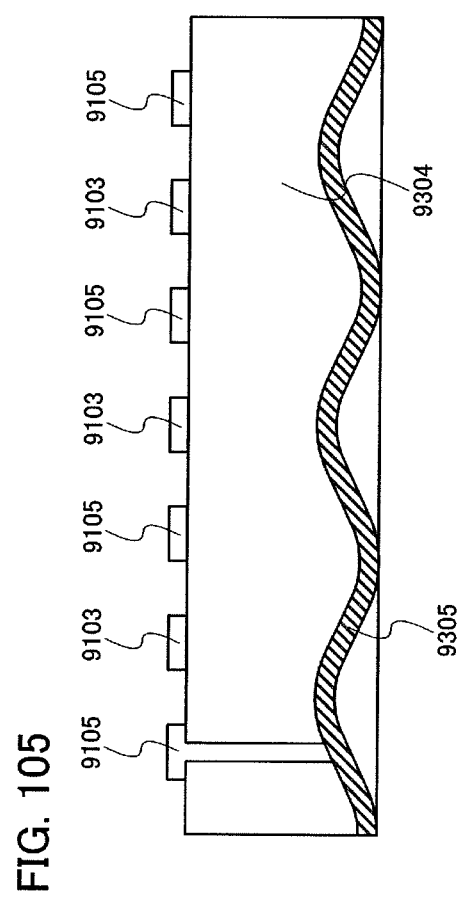
FIG. 105 is a cross-sectional view of a liquid crystal display device of the present invention.

FIG. 104 shows an example where the liquid crystal display device shown in FIG. 78 is transmissive. FIG. 105 shows an example where the liquid crystal display device shown in FIG. 87 is reflective.

As shown in FIGS. 104 and 105, a contact hole may be formed in the insulating layer 9304 so that the electrodes 9305, 9104, and 9105 in a liquid crystal element are connected. Since those electrodes serve as the common electrodes, they are desirably connected electrically.

Note that the drawings and descriptions on FIGS. 77 to 103 can be applied to a transmissive or reflective liquid crystal display device, in a similar manner to FIGS. 104 and 105.

Note that the description in Embodiment Modes 1 and 2 can be applied to or combined with this embodiment mode.

Embodiment Mode 4

An example of an active matrix liquid crystal display device of the present invention is described.

In this embodiment mode, an example is described, where a structure described in Embodiment Modes 1 to 3 or a structure realized by combination of portions shown in the drawings therein is formed with a transistor.

Note that in the present invention, a transistor is not always required; therefore, the present invention can be applied to a display device without a transistor, that is, a so-called passive matrix display device.

In this embodiment mode, a case is described where a liquid crystal display device is transmissive and is controlled using a top gate transistor.

However, it is not limited thereto, and a bottom gate transistor may be used.

FIG. 1 shows a liquid crystal display device including a substrate 100 having an insulating surface (hereinafter referred to as an insulating substrate), over which a thin film transistor 102, a first electrode 103, a second electrode 104, and a third electrode 105 connected to the thin film transistor are formed. The first electrode 103 serves as a pixel electrode. The second electrode 104 serves as a common electrode. The third electrode 105 serves as a common electrode.

Note that a gate electrode is a part of a gate line. A portion of the gate line which serves as an electrode for switching the thin film transistor 102 is the gate electrode.

A common wire is a wire electrically connected to electrodes provided in a liquid crystal element and which is led so that electrodes in a liquid crystal element in a plurality of pixels provided in a liquid crystal display device have the same electric potential. The electrode in a liquid crystal element electrically connected to the common wire is called a common electrode in general. On the other hand, an electrode in a liquid crystal element whose electric potential changes as needed according to electric potential from a source line is called a pixel electrode in general.

The thin film transistor 102 is preferably formed over the insulating substrate 100 with a base layer 101 therebetween. By providing the base layer 101, entry of impurity elements from the insulating substrate 100 to the thin film transistor 102, especially to a semiconductor layer can be prevented. Silicon oxide, silicon nitride, or a stacked layer thereof can be used for the base layer 101. Silicon nitride is preferable because it can prevent the entry of the impurity effectively. On the other hand, silicon oxide is preferable because it does not cause trapping of electric charge or hysteresis of electric characteristics even if it is in contact with the semiconductor layer directly.

Although the thin film transistor 102 is a top gate type, it is not limited thereto. The thin film transistor 102 may be a bottom gate type.

The thin film transistor 102 includes the semiconductor layer 111 processed into a predetermined shape, a gate insulating layer 112 covering the semiconductor layer or provided over the semiconductor layer, a gate electrode 113 provided over the semiconductor layer with the gate insulating layer therebetween, and source and drain electrodes 116.

The gate insulating layer formed covering the semiconductor layer can prevent attachment or entry of an impurity to the semiconductor layer even if the semiconductor layer is exposed to atmosphere in a process. In addition, the gate insulating layer provided over the semiconductor layer can be processed using the gate electrode as a mask; therefore, the number of masks can be reduced. Thus, a shape of the gate insulating layer 112 can be decided according to the process or the like, and it may be that the gate insulating layer 112 is only formed below the gate electrode or may be formed over the whole surface. Alternatively, the gate insulating layer 112 may be provided so as to be thick below or in a vicinity of the gate electrode and be thin in another region.

In the semiconductor layer, an impurity region 114 is provided. The thin film transistor becomes an N-type or a P-type depending on conductivity of the impurity region. The impurity region can be formed by adding the impurity elements in a self-aligned manner using the gate electrode 113 as a mask. Note that another mask may be prepared and used.

In the impurity region, its concentration can be varied. For example, a low-concentration impurity region and a high-concentration impurity region can be provided. The low-concentration impurity region can be formed by making the gate electrode 113 have a tapered shape and by adding an impurity element in a self-aligned manner using such a gate electrode. Alternatively, the low-concentration impurity region can be formed by varying the thickness of the gate insulating layer 112 or making the gate electrode have a tapered shape. In addition, the concentration of the impurity region can be varied by forming a sidewall structure in the side surfaces of the gate electrode 113. A structure in which a low-concentration impurity region and a high-concentration impurity region are provided is called an LDD (Lightly Doped Drain) structure. A structure where low-concentration impurity region and a gate electrode are overlapped is called a GOLD (Gate-drain Overlapped LDD) structure. In such a thin film transistor including a low-concentration impurity region, short-channel effect which is generated as a gate length is shortened can be prevented. In addition, off-current can be reduced and concentration of an electrical field in the drain region can be suppressed; thereby improving reliability of the transistor.

The insulating layer 106 is provided to cover the semiconductor layer 111 and the gate electrode 113. The insulating layer 106 can have a single-layer structure or a stacked-layer structure. An inorganic material or an organic material can be used for the insulating layer 106. As an inorganic material, silicon oxide or silicon nitride can be used. As an organic material, polyimide, acrylic, polyamide, polyimide amide, a resist, benzocyclobutene, siloxane, or polysilazane can be used. Siloxane includes a skeleton structure formed by a bond of silicon (Si) and oxygen (O). An organic group containing at least hydrogen (such as an alkyl group or aromatic hydrocarbon) is used as a substituent. Alternatively, a fluoro group may be used as the substituent. Further alternatively, a fluoro group and an organic group including at least hydrogen may be used as the substituent. Note that polysilazane is formed using a polymer material having a bond of silicon (Si) and nitrogen (N) as a starting material. It is preferable to use an organic material for the insulating layer 106 since flatness of the surface thereof can be improved. When an inorganic material is used for the insulating layer 106, the surface thereof follows the shapes of the semiconductor layer or the gate electrode. In this case, the insulating layer 106 can be flat by being thickened.

An opening is formed in the insulating layer 106 to expose the impurity region. A conductive layer is formed in the opening to form source and drain electrodes 116. The conductive layer for the source and drain electrodes is formed of an element selected from tantalum (Ta), tungsten (W), titanium (Ti), molybdenum (Mo), aluminium (Al), chromium (Cr), silver (Ag), copper (Cu), neodymium (Nd), or the like;

an alloy material containing the element as a main component; or a conductive material such as metal nitride such as titanium nitride, tantalum nitride, or molybdenum nitride. The conductive layer can have a single-layer structure or a stacked-layer structure of those materials. The stacked-layer structure can reduce resistance thereof. Another electrode 117 or the like can be formed using the same conductive layer as the source and drain electrode.

An insulating layer 107 is formed covering the source and drain electrodes 116. The insulating layer 107 can be formed in a similar manner to the insulating layer 106. That is, if the insulating layer 107 is formed using an organic material, flatness thereof can be improved. Since the first electrode 103 and the third electrode 105 are formed over the insulating layer 107, it is desirable that flatness of the insulating layer 107 be high. The first electrode 103 and the third electrode 105 are provided for applying voltage to a liquid crystal material, and they need to be flat; therefore, the flatness of the insulating layer 107 is desirably high.

The first electrode 103 and the third electrode 105 are processed into a comb-shaped or processed to have a slit. The first electrode 103 and the third electrode 105 are alternately arranged. In other words, the first electrode 103 and the third electrode 105 may be processed so as to be able to be alternately arranged. A gap between the first electrode 103 and the third electrode 105 is 2 to 8 μm, preferably, 3 to 4 μm. Application of voltage to thus arranged first electrode 103 and third electrode 105 generates an electrical field therebetween. Accordingly, orientation of the liquid crystal material can be controlled. Thus generated electrical field has many components parallel to the substrate. Therefore, a liquid crystal molecule rotates in a plane approximately parallel to the substrate. Thus, transmission of light can be controlled.

The first electrode 103 and the third electrode 105 formed over the insulating layer 107 are formed of a conductive martial such as an element selected from tantalum (Ta), tungsten (W), titanium (Ti), molybdenum (Mo), aluminium (Al), chromium (Cr), silver (Ag), or the like; or an alloy material containing the element as a main component. When the first electrode 103 and the third electrode 105 need to be transparent, a transparent conductive material such as indium tin oxide (ITO), indium zinc oxide (IZO), indium tin oxide containing silicon oxide (ITSO), zinc oxide (ZnO), or silicon (Si) containing phosphorus or boron can be used.

Then, the second electrode 104 is described. The second electrode 104 is provided over the base layer 101 or the gate insulating layer 112. The second electrode 104 is formed over one pixel region. Specifically, the second electrode 104 is formed over one pixel region except a thin film transistor forming region. In other words, unlike the comb-shaped third electrode 105, the second electrode 104 is provided over one pixel region, in other words, a region below the comb-shaped third electrode 105 and the first electrode 103. That is, the second electrode 104 is provided to be plain-shaped. The second electrode 104 is formed over one pixel region and the shape thereof is not limited. For example, the second electrode 104 may be formed over the whole surface of one pixel region, or may be formed over one pixel region to be comb-shaped or may include a slit or hole.

The second electrode 104 is formed of a conductive martial such as tantalum (Ta), tungsten (W), titanium (Ti), molybdenum (Mo), aluminium (Al), chromium (Cr), silver (Ag), indium tin oxide (ITO), indium zinc oxide (IZO), indium tin oxide containing silicon oxide (ITSO), zinc oxide (ZnO), or silicon (Si) containing phosphorus or boron. The second electrode 104 can be formed in the same layer as the semiconductor layer 111; therefore the semiconductor layer may be used for the second electrode 104. However, note that since the second electrode 104 needs to be conductive, a crystallized semiconductor layer, a semiconductor layer doped with an impurity element, or crystallized semiconductor layer doped with an impurity element is used.

In that case, the semiconductor layer in the thin film transistor 102 and the second electrode 104 formed by the semiconductor layer are desirably formed at the same time. As a result, the process can be simplified and the cost can be reduced.

The second electrode 104 is electrically connected to the third electrode 105 with the electrode 117 therebetween.

When a transmissive liquid crystal display device is formed, the second electrode 104 and the third electrode 105 are formed of a transparent conductive material such as indium tin oxide (ITO), indium zinc oxide (IZO), indium tin oxide containing silicon oxide (ITSO), zinc oxide (ZnO), or silicon (Si) containing phosphorus or boron. Those transparent materials have high resistance compared with another conductive material such as Al. Therefore, the electrode 117 formed of a conductive material with low resistance such as tantalum (Ta), tungsten (W), titanium (Ti), molybdenum (Mo), aluminium (Al), chromium (Cr), or silver (Ag); or a wire formed at the same time as the gate electrode 113 can be used for connecting the second electrode 104 and the third electrode 105, whereby the electrode 117 and the wire can serve as an auxiliary electrode or auxiliary wire of the second electrode 104 and the third electrode 105. As a result, uniform voltage can be applied to the second electrode 104 and the third electrode 105, which means that voltage drop caused by resistance of the electrodes can be prevented in the second electrode 104 and the third electrode 105.

At this time, it is desirable to use a conductive layer formed at the same time as the gate electrode 113 as the auxiliary wire. In that case, the auxiliary wire is desirably placed so as to be approximately parallel to the gate wire, whereby an efficient layout can be achieved.

When voltage is applied to such second electrode 104 and the comb-shaped first electrode 103, an electrical field is also generated therebetween. That is, electrical fields generate between the second electrode 104 and the first electrode 103 and between the comb-shaped third electrode 105 and the first electrode 103. Tilting and rotation angle of the liquid crystal material are controlled according to the electrical field between the two pair of electrodes, whereby the gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes. Specifically, by providing the second electrode 104, the tilting of the liquid crystal material right above the comb-shaped third electrode 105 or comb-shaped first electrode 103 can be sufficiently controlled, though it has not been possible to sufficiently control the tilting thereof. This is because in addition to the direction of the electrical field generated between the comb-shaped third electrode 105 and the comb-shaped first electrode 103, an electrical field is generated between the second electrode 104 and the comb-shaped first electrode 103. Thus, the tilting of the liquid crystal material can be sufficiently controlled by providing plural pairs of electrodes so as to generate plural directions of electrical fields therebetween.

Note that the substrate provided so as to face the insulating substrate 100 may have a light-shielding layer which is overlapped with a transistor. The light-shielding layer is formed of, for example, a conductive material such as tungsten, chromium, or molybdenum; silicide such as tungsten silicide; or a resin material containing black pigment or carbon black. In addition, a color filter is provided so as to overlap with the comb-shaped first electrode 103 and the comb-shaped third electrode 105. An alignment film is further provided over the color filter The liquid crystal layer is provided between the insulating substrate 100 and the counter substrate. A polarizing plate is provided over each of the insulating substrate 100 and the counter substrate. Each of the polarizing plates are provided over another side of the insulating substrate 100 and the counter substrate which is different from the side where the liquid crystal layer is provided.

Note that this embodiment mode shows an example where the descriptions in Embodiment Modes 1 to 3 are realized together with a transistor. Therefore, the descriptions in Embodiment Modes 1 to 3 can be applied to or combined with this embodiment mode.

Embodiment Mode 5

In this embodiment mode, a structure of the liquid crystal display device which is different from that described in the foregoing embodiment modes in that the common electrode is provided in the same layer as the source and drain electrode in the thin film transistor is described.

Note that a bottom gate transistor may be employed.

Figure 2:
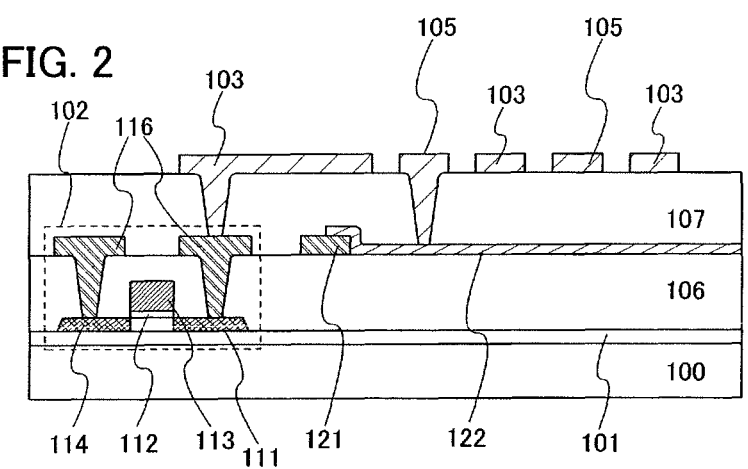
FIG. 2 is a cross-sectional view of a liquid crystal display device of the present invention.

As shown in FIG. 2, a common electrode 122 is provided over the insulating layer 106 to be in contact with a wire 121. The common electrode 122 can be formed similarly to the second electrode 104 in the foregoing Embodiment Mode 4.

As in FIG. 1, the comb-shaped third electrodes 105 and the comb-shaped first 103 are provided over the insulating layer 107 and the third electrode 105 is connected to the common electrode 122 through an opening provided in the insulating layer 107.

The common electrode 122 is provided in contact with the wire 121 and the third electrode 105 is electrically connected to the wire 121 as well. Therefore, when the common electrode 122 and the third electrode 105 are formed of a conductive material with high resistance compared to Al or the like, such as indium tin oxide (ITO), indium zinc oxide (IZO), indium tin oxide containing silicon oxide (ITSO), zinc oxide (ZnO), or silicon (Si) containing phosphorus or boron, the wire 121 formed of Al or the like or a wire formed at the same time as the gate electrode 113 can serve as an auxiliary wire of the common electrode 122 and the third electrode 105. As a result, as described above, voltage drop caused by wire resistance of the common electrode 122 and the third electrode 105 can be prevented.

At this time, it is desirable to use a conductive layer formed at the same time as the gate electrode 113 as the auxiliary wire. In that case, the auxiliary wire is desirably placed so as to be approximately parallel to the gate wire, whereby an efficient layout can be achieved.

The description of other structures is omitted because it is similar to that of FIG. 1.

When voltage is applied to such common electrode 122 and the comb-shaped first electrode 103, an electrical field is also generated therebetween. That is, electrical fields generate between the common electrode 122 and the first electrode 103 and between the comb-shaped third electrode 105 and the first electrode 103. Tilting of the liquid crystal material is controlled according to the electrical field between the two pair of electrodes, whereby the gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes. Specifically, by providing the common electrode 122, the tilting of the liquid crystal material right above the comb-shaped third electrode 105 or comb-shaped first electrode 103 can be sufficiently controlled, though it has not been possible to sufficiently control the tilting thereof.

Thus, the tilting of the liquid crystal material can be sufficiently controlled by providing plural pairs of electrodes so as to generate plural directions of electrical fields therebetween. In addition, in this embodiment mode, since the common electrode 122 is formed over the insulating layer 106, the distance between the common electrode 122 and the first electrode 103 becomes shorter, whereby voltage to be applied can be reduced.

Note that this embodiment mode shows an example where the descriptions in Embodiment Modes 1 to 3 are realized together with a transistor and which is a modification of that in Embodiment Mode 4. Therefore, the descriptions in Embodiment Modes 1 to 4 can be applied to or combined with this embodiment mode.

Embodiment Mode 6

In this embodiment mode, a structure of the liquid crystal display device which is different from that described the foregoing embodiment mode in that the common electrode is provided over the base layer 101 is described.

Figure 3:
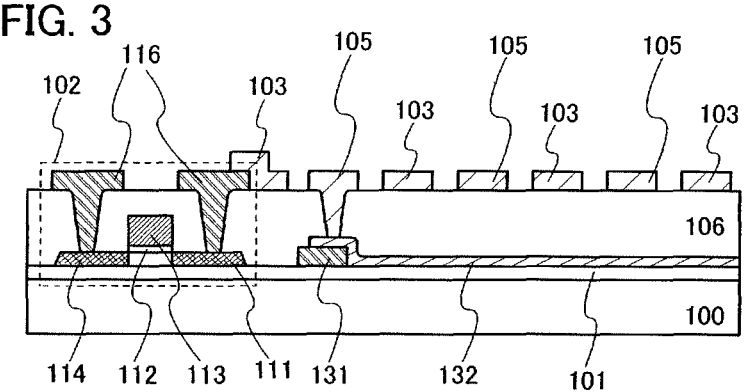
FIG. 3 is a cross-sectional view of a liquid crystal display device of the present invention.

As shown in FIG. 3, the base layer 101 is provided over the insulating substrate 100 and a common electrode 132 is formed thereover. The common electrode 132 can be formed similarly to the second electrode 104 in the foregoing Embodiment Mode. The insulating layer 106 is provided over the common electrode 132 and the common electrode 132 is connected to the third electrode 105 through an opening provided in the insulating layer 106. Therefore, when the common electrode 132 and the third electrode 105 are formed of a conductive material with high resistance compared to Al or the like, such as indium tin oxide (ITO), indium zinc oxide (IZO), indium tin oxide containing silicon oxide (ITSO), zinc oxide (ZnO), or silicon (Si) containing phosphorus or boron, a wire 131 formed of Al or the like can serve as an auxiliary wire or wire. As a result, as described above, voltage drop caused by wire resistance of the common electrode 132 and the third electrode 105 can be prevented. The wire 131 can be formed by the same conductive layer as the gate electrode 113. In that case, the auxiliary wire is desirably placed so as to be approximately parallel to the gate wire, whereby an efficient layout can be achieved.

Note that a bottom gate transistor may be employed in this embodiment mode.

The description of other structures is omitted because it is similar to that of FIG. 1.

When voltage is applied to such common electrode 132 and the comb-shaped first electrode 103, an electrical field is also generated therebetween. That is, electrical fields generate between the common electrode 132 and the first electrode 103 and between the comb-shaped third electrode 105 and the first electrode 103. Tilting of the liquid crystal material is controlled according to the electrical field between the two pair of electrodes, whereby the gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes. Specifically, by providing the common electrode 132, the tilting of the liquid crystal material right above the comb-shaped third electrode 105 or comb-shaped first electrode 103 can be sufficiently controlled, though it has not been possible to sufficiently control the tilting thereof.

Thus, the tilting of the liquid crystal material can be sufficiently controlled by providing plural pairs of electrodes so as to generate plural directions of electrical fields therebetween. In addition, in this embodiment mode, since the common electrode 122 is formed over the base layer 101, the insulating layer 106 can serve as a single-layer structure as it is. As a result, the distance between the common electrode 132 and the first electrode 103 becomes shorter, whereby voltage to be applied can be reduced.

Note that this embodiment mode shows an example where the descriptions in Embodiment Modes 1 to 3 are realized together with a transistor and which is a modification of that in Embodiment Mode 4 or 5. Therefore, the descriptions in Embodiment Modes 1 to 5 can be applied to or combined with this embodiment mode.

Embodiment Mode 7

In this embodiment mode, a structure of the liquid crystal display device which is different from that described in the foregoing embodiment mode in that an amorphous semiconductor layer is used as the semiconductor layer in the thin film transistor is described.

Figure 4:
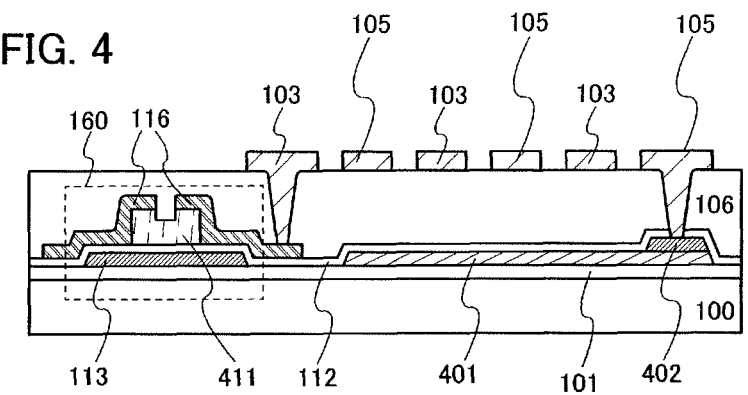
FIG. 4 is a cross-sectional view of a liquid crystal display device of the present invention.

As shown in FIG. 4, a thin film transistor 160 including an amorphous semiconductor layer is formed over the base layer 101. The thin film transistor 160 is a so-called bottom gate type in which a semiconductor layer is provided below a gate electrode.

The gate electrode 113 is formed over the base layer 101 and the gate insulating layer 112 is formed so as to cover the gate electrode 113. An amorphous semiconductor layer 411 is formed over the gate electrode with the gate insulating layer 112 therebetween. The amorphous semiconductor layer 411 can be formed of a material containing silicon.

The source and drain electrodes 116 are formed to cover both edges of the amorphous semiconductor layer 411. In order to reduce wire resistance, an N-type impurity region is preferably formed in a region in the amorphous semiconductor layer, which is in contact with the source and drain electrodes. The N-type impurity region can be formed by adding an impurity to the surface of the amorphous semiconductor layer 411.

After that, the amorphous semiconductor layer 411 is processed into a predetermined shape using the source and drain electrodes. At this time, a portion over a channel forming region in the semiconductor layer in the thin film transistor 160 is removed by etching. A thin film transistor with such a structure is called a channel etched thin film transistor.

The insulating layer 106 is formed to cover the thin film transistor 160 formed in this manner. The use of an organic material for the insulating layer 106 can improve flatness of the surface thereof. Needles to say, an inorganic material can be used for the insulating layer 106 or a stacked-layer structure including an inorganic material and an organic material can be used. An opening is formed in the insulating layer 106 to expose the source and drain electrodes 116, whereby the first electrode 103 formed over the insulating layer 106 and the source and drain electrodes 116 are electrically connected. The first electrode 103 is formed to be comb-shaped over the insulating layer 106 as in the foregoing embodiment mode.

Then, description is made of a structure of a common electrode 401. The common electrode 401 is formed over the base layer 101. The common electrode 401 can be formed like the second electrode 104 shown in the foregoing embodiment mode. The common electrode 401 has its shape processed so as to be formed over the pixel region. A conductive layer 402 is formed in a part of the processed common electrode 401. The conductive layer 402 can be obtained by processing the same conductive layer as the gate electrode 113 in the thin film transistor 160. The common electrode 401 and the conductive layer 402 are covered with the gate insulating layer 112.

An opening is provided in the insulating layer 106 and the gate insulating layer 112 to expose the conductive layer 402. Then, the comb-shaped third electrode 105 formed over the insulating layer 106 and the conductive layer 402 are electrically connected. As a result, the third electrode 105 and the common electrode 401 are connected. Here, the conductive layer 402 is connected to the common electrode 401 and the third electrode 105; therefore, the conductive layer 402 can serve as the auxiliary wire. Then, as described above, voltage drop caused by wire resistance of the common electrode 401 and the third electrode 105 can be prevented.

In this embodiment mode, since a bottom gate thin film transistor using an amorphous semiconductor layer is used, the whole thickness can be reduced compared to a top gate thin film transistor in the foregoing embodiment mode. In particular, compared with a structure including the stacked insulating layers 106 and 107, the whole thickness of the structure in this embodiment mode is thin since only the insulating layer 106 is employed. As a result, the liquid crystal display device can be thin and light weight.

Although the channel etched type is employed in this embodiment mode, a channel protective type may be employed. In the channel protective type, a protective layer is provided over the semiconductor layer and the source and drain electrodes are provided on both sides of the protective layer, in which the surface of the semiconductor layer is not removed when processing the semiconductor layer.

Note that a top gate transistor may be employed in this embodiment mode.

Note that this embodiment mode shows an example where the descriptions in Embodiment Modes 1 to 3 are realized together with a transistor and which is a modification of those in Embodiment Mode 4 to 6. Therefore, the descriptions in Embodiment Modes 1 to 6 can be applied to or combined with this embodiment mode.

Embodiment Mode 8

In this embodiment mode, a structure of the liquid crystal display device which is different from that described in the foregoing embodiment mode in that the conductive layer serving as the auxiliary wire is provided below the common electrode is described.

Figure 5:
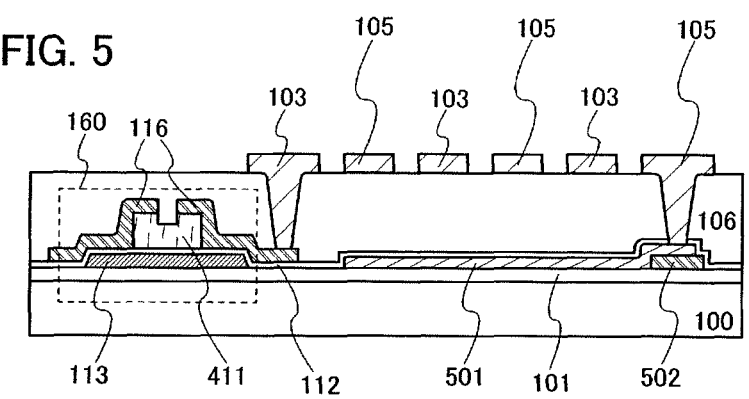
FIG. 5 is a cross-sectional view of a liquid crystal display device of the present invention.

As shown in FIG. 5, a conductive layer 502 is formed over the base layer 101 in advance. After that, a common electrode 501 is formed to be in contact with the conductive layer 502. The common electrode 501 can be formed similarly to the second electrode 104 in the foregoing embodiment mode. The conductive layer 502 can be obtained by processing the same conductive layer as the gate electrode 113 in the thin film transistor 160 or the same conductive layer as the source and drain electrodes 116. The conductive layer 502 and the common electrode 501 are covered with the insulating layer 106.

An opening is provided in the insulating layer 106 and the gate insulating layer 112 to expose the common electrode 501. Then, the comb-shaped third electrode 105 formed over the insulating layer 106 and the common electrode 501 are electrically connected. Here, the conductive layer 502 is connected to the common electrode 401 and the third electrode 105; therefore, the conductive layer 502 can serve as the auxiliary wire. Then, as described above, voltage drop caused by wire resistance of the common electrode 501 and the third electrode 105 can be prevented.

Description of other structures is omitted because it is similar to that of FIG. 4.

In this embodiment mode, a structure in which only the insulating layer 106 is employed, therefore, the whole thickness of the structure is thin compared to a structure including the stacked insulating layers 106 and 107. As a result, the liquid crystal display device can be thin and light weight.

Although the channel etched type thin film transistor is employed in this embodiment mode, a channel protective type thin film transistor may be employed as described in the foregoing embodiment mode.

Note that this embodiment mode shows an example where the descriptions in Embodiment Modes 1 to 3 are realized together with a transistor and which is a modification of those in Embodiment Modes 4 to 7. Therefore, the descriptions in Embodiment Modes 1 to 7 can be applied to or combined with this embodiment mode.

Embodiment Mode 9

In this embodiment mode, a structure of the liquid crystal display device which is different from that in foregoing Embodiment Mode 1 in that a color filter and a black matrix are provided is described.

Figure 6A:
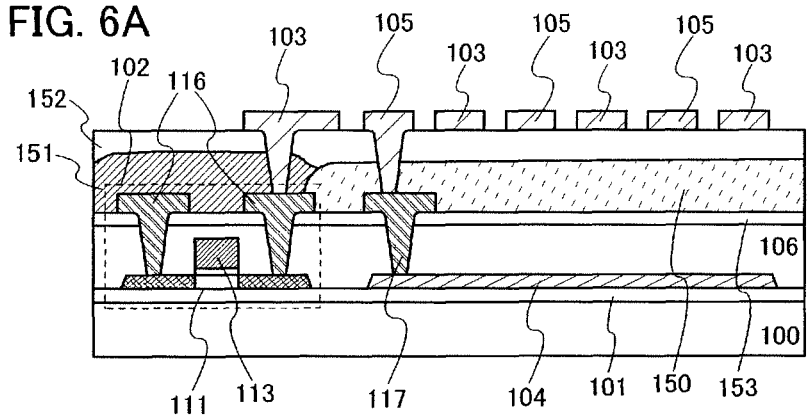
FIGS. 6A to 6C are cross-sectional views of a liquid crystal display device of the present invention.

As shown in FIG. 6A, in the structure of the liquid crystal display device shown in Embodiment Mode 1 (FIG. 1), a color filter 150 and a black matrix 151 are provided instead of the insulating layer 107. The color filter 150 and the black matrix 151 are provided so as to be partially overlapped with each other.

The color filter 150 is formed of a material with which predetermined colors can be exhibited. Red, green, and blue are generally used as the predetermined colors. Combination of these colors realizes full color display. On the other hand when conducting single color display, the color filter can be formed of a material with which one color of red, green, or blue, alternatively, orange or yellow can be exhibited. Single color display is suitable for displaying simple letters and figure and may be used for a display screen of a car audio or portable audio device.

The black matrix 151 is provided to prevent the thin film transistor 102 from being irradiated with light, suppress reflection of an electrode included in the thin film transistor 102, prevent light from leaking in a portion where the liquid crystal molecule is not controlled by an image signal, and divide one pixel. The black matrix 151 is acceptable as long as it exhibits black and may be formed using a conductive layer containing chromium or an organic material containing pigment or black carbon. In addition, the black matrix 151 can be formed of a dyed organic material such as acrylic or polyimide can be used.

Note that the black matrix 151 is desirably formed of a nonconductive material so as not to affect application of an electrical field.

When providing the color filter 150 and the black matrix 151, it is desirable that the insulating layer 106 have a stacked-layer structure and an insulating layer be formed of an inorganic material and an organic material formed as an upper layer thereof. The color filter 150 and the black matrix black matrix 151 are often formed of an organic material and these materials contain impurity elements which is not favorable to electric characteristics of the thin film transistor. It is desirable to form the insulating layer to prevent entry of the impurity elements to the semiconductor layer 111 in the thin film transistor.

Therefore, silicon nitride is preferable as an inorganic material for forming the insulating layer. Such an insulating layer is also called a passivation layer. The passivation layer is not limited to be provided over the insulating layer 106 having a stacked-layer structure. It is acceptable as long as the passivation layer is provided between the semiconductor layer 111, and the color filter 150 and the black matrix 151. For example, the passivation layer may be provided as a lower layer of the insulating layer 106 having a stacked-layer structure.

Note that an inorganic material such as silicon nitride may be deposited before forming the color filter 150 and the black matrix 151.

After that, an insulating layer 152 is formed to cover the color filter 150 and the black matrix 151. The insulating layer 152 flattens the surface. In particular, in a region where the color filter 150 and the black matrix 151 are overlapped with each other, a step formed because of the thickness of the black matrix 151 can be flattened by the insulating layer 152.

Description of other structures is omitted because it is similar to that of FIG. 1.

Figure 6B:
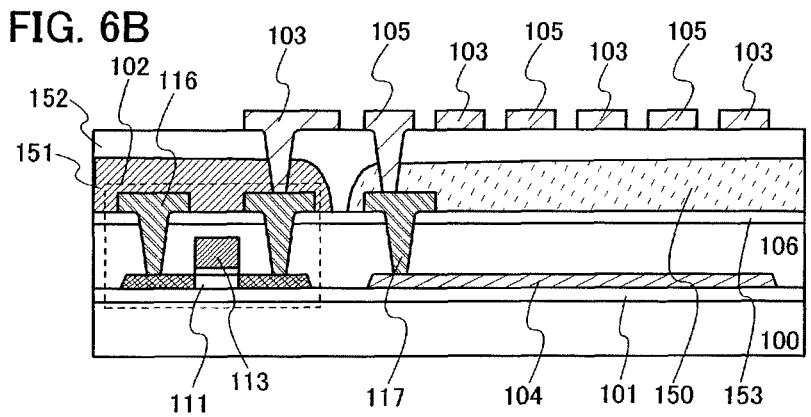

A structure shown in FIG. 6B is different from that shown in FIG. 6A in that the color filter 150 and the black matrix 151 are provided so as not to overlap with each other. The color filter 150 is provided proactively in a region where light is transmitted and the black matrix 151 is proactively provided in a region including the thin film transistor 102. As a result, with a boundary of a boundary region of the thin film transistor 102 and the second electrode 104, the color filter 150 is formed in a region in which the second electrode 104 is formed and the black matrix 151 is formed in a region in which the thin film transistor 102 is formed. Then, the insulating layer 152 is formed to cover the color filter 150 and the black matrix 151.

It is preferable to provide the color filter 150 and the black matrix 151 without them overlapping with each other since the whole thickness is increased in the region where they are overlapped.

Description of other structures is omitted because it is similar to that of FIG. 6A.

Figure 6C:
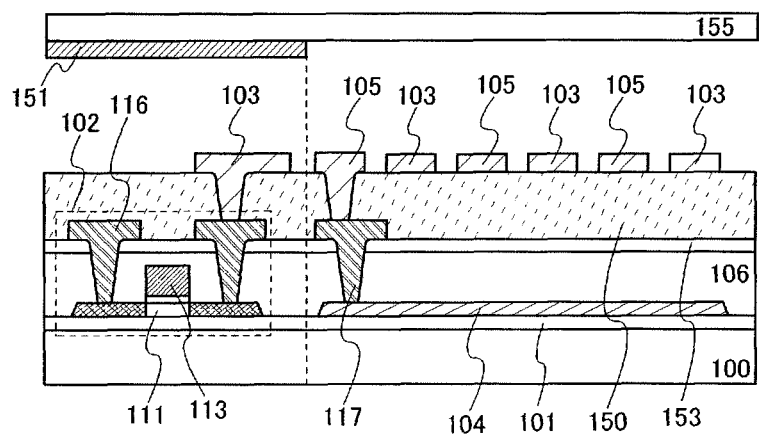

A structure shown in FIG. 6C is different from those in FIGS. 6A and 6B in that the black matrix 151 is provided on the counter substrate 155. A region where the black matrix 151 is provided is not limited as long as it is over the thin film transistor 102.

In this case, color filters of different colors in neighboring pixels may be arranged to overlap with each other. In a region where the color filters are stacked can serve as the black matrix since its transmittance is reduced.

When the black matrix 151 is provided to the counter substrate 155, the color filter 150 can be formed over the thin film transistor 102 and the second electrode 104. As described above, the color filter 150 is formed using an organic material; therefore, the color filter 150 also serves as a flattening film.

That is, the color filter 150 can be provided instead of an insulating layer 107, and the surface of the color filter 150 can be flattened.

Note that the black matrix 151 may be provided on a rear surface side of the insulating substrate 100.

Note that the black matrix may be provided on the insulating substrate 100 side and the color filter is formed on the counter substrate side. By providing the black matrix on the insulating substrate 100 side, margin of arrangement in substrates can be improved.

Description of other structures is omitted because it is similar to that of FIG. 6A.

In this embodiment mode, as in Embodiment Mode 1, when voltage is applied to the second electrode 104 and the comb-shaped first electrode 103, an electrical field is generated therebetween. Therefore, tilting of the liquid crystal material can be controlled, whereby gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 8. Therefore, the descriptions in Embodiment Modes 1 to 8 can be applied to or combined with this embodiment mode.

Embodiment Mode 10

In this embodiment mode, a structure of the liquid crystal display device which is different from that in foregoing Embodiment Mode 1 in that the color filter 150 and the black matrix 151 are provided instead of the insulating layer 106 is described.

Figure 7A:
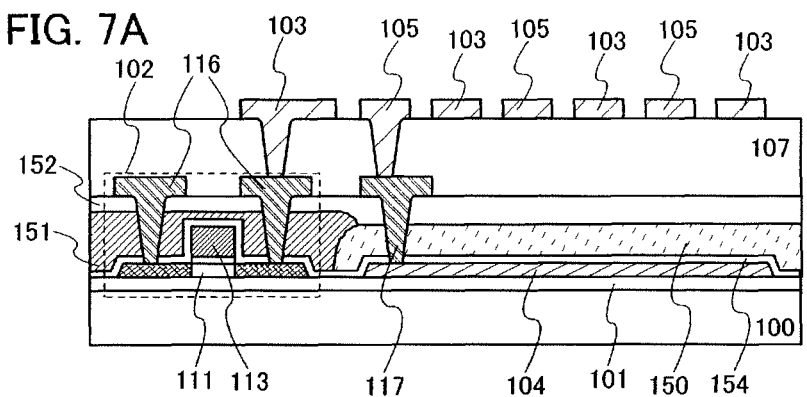
FIGS. 7A to 7C are cross-sectional views of a liquid crystal display device of the present invention.

As shown in FIG. 7A, in the structure of the liquid crystal display device shown in Embodiment Mode 1 (FIG. 1), the color filter 150 and the black matrix 151 are provided instead of the insulating layer 106. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In the case of providing the color filter 150 and the black matrix 151, a passivation layer is desirably provided between the color filter 150 and the black matrix 151, and the semiconductor layer 111 in the thin film transistor 102. In this embodiment mode, a passivation layer 154 is formed to cover the gate electrode 113 and the second electrode 104.

In such a structure where the color filter 150 and the black matrix 151 are provided instead of the insulating layer 106, the black matrix 151 is formed in a vicinity of the thin film transistor 102. Therefore, the structure is preferable since light emitted to the thin film transistor 102 is shielded effectively.

Description of other structures is omitted because it is similar to that of FIG. 6A.

Figure 7B:
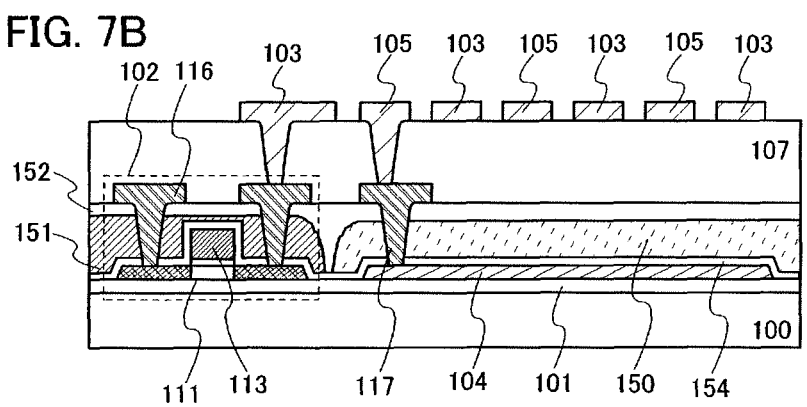

A structure shown in FIG. 7B is different from that in FIG. 7A in that the color filter 150 and the black matrix 151 are provided so as not to overlap with each other.

Description of other structures is omitted because it is similar to that of FIG. 6B.

Figure 7C:
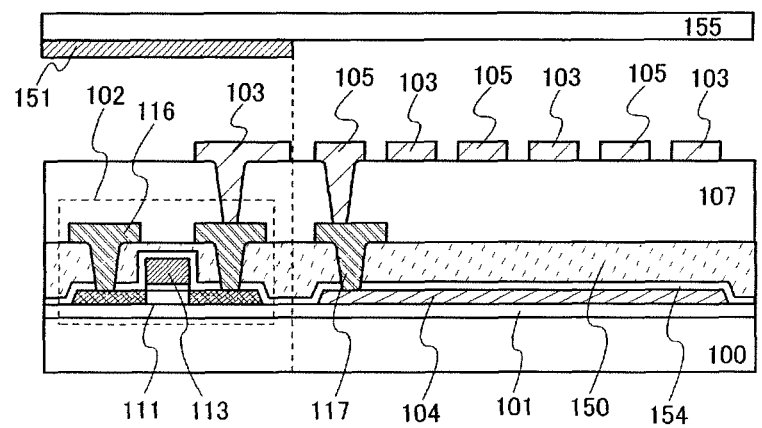

A structure shown in FIG. 7C is different from those in FIGS. 7A and 7B in that the black matrix 151 is provided on the counter substrate 155 side.

Description of other structures is omitted because it is similar to that of FIG. 7B.

In this embodiment mode, as in Embodiment Mode 1, when voltage is applied to the second electrode 104 and the comb-shaped first electrode 103, an electrical field is generated therebetween. Therefore, tilting of the liquid crystal material can be controlled, whereby gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 9. Therefore, the descriptions in Embodiment Modes 1 to 9 can be applied to or combined with this embodiment mode.

Embodiment Mode 11

In this embodiment mode, a structure of the liquid crystal display device which is different from that in foregoing Embodiment Mode 2 in that the color filter and the black matrix are provided is described.

Figure 8A:
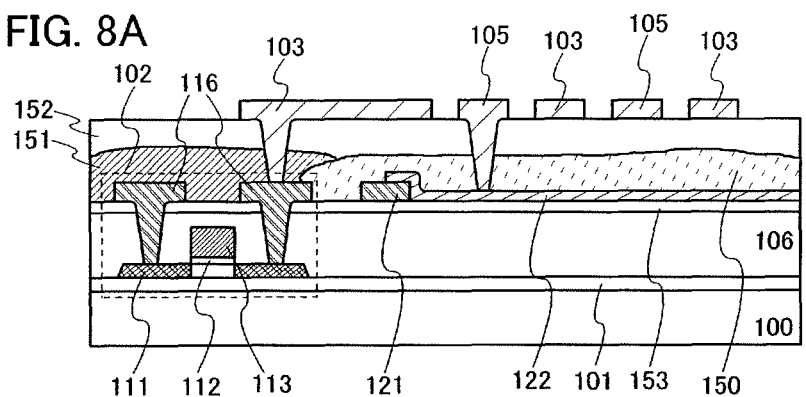
FIGS. 8A to 8C are cross-sectional views of a liquid crystal display device of the present invention.

As shown in FIG. 8A, in the structure of the liquid crystal display device shown in Embodiment Mode 2 (FIG. 2), the color filter 150 and the black matrix 151 are provided instead of the insulating layer 107. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In the case of providing the color filter 150 and the black matrix 151, a passivation layer is desirably provided between the color filter 150 and the black matrix 151, and the semiconductor layer 111 in the thin film transistor 102. In this embodiment mode, the insulating layer 106 has a stacked-layer structure and an upper layer thereof is a passivation layer 153 formed of an inorganic material. The passivation layer is not limited to be provided as the upper layer of the insulating layer 106 having a stacked-layer structure. It is acceptable as long as the passivation layer is provided between the semiconductor layer 111, and the color filter 150 and the black matrix 151. For example, the passivation layer may be provided as a lower layer of the insulating layer 106 having a stacked-layer structure.

Those structures of the color filter 150, the black matrix 151, the insulating layer 152, and the passivation layer 153 are similar to those shown in FIG. 6A. Description of other structures is omitted because it is similar to that of FIG. 2.

Figure 8B:
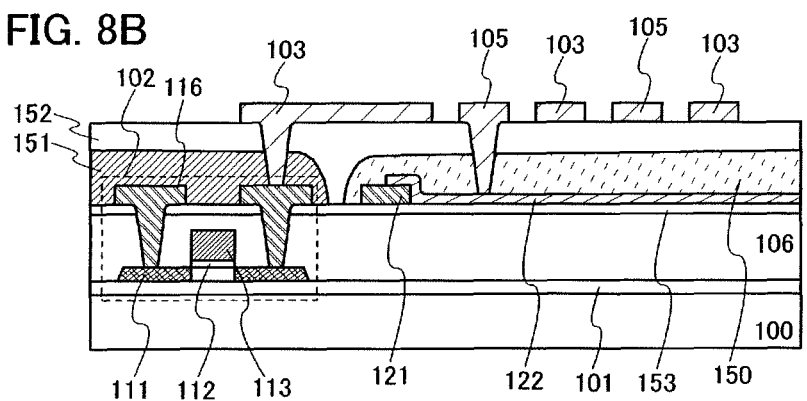

A structure shown in FIG. 8B is different from that in FIG. 8A in that the color filter 150 and the black matrix 151 are provided so as not to overlap with each other. Structures of the color filter 150 and the black matrix 151 which are not overlapped with each other is similar to those shown in FIG. 6B.

Description of other structures is omitted because it is similar to that of FIG. 8A.

Figure 8C:
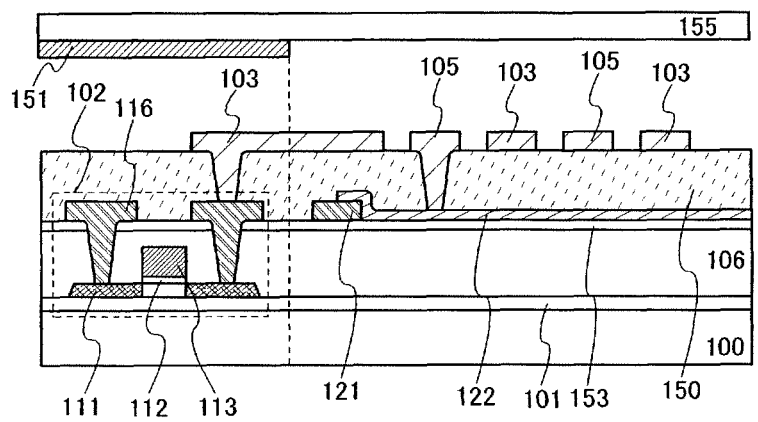

A structure shown in FIG. 8C is different from those shown in FIGS. 8A and 8B in that the black matrix 151 is provided on the counter substrate 155 side. A region where the black matrix 151 is provided is not limited as long as is over the thin film transistor 102.

When the black matrix 151 is provided to the counter substrate 155, the color filter 150 can be formed over the thin film transistor 102 and the second electrode 104. As described above, the color filter 150 is formed using an organic material; therefore, the color filter 150 also serves as a flattening film. That is, the color filter 150 can be provided instead of the insulating layer 107, and the surface of the color filter 150 can be flattened. Such a structure in which the black matrix 151 is provided on the counter substrate 155 side is similar to that shown in FIG. 6C.

Note that the black matrix 151 may be provided on the rear surface side of the insulating substrate 100.

Description of other structures is omitted because it is similar to that of FIG. 8A.

In this embodiment mode, as in Embodiment Mode 2, when voltage is applied to the common electrode 122 and the comb-shaped first electrode 103, an electrical field is generated therebetween. Therefore, tilting of the liquid crystal material can be controlled, whereby gray-scale display can be conducted. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 10. Therefore, the descriptions in Embodiment Modes 1 to 10 can be applied to or combined with this embodiment mode.

Embodiment Mode 12

In this embodiment mode, a structure of the liquid crystal display device which is different from that in foregoing Embodiment Mode 2 in that the color filter and the black matrix are provided instead of the insulating layer 106 is described.

Figure 9A:
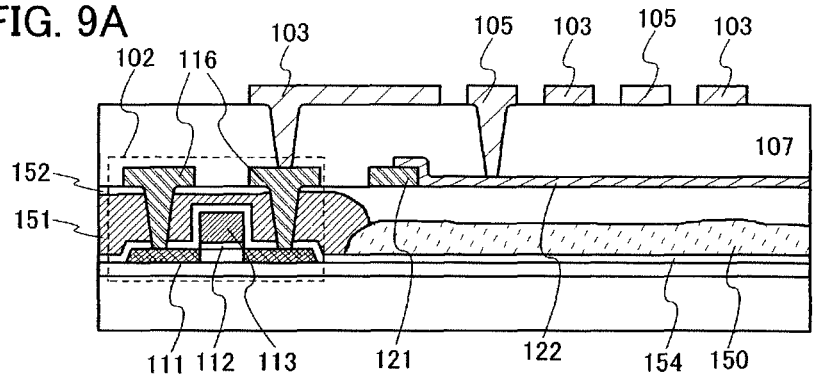
FIGS. 9A to 9C are cross-sectional views of a liquid crystal display device of the present invention.

As shown in FIG. 9A, in the structure of the liquid crystal display device shown in Embodiment Mode 2 (FIG. 2), the color filter 150 and the black matrix 151 are provided instead of the insulating layer 106. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In the case of providing the color filter 150 and the black matrix 151, a passivation layer is desirably provided between the color filter 150 and the black matrix 151, and the semiconductor layer 111 in the thin film transistor 102. In this embodiment mode, the passivation layer 154 is formed to cover the gate electrode 113 and the second electrode 104.

Such a structure of providing the color filter 150 and the black matrix 151 is similar to that shown in FIG. 7A. Description of other structures is omitted because it is similar to that of FIG. 2.

Figure 9B:
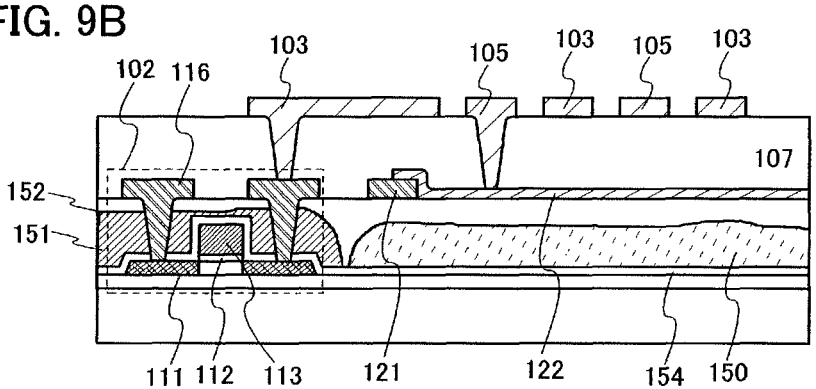

A structure shown in FIG. 9B is different from that in FIG. 9A in that the color filter 150 and the black matrix 151 are provided so as not to overlap with each other. Structures of the color filter 150 and the black matrix 151 which are not overlapped with each other is similar to those shown in FIG. 7B.

Description of other structures is omitted because it is similar to that of FIG. 9A.

Figure 9C:
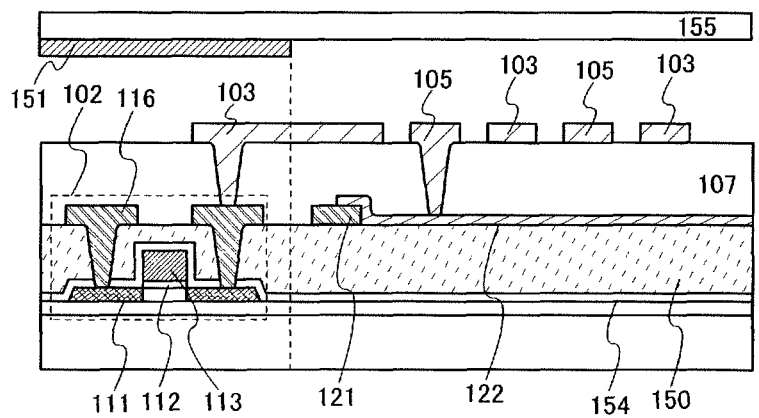

A structure shown in FIG. 9C is different from those in FIGS. 9A and 9B in that the black matrix 151 is provided on the counter substrate 155 side. A region where the black matrix 151 is provided is not limited as long as it is over the thin film transistor 102.

When the black matrix 151 is provided to the counter substrate 155, the color filter 150 can be formed over the thin film transistor 102 and the second electrode 104. As described above, the color filter 150 is formed using an organic material; therefore, the color filter 150 also serves as a flattening film. That is, the color filter 150 can be provided instead of the insulating layer 107, and the surface of the color filter 150 can be flattened. Such a structure in which the black matrix 151 is provided on the counter substrate 155 side is similar to that shown in FIG. 7C.

Note that the black matrix 151 may be provided on the rear surface side of the insulating substrate 100.

Description of other structures is omitted because it is similar to that of FIG. 9A.

In this embodiment mode, as in Embodiment Mode 2, when voltage is applied to the common electrode 122 and the comb-shaped first electrode 103, an electrical field is generated therebetween. Therefore, tilting of the liquid crystal material can be controlled so as to conduct gray-scale display. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 11. Therefore, the descriptions in Embodiment Modes 1 to 11 can be applied to or combined with this embodiment mode.

Embodiment Mode 13

In this embodiment mode, a structure of the liquid crystal display device which is different from that in foregoing Embodiment Mode 3 in that the color filter and the black matrix are provided instead of the insulating layer 106 is described.

Figure 10A:
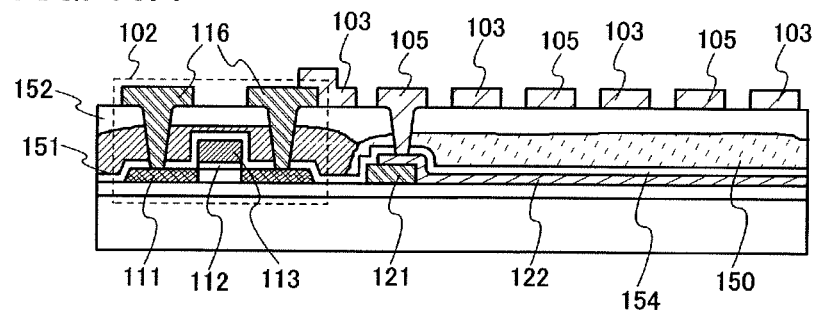
FIGS. 10A to 10C are cross-sectional views of a liquid crystal display device of the present invention.

As shown in FIG. 10A, in the structure of the liquid crystal display device shown in Embodiment Mode 3 (FIG. 3), the color filter 150 and the black matrix 151 are provided instead of the insulating layer 106. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In the case of providing the color filter 150 and the black matrix 151, a passivation layer is desirably provided between the color filter 150 and the black matrix 151, and the semiconductor layer 111 in the thin film transistor 102. In this embodiment mode, the passivation layer 154 is formed to cover the gate electrode 113 and the second electrode 104.

Such a structure of providing the color filter 150 and the black matrix 151 is similar to that shown in FIG. 7A. Description of other structures is omitted because it is similar to that of FIG. 3.

Figure 10B:
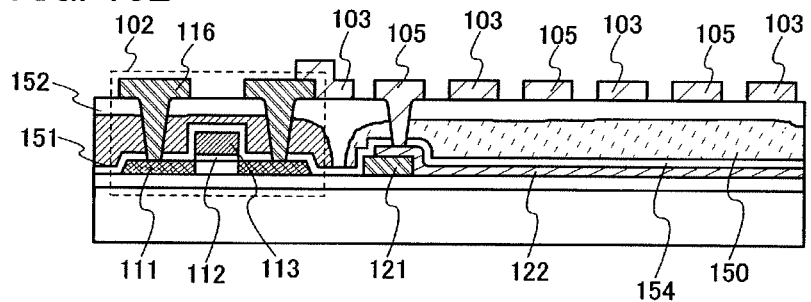

A structure shown in FIG. 10B is different from that in FIG. 10A in that the color filter 150 and the black matrix 151 are provided so as not to overlap with each other. Structures of the color filter 150 and the black matrix 151 which are not overlapped with each other is similar to those shown in FIG. 7B.

Description of other structures is omitted because it is similar to that of FIG. 10A.

Figure 10C:
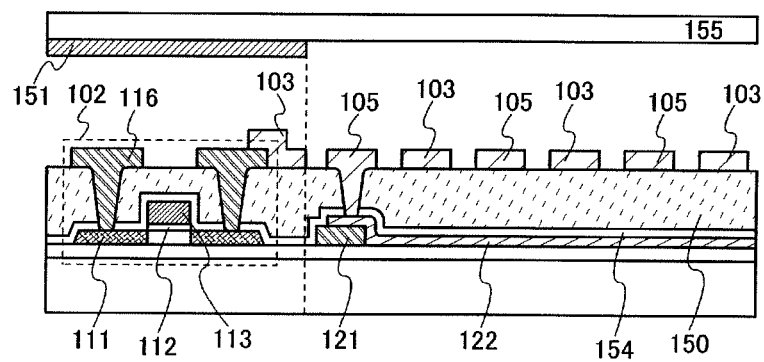

A structure shown in FIG. 10C is different from those in FIGS. 10A and 10B in that the black matrix 151 is provided on the counter substrate 155 side. A region where the black matrix 151 is provided is not limited as long as it is over the thin film transistor 102.

When the black matrix 151 is provided to the counter substrate 155, the color filter 150 can be formed over the thin film transistor 102 and the second electrode 104. As described above, the color filter 150 is formed using an organic material; therefore, the color filter 150 also serves as a flattening film. That is, the color filter 150 can be provided instead of the insulating layer 107, and the surface of the color filter 150 can be flattened. Such a structure in which the black matrix 151 is provided on the counter substrate 155 side is similar to that shown in FIG. 7C.

Note that the black matrix 151 may be provided on the rear surface side of the insulating substrate 100.

The description of other structures is omitted because it is similar to that of FIG. 10A.

In this embodiment mode, as in Embodiment Mode 3, when voltage is applied to the common electrode 122 and the comb-shaped first electrode 103, an electrical field is generated therebetween. Therefore, tilting of the liquid crystal material can be controlled so as to conduct gray-scale display. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 12. Therefore, the descriptions in Embodiment Modes 1 to 12 can be applied to or combined with this embodiment mode.

Embodiment Mode 14

In this embodiment mode, a structure of the liquid crystal display device which is different from that in foregoing Embodiment Mode 4 in that the color filter and the black matrix are provided instead of the insulating layer 106 is described.

Figure 11A:
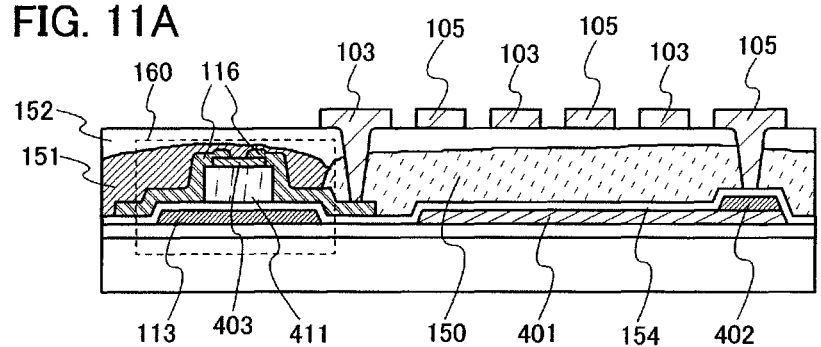
FIGS. 11A to 11C are cross-sectional views of a liquid crystal display device of the present invention.

As shown in FIG. 11A, in the structure of the liquid crystal display device shown in Embodiment Mode 4 (FIG. 4), the color filter 150 and the black matrix 151 are provided instead of the insulating layer 106. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In this embodiment mode, the thin film transistor 160 is preferably a channel protective type in which an insulating layer 403 is provided over the amorphous semiconductor layer 411. The source and drain electrodes 116 are provided so as to cover both edges of the insulating layer 403 for protecting a channel. The insulating layer 403 prevents the amorphous semiconductor layer 411 from being exposed. Accordingly, when the black matrix 151 is provided to cover the thin film transistor 160, entry of impurity elements from the black matrix to the amorphous semiconductor layer 411 can be prevented. Needles to say, the thin film transistor 160 may be a channel etched type as shown in Embodiment Mode 4; in that case, the insulating layer 403 is desirably provided so that the amorphous semiconductor layer 411 and the black matrix 151 are not in contact with each other.

In the case of providing the color filter 150 and the black matrix 151, a passivation layer is desirably provided between the color filter 150 and the black matrix 151, and the amorphous semiconductor layer 411 in the thin film transistor 160. In this embodiment mode, the passivation layer 154 is formed to cover the gate electrode 113, the common electrode 401, and the conductive layer 402.

Such a structure of providing the color filter 150 and the black matrix 151 is similar to that shown in FIG. 7A. Description of other structures is omitted because it is similar to that of FIG. 4.

Figure 11B:
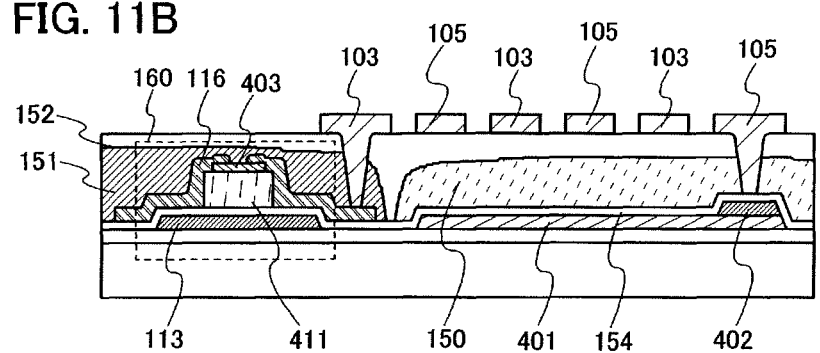

A structure shown in FIG. 11B is different from that in FIG. 11A in that the color filter 150 and the black matrix 151 are provided so as not to overlap with each other. Structures of the color filter 150 and the black matrix 151 which are not overlapped with each other is similar to those shown in FIG. 7B.

Description of other structures is omitted because it is similar to that of FIG. 11A.

Figure 11C:
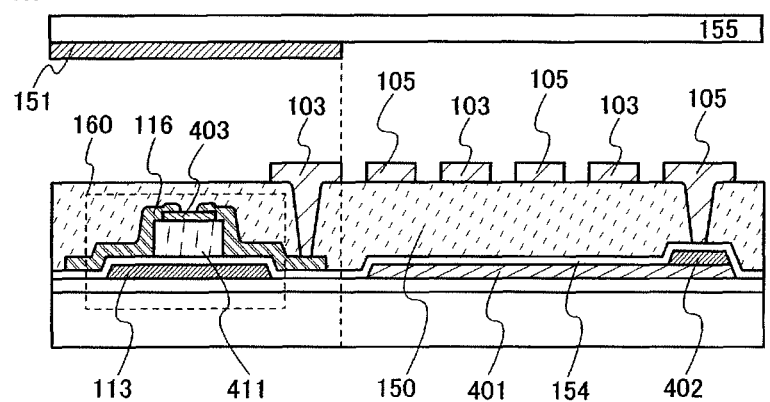

A structure shown in FIG. 11C is different from those in FIGS. 11A and 11B in that the black matrix 151 is provided on the counter substrate 155 side. A region where the black matrix 151 is provided is not limited as long as it is over the thin film transistor 160.

When the black matrix 151 is provided to the counter substrate 155, the color filter 150 can be formed over the thin film transistor 160, the common electrode 401, and the conductive layer 402.

In this embodiment mode, the thin film transistor 160 is preferably a channel protective type in which the insulating layer 403 is provided over the amorphous semiconductor layer 411. The source and drain electrodes 116 are provided so as to cover both edges of the insulating layer 403 for protecting a channel. The insulating layer 403 prevents the amorphous semiconductor layer 411 from being exposed. Accordingly, when the color filter 150 is provided to cover the thin film transistor 160, entry of impurity elements from the color filter to the amorphous semiconductor layer 411 can be prevented. Needles to say, the thin film transistor 160 may be a channel etched type as shown in Embodiment Mode 4; in that case, the insulating layer 403 is desirably provided so that the amorphous semiconductor layer 411 and the color filter 150 are not in contact with each other.

As described above, the color filter 150 is formed of an organic material; therefore, the color filter 150 also serves as a flattening film. That is, the color filter 150 can be provided instead of the insulating layer 106, and the surface of the color filter 150 can be flattened. The structure of providing the black matrix 151 on the counter substrate 155 side is similar to that shown in FIG. 7C.

Note that the black matrix 151 may be provided on the rear surface side of the insulating substrate 100.

Description of other structures is omitted because it is similar to that of FIG. 11A.

In this embodiment mode, as in Embodiment Mode 3, when voltage is applied to the common electrode 401 and the comb-shaped first electrode 103, an electrical field is generated therebetween. Therefore, tilting of the liquid crystal material can be controlled so as to conduct gray-scale display. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 13. Therefore, the descriptions in Embodiment Modes 1 to 13 can be applied to or combined with this embodiment mode.

Embodiment Mode 15

In this embodiment mode, a structure of the liquid crystal display device which is different from that in foregoing Embodiment Mode 5 in that the color filter and the black matrix are provided instead of the insulating layer 106 is described.

Figure 12A:
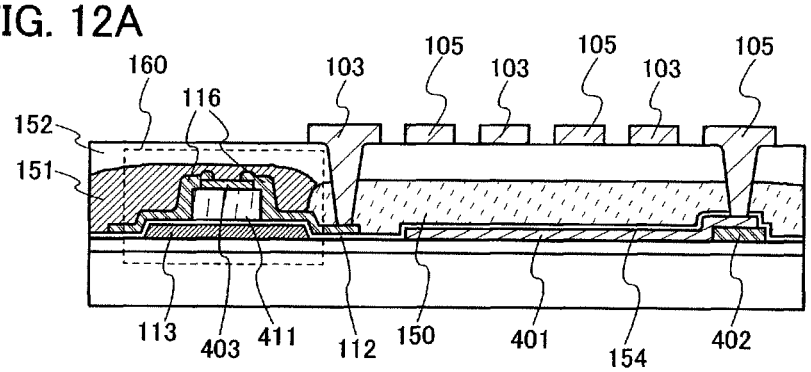
FIGS. 12A to 12C are cross-sectional views of a liquid crystal display device of the present invention.

As shown in FIG. 12A, in the structure of the liquid crystal display device shown in Embodiment Mode 5 (FIG. 5), the color filter 150 and the black matrix 151 are provided instead of the insulating layer 106. The color filter 150 and the black matrix 151 are provided so as to be partially overlapped with each other. The color filter 150 and the black matrix 151 can be formed similarly to those in the foregoing embodiment mode. The insulating layer 152 is formed to cover the color filter 150 and the black matrix 151. The surface can be flattened by the insulating layer 152.

In this embodiment mode, the thin film transistor 160 is preferably a channel protective type in which the insulating layer 403 is provided over the amorphous semiconductor layer 411. The source and drain electrodes 116 are provided so as to cover both edges of the insulating layer 403 for protecting a channel. The insulating layer 403 prevents the amorphous semiconductor layer 411 from being exposed. Accordingly, when the black matrix 151 is provided to cover the thin film transistor 160, entry of impurity elements from the black matrix to the amorphous semiconductor layer 411 can be prevented. Needles to say, the thin film transistor 160 may be a channel etched type as shown in Embodiment Mode 4; in that case, the insulating layer 403 is desirably provided so that the amorphous semiconductor layer 411 and the black matrix 151 are not in contact with each other.

In the case of providing the color filter 150 and the black matrix 151, a passivation layer is desirably provided between the color filter 150 and the black matrix 151, and the amorphous semiconductor layer 411 in the thin film transistor 160. In this embodiment mode, the passivation layer 154 is formed to cover the gate electrode 113, the common electrode 401, and the conductive layer 402.

Such a structure of providing the color filter 150 and the black matrix 151 is similar to that shown in FIG. 7A. The description of other structures is omitted because it is similar to that of FIG. 5

Figure 12B:
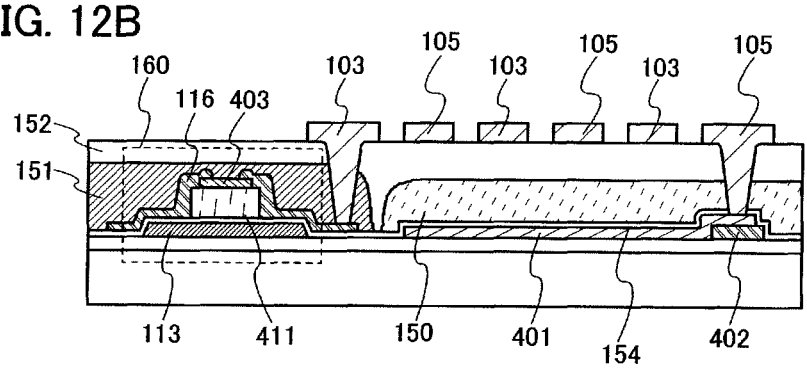

A structure shown in FIG. 12B is different from that in FIG. 12A in that the color filter 150 and the black matrix 151 are provided so as not to overlap with each other. Structures of the color filter 150 and the black matrix 151 which are not overlapped with each other is similar to those shown in FIG. 7B.

The description of other structures is omitted because it is similar to that of FIG. 12A.

Figure 12C:
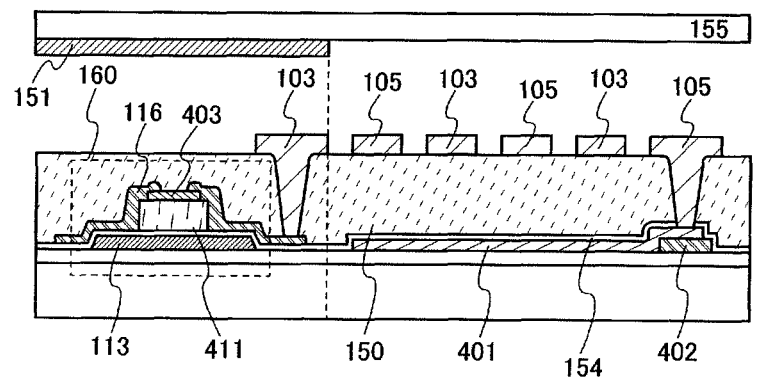

A structure shown in FIG. 12C is different from those in FIGS. 12A and 12B in that the black matrix 151 is provided on the counter substrate 155 side. A region where the black matrix 151 is provided is not limited as long as it is over the thin film transistor 160.

When the black matrix 151 is provided to the counter substrate 155, the color filter 150 can be formed over the thin film transistor 160, the common electrode 401, and the conductive layer 402.

In this embodiment mode, the thin film transistor 160 is preferably a channel protective type in which the insulating layer 403 is provided over the amorphous semiconductor layer 411. The source and drain electrodes 116 are provided so as to cover both edges of the insulating layer 403 for protecting a channel. The insulating layer 403 prevents the amorphous semiconductor layer 411 from being exposed. Accordingly, when the color filter 150 is provided to cover the thin film transistor 160, entry of impurity elements from the color filter to the amorphous semiconductor layer 411 can be prevented. Needles to say, the thin film transistor 160 may be a channel etched type as shown in Embodiment Mode 4; in that case, the insulating layer 403 is desirably provided so that the amorphous semiconductor layer 411 and the color filter 150 are not in contact with each other.

As described above, the color filter 150 is formed of an organic material; therefore, the color filter 150 also serves as a flattening film. That is, the color filter 150 can be provided instead of the insulating layer 106, and the surface of the color filter 150 can be flattened. The structure of providing the black matrix 151 on the counter substrate 155 side is similar to that shown in FIG. 7C.

Note that the black matrix 151 may be provided on the rear surface side of the insulating substrate 100.

The description of other structures is omitted because it is similar to that of FIG. 12A.

In this embodiment mode, as in Embodiment Mode 3, when voltage is applied to the common electrode 401 and the comb-shaped first electrode 103, an electrical field is generated therebetween. Therefore, tilting of the liquid crystal material can be controlled so as to conduct gray-scale display. As a result, in a part of the liquid crystal material, whose tilting has not been sufficiently controlled by an electrical field generated by one pair of electrodes of the comb-shaped third electrode 105 and the comb-shaped first electrode 103, tilting of the liquid crystal material can be sufficiently controlled by electrical fields generated by two pairs of electrodes.

Note that this embodiment mode shows an example where the descriptions in Embodiment Modes 1 to 3 are realized together with a transistor and which is a modification of those in Embodiment Modes 4 to 14. Therefore, the descriptions in Embodiment Modes 1 to 14 can be applied to or combined with this embodiment mode.

Embodiment Mode 16

In this embodiment mode, a top view of a pixel portion in a liquid crystal display device is described.

Figure 13:
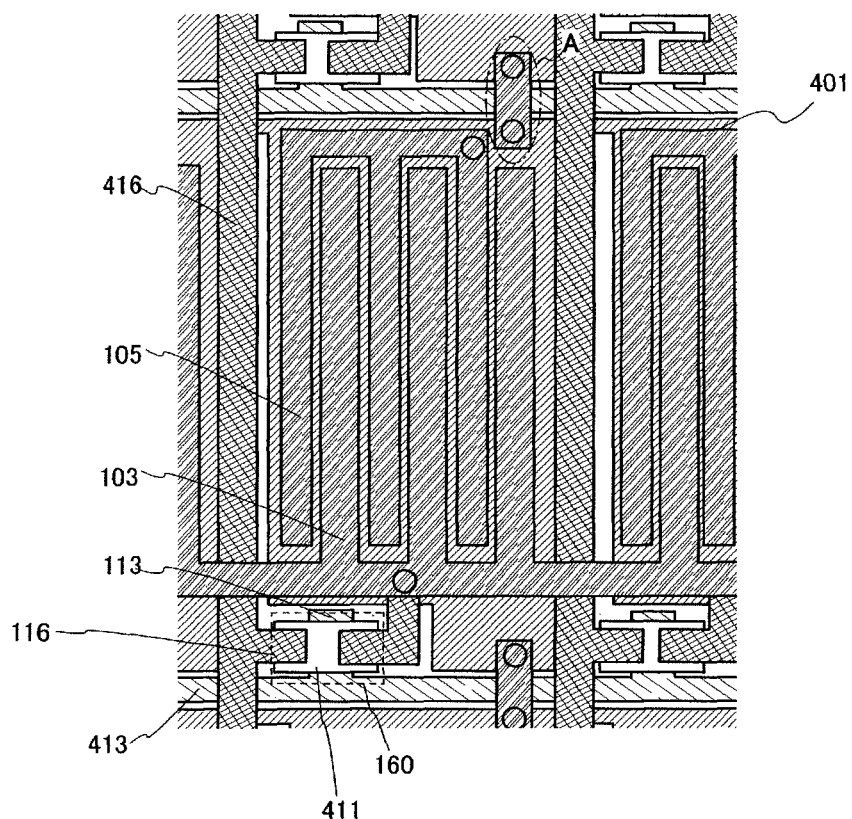
FIG. 13 is a top view of a liquid crystal display device of the present invention.

FIG. 13 shows a top view corresponding to the cross-sectional structure shown in Embodiment Mode 4 (FIG. 4). The thin film transistor (also referred to as TFT) 160 includes the amorphous semiconductor layer 411 and has a bottom gate structure in which the gate electrode 113 is provided below. A scan line 413 can be formed in the same layer as the gate electrode 113.

The amorphous semiconductor layer 411 is formed to cover the gate electrode 113. The common electrode 401 can be formed using the amorphous semiconductor layer 411. Note that since the common electrode 401 is desirably formed of a material with high conductivity, an impurity element is preferably added to the semiconductor layer. The common electrode 401 may be formed of a conductive material without using the amorphous semiconductor layer 411.

The source and drain electrodes 116 are formed so as to cover both edges of the amorphous semiconductor layer 411. A signal line 416 can be formed in the same layer as the source and drain electrodes 116.

The first electrode 103 and the third electrode 105 are formed in the same layer. The first electrode 103 and the third electrode 105 are processed into comb-shapes and are arranged alternately. The first electrode 103 is connected to either the source and drain electrodes 116 through an opening. The third electrode 105 is connected to the common electrode 401 through an opening.

In the same layer as the third electrode 105 (a region denoted by A in FIG. 13), the common electrodes 401 provided in one pixel are electrically connected to one another.

Note that this embodiment mode shows an example where the descriptions in Embodiment Modes 1 to 3 are realized together with a transistor and which is a modification of those in Embodiment Modes 4 to 15. Therefore, the descriptions in Embodiment Modes 1 to 15 can be applied to or combined with this embodiment mode.

The structure of the pixel portion of this embodiment mode can be freely combined with the foregoing embodiment modes.

Embodiment Mode 17

In this embodiment mode, a top view of a pixel portion different from that described in the foregoing embodiment mode is described.

Figure 14:
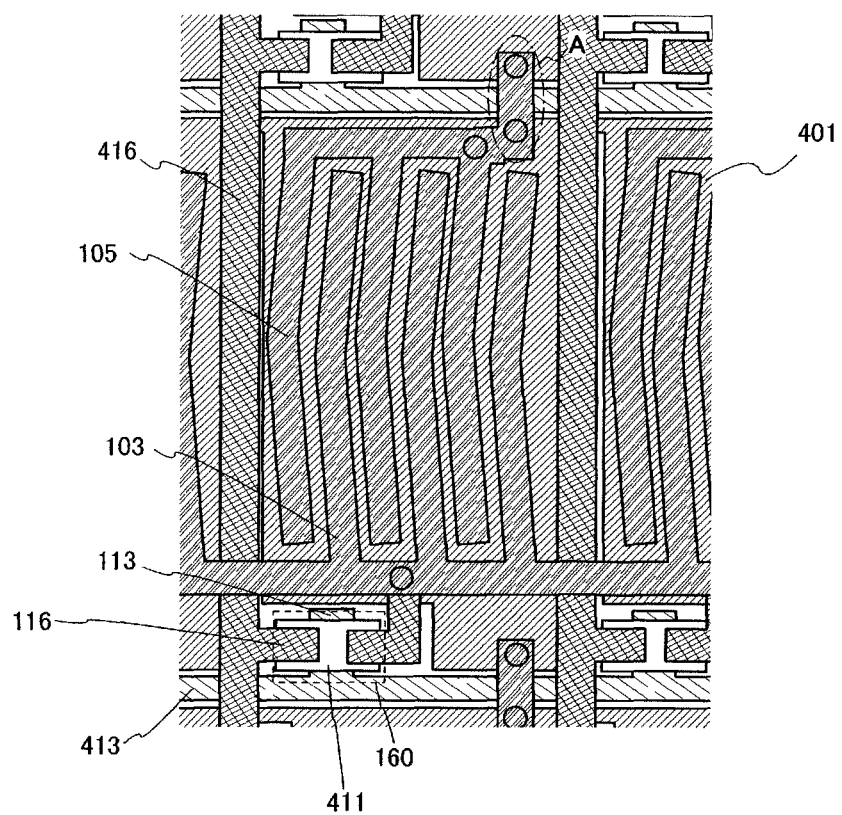
FIG. 14 is a top view of a liquid crystal display device of the present invention.

FIG. 14 is different from FIG. 13 in that the comb-shaped first electrode 103 and the comb-shaped third electrode 105 are bent at the center point of the long side. The electrodes may be bent at another point instead of the center point. In addition, they may have a plurality of bends. Such the bent first electrode 103 and the bent third electrode 105 are preferable since they can widen a viewing angle. It is because some of the liquid crystal molecules follow a first direction of the bent first electrode 103 and the third electrode 105, and some of the liquid crystal molecules follow a second direction thereof.

Alternatively, in order to obtain the same effect, one pixel may be divided into two regions by the center line, and in a first region, the straight first electrode 103 and the straight third electrode 105 are arranged with a certain angle, and in a second region, the straight first electrode 103 and the straight third electrode 105 are arranged so as to be symmetric with respect to the central line.

Note that this embodiment mode shows an example where the descriptions in Embodiment Modes 1 to 3 are realized together with a transistor and which is a modification of those in Embodiment Modes 4 to 16. Therefore, the descriptions in Embodiment Modes 1 to 16 can be applied to or combined with this embodiment mode.

Embodiment Mode 18

In this embodiment mode, a structure of the liquid crystal display device which is different from that shown in FIG. 1 in that a reflective region A and a transmissive region B are provided is described.

Figure 15:
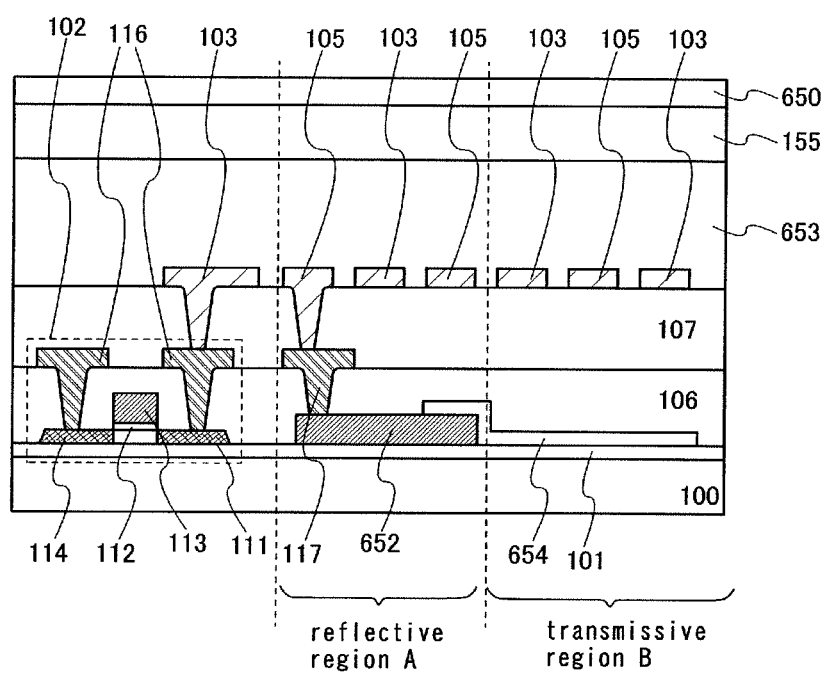
FIG. 15 is a cross-sectional view of a liquid crystal display device of the present invention.

As shown in FIG. 15, a reflective electrode 652 is provided in the reflective region. In the transmissive region, a transparent electrode 654 connected to the reflective electrode 652 is provided. The transparent electrode 654 also serves as a common electrode. In addition, the counter substrate 155 is provided thereover with a liquid crystal material 653 interposed therebetween.

In addition, a retardation film 650 is placed over an outer side of the counter substrate 155 provided over the liquid crystal material 653. That is, the retardation film 650 is placed between the counter substrate 155 and the polarizing plate. A quarter-wave plate and a half-wave plate are given as a retardation film. With the retardation film, an amount of light which passes the reflective region and the transmissive region can be appropriately controlled. Therefore, approximately the same image can be displayed whether the liquid crystal display device is transmissive or reflective.

The description of other structures is omitted because it is similar to that of FIG. 1.

In this embodiment mode, tilting of the liquid crystal material can be sufficiently controlled by electrical fields generated by two pairs of electrodes.

Note that the description in Embodiment Modes 1 to 17 can be applied to or combined with this embodiment mode.

Embodiment Mode 19

In this embodiment mode, a structure which is different from that described in the foregoing embodiment mode in that the retardation film is provided inside the counter substrate is described.

Figure 16:
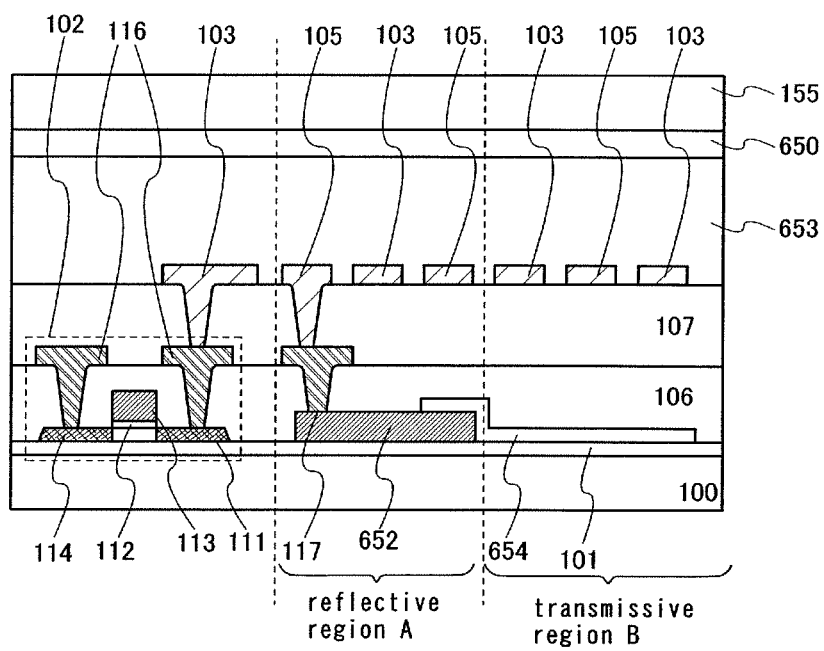
FIG. 16 is a cross-sectional view of a liquid crystal display device of the present invention.

As shown in FIG. 16, the retardation film 650 is formed inside the counter substrate 155, that is, the side of the liquid crystal material 653. With such a structure, an amount of light which passes the reflective region and the transmissive region can be appropriately controlled. Therefore, approximately the same image can be displayed whether the liquid crystal display device is transmissive or reflective.

Description of other structures is omitted because it is similar to that of FIG. 15.

In this embodiment mode, tilting of the liquid crystal material can be sufficiently controlled by electrical fields generated by two pairs of electrodes.

Note that the description in Embodiment Modes 1 to 18 can be applied to or combined with this embodiment mode.

Embodiment Mode 20

In this embodiment mode, a structure in which a cell gap in the reflective region and the transmissive region is controlled is described.

Figure 17:
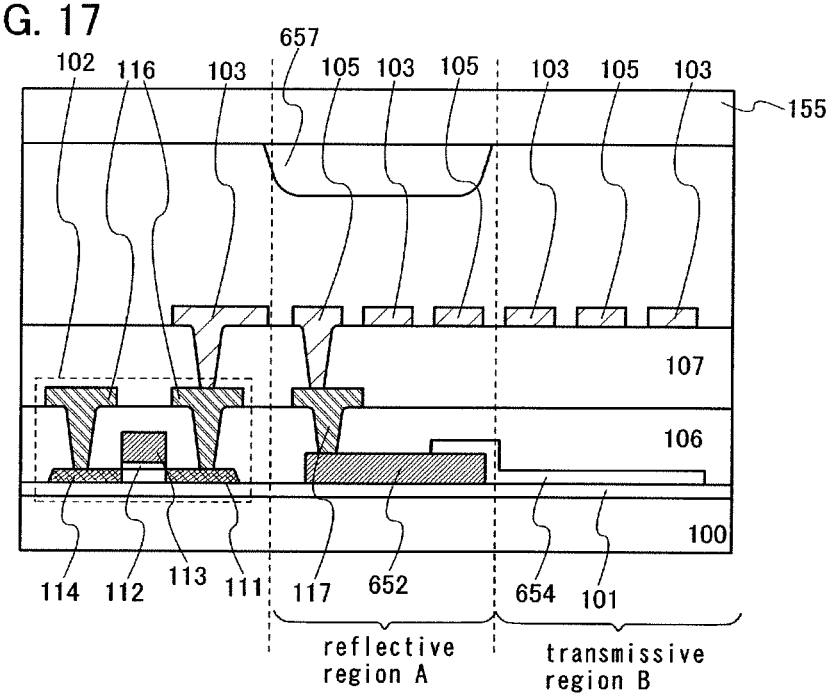
FIG. 17 is a cross-sectional view of a liquid crystal display device of the present invention.

As shown in FIG. 17, a film 657 for adjusting a cell gap is provided on the counter substrate 155 side. An alignment film is formed over the film 657 (on the side closer to the liquid crystal). Such a film 657 is formed of an organic material such as acrylic. The cell gap is set so that the cell gap in the reflective region is shorter than that in the transmissive region. With such a structure, an amount of light which passes the reflective region and the transmissive region can be appropriately controlled. Therefore, approximately the same image can be displayed whether the liquid crystal display device is transmissive or reflective.

The description of other structures is omitted because it is similar to that of FIG. 15.

In this embodiment mode, tilting of the liquid crystal material can be sufficiently controlled by electrical fields generated by two pairs of electrodes.

Note that the description in Embodiment Modes 1 to 19 can be applied to or combined with this embodiment mode.

Embodiment Mode 21

In this embodiment mode, a structure which is different from that described in the foregoing embodiment mode in that light scattering particles are contained in the film for adjusting a cell gap.

Figure 18:
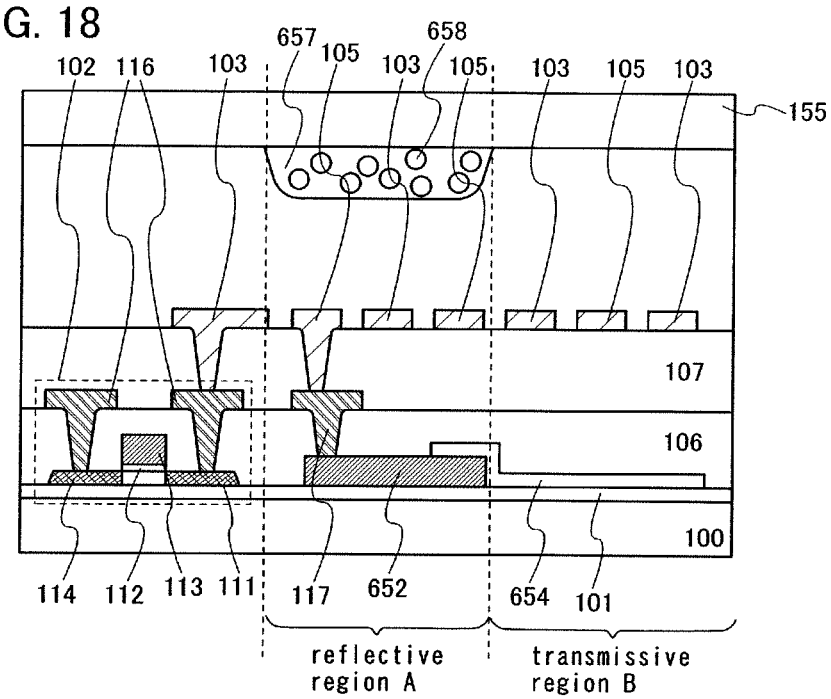
FIG. 18 is a cross-sectional view of a liquid crystal display device of the present invention.

As shown in FIG. 18, light scattering particles 658 are contained in the film 657 for adjusting a cell gap. The light scattering particle 658 is formed of a material with a refractive index different from that of the film for adjusting a cell gap. The film for adjusting a cell gap may be formed so as to contain such light scattering particles.

With such a structure, light can be diffused and luminance can be improved.

The description of other structures is omitted because it is similar to that of FIG. 15.

In this embodiment mode, tilting of the liquid crystal material can be sufficiently controlled by electrical fields generated by two pairs of electrodes.

Note that the description in Embodiment Modes 1 to 20 can be applied to or combined with this embodiment mode.

Embodiment Mode 22

In this embodiment mode, a structure which is different from that shown in FIG. 1 in that a reflective region is provided is described.

Figure 19:
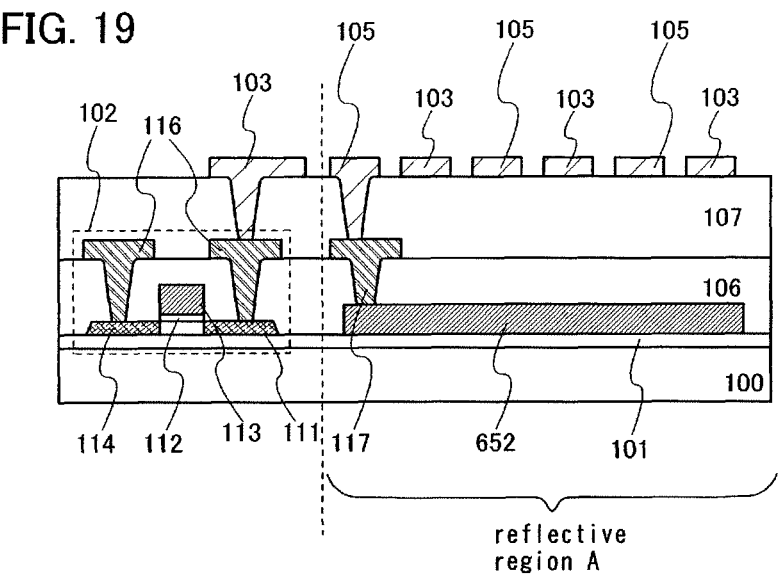
FIG. 19 is a cross-sectional view of a liquid crystal display device of the present invention.

As shown in FIG. 19, in this embodiment mode, a reflective liquid crystal display device is shown in which an electrode formed at the same time as the gate electrode 113 is used as the reflective electrode 652. The reflective electrode 652 is placed so as to be approximately parallel to the gate wire, whereby an efficient layout can be achieved. In addition, since the reflective electrode 652 can be formed at the same time as the gate wire, the number of steps can be reduced and the cost can be reduced.

Note that description in Embodiment Modes 1 to 21 can be applied to or combined with this embodiment mode.

Embodiment Mode 23

In this embodiment mode, a structure which is different from that in foregoing Embodiment Mode 22 in that the reflective region and a transmissive region are provided is described.

Figure 20:
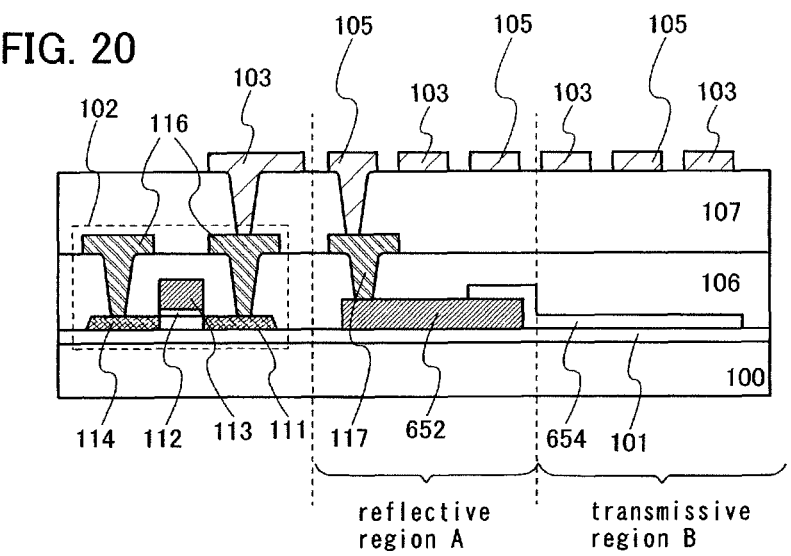
FIG. 20 is a cross-sectional view of a liquid crystal display device of the present invention.

As shown in FIG. 20, in this embodiment mode, a structure of the semi-transmissive liquid crystal display device is shown in which an electrode formed at the same time as the gate electrode 113 is used as the reflective electrode 652. The reflective electrode 652 can serve as a common wire. The reflective electrode 652 is placed so as to be approximately parallel to the gate wire, whereby an efficient layout can be achieved. In addition, since the reflective electrode 652 can be formed at the same time as the gate wire, the number of steps can be reduced and the cost can be reduced.

Note that the description in Embodiment Modes 1 to 22 can be applied to or combined with this embodiment mode.

Embodiment Mode 24

In this embodiment mode, a structure which is different from that in foregoing Embodiment Mode 23 in that a manufacturing order of the reflective electrode and the transparent electrode is changed is described.

Figure 21:
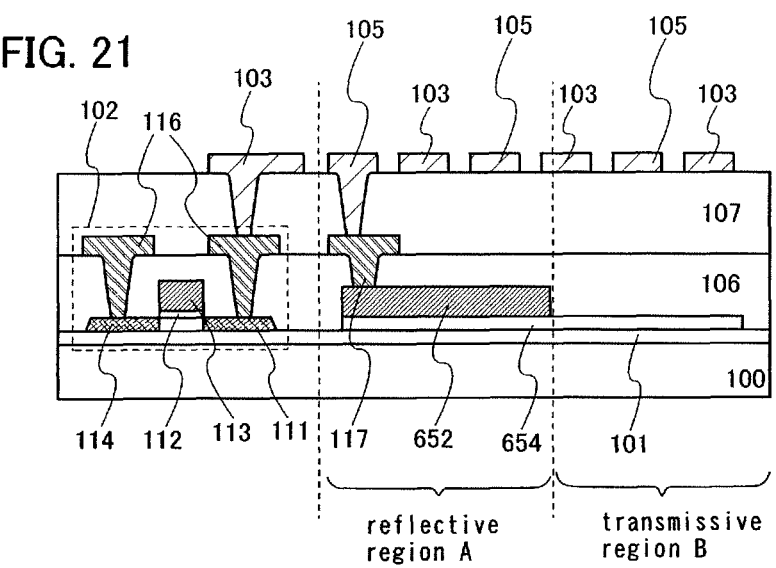
FIG. 21 is a cross-sectional view of a liquid crystal display device of the present invention.

As shown in FIG. 21, the transparent electrode 654 is formed first and the reflective electrode 652 is formed over a part of the transparent electrode 654. Then, the electrode 117 is connected to the reflective electrode 652.

With such a structure, the reflective electrode 652 can be formed at the same time as the gate electrode 113. The reflective electrode 652 can be used as the common wire. The reflective electrode 652 is placed so as to be approximately parallel to the gate wire, whereby an efficient layout can be achieved. In addition, since the reflective electrode 652 can be formed at the same time as the gate wire, the number of steps can be reduced and the cost can be reduced.

Description of other structures is omitted because it is similar to that of FIG. 20.

In this embodiment mode, tilting of the liquid crystal material can be sufficiently controlled by electrical fields generated by two pairs of electrodes.

Note that the description in Embodiment Modes 1 to 23 can be applied to or combined with this embodiment mode.

Embodiment Mode 25

In this embodiment mode, a structure which is different from that in foregoing Embodiment Mode 24 in that the transparent electrode is not provided is described.

Figure 22:
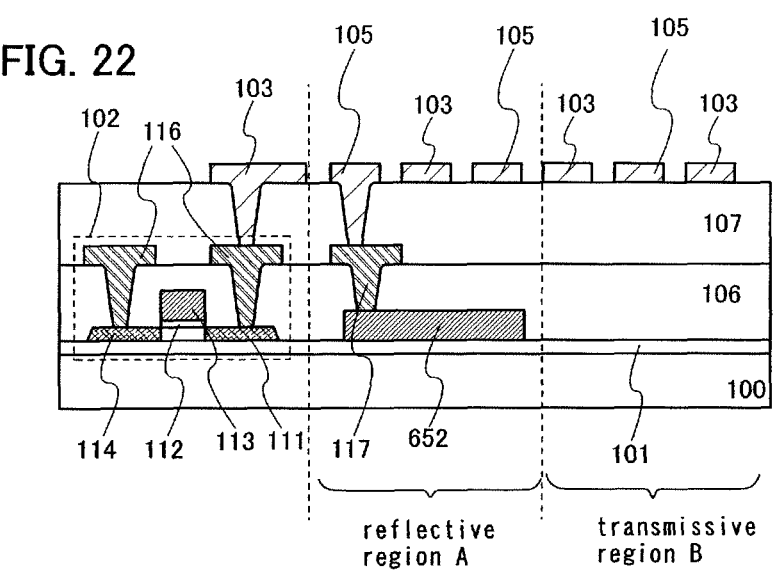
FIG. 22 is a cross-sectional view of a liquid crystal display device of the present invention.

As shown in FIG. 22, the reflective electrode 652 is formed in the reflective region but not in the transmissive region. The electrode 117 is connected to the reflective electrode 652.

With such a structure, the reflective electrode 652 can be formed at the same time as the gate electrode 113. The reflective electrode 652 can be used as the common wire. The reflective electrode 652 is placed so as to be approximately parallel to the gate wire, whereby an efficient layout can be achieved. In addition, since the reflective electrode 652 can be formed at the same time as the gate wire, the number of steps can be reduced and the cost can be reduced.

The description of other structures is omitted because it is similar to that of FIG. 21.

In this embodiment mode, tilting of the liquid crystal material can be sufficiently controlled by electrical fields generated by two pairs of electrodes.

Note that the description in Embodiment Modes 1 to 24 can be applied to or combined with this embodiment mode.

Embodiment Mode 26

In this embodiment mode, a structure which is different from that in foregoing Embodiment Mode 22 in that a conductive layer 659 serving as the common wire is provided is described.

Figure 23:
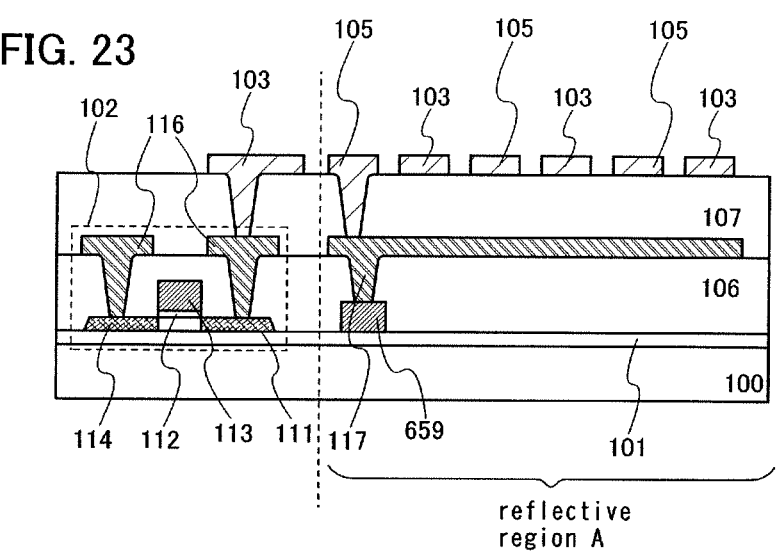
FIG. 23 is a cross-sectional view of a liquid crystal display device of the present invention.

As shown in FIG. 23, the conductive layer 659 is formed over the base layer 101 in the reflective region. The conductive layer 659 can be formed at the same time as the gate electrode. The electrode 117 serving as the reflective electrode connected to the conductive layer 659 is formed.

With such a structure, the conductive layer 659 can be used as the common wire. The conductive layer 659 is placed so as to be approximately parallel to the gate wire, whereby an efficient layout can be achieved. In addition, since the conductive layer 659 can be formed at the same time as the gate wire, the number of steps can be reduced and the cost can be reduced.

The description of other structures is omitted because it is similar to that of FIG. 19.

In this embodiment mode, tilting of the liquid crystal material can be sufficiently controlled by electrical fields generated by two pairs of electrodes.

Note that the description in Embodiment Modes 1 to 25 can be applied to or combined with this embodiment mode.

Embodiment Mode 27

In this embodiment mode, a structure which is different from that in foregoing Embodiment Mode 26 in that the conductive layer 659 serving as the common wire is provided in the reflective region and a transmissive region is provided is described.

Figure 24:
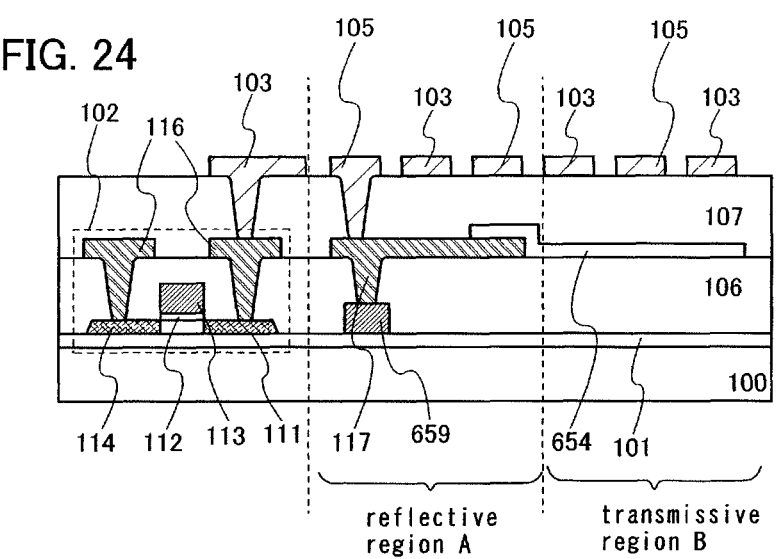
FIG. 24 is a cross-sectional view of a liquid crystal display device of the present invention.

As shown in FIG. 24, the conductive layer 659 is formed over the base layer 101 in the reflective region, and the electrode 117 serving as the reflective electrode connected to the conductive layer 659 is formed. In the transmissive region, the transparent electrode 654 connected to the electrode 117 is formed.

With such a structure, the conductive layer 659 can be used as the common wire. The conductive layer 659 is placed so as to be approximately parallel to the gate wire, whereby an efficient layout can be achieved. In addition, since the conductive layer 659 can be formed at the same time as the gate wire, the number of steps can be reduced and the cost can be reduced.

The description of other structures is omitted because it is similar to that of FIG. 23.

In this embodiment mode, tilting of the liquid crystal material can be sufficiently controlled by electrical fields generated by two pairs of electrodes.

Note that the description in Embodiment Modes 1 to 26 can be applied to or combined with this embodiment mode.

Embodiment Mode 28

In this embodiment mode, a structure which is different from that in foregoing Embodiment Mode 27 in that a manufacturing order of the reflective electrode and the transparent electrode is changed is described.

Figure 25:
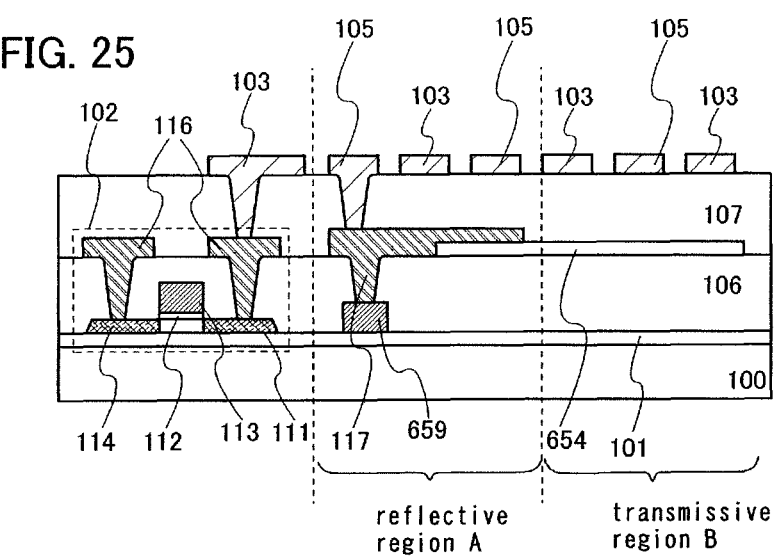
FIG. 25 is a cross-sectional view of a liquid crystal display device of the present invention.

As shown in FIG. 25, the transparent electrode 654 is formed first and the electrode 117 serving as the reflective electrode is formed over a part of the transparent electrode 654.

With such a structure, the conductive layer 659 can be used as the common wire. The conductive layer 659 is placed so as to be approximately parallel to the gate wire, whereby an efficient layout can be achieved. In addition, since the conductive layer 659 can be formed at the same time as the gate wire, the number of steps can be reduced and the cost can be reduced.

The description of other structures is omitted because it is similar to that of FIG. 24.

In this embodiment mode, tilting of the liquid crystal material can be sufficiently controlled by electrical fields generated by two pairs of electrodes.

Note that the description in Embodiment Modes 1 to 27 can be applied to or combined with this embodiment mode.

Embodiment Mode 29

In this embodiment mode, a structure which is different from that in foregoing Embodiment Mode 28 in that the conductive layer 659 serving as the common wire is formed in the reflective region and the transparent electrode is not provided is described.

Figure 26:
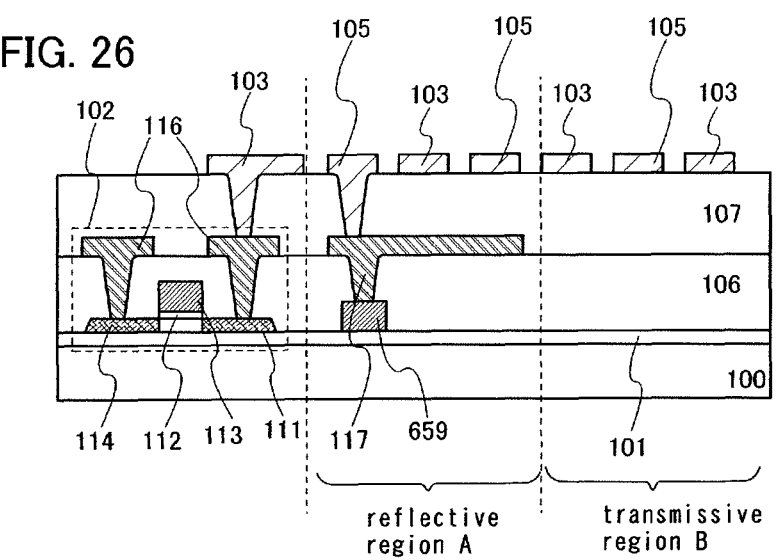
FIG. 26 is a cross-sectional view of a liquid crystal display device of the present invention.

As shown in FIG. 26, the conductive layer 659 is formed in the reflective region while an electrode is not formed in the transmissive region. The electrode 117 serving as the reflective electrode is connected to the conductive layer 659.

With such a structure, the conductive layer 659 can be used as the common wire. The conductive layer 659 is placed so as to be approximately parallel to the gate wire, whereby an efficient layout can be achieved. In addition, since the conductive layer 659 can be formed at the same time as the gate wire, the number of steps can be reduced and the cost can be reduced.

The description of other structures is omitted because it is similar to that of FIG. 25.

In this embodiment mode, tilting of the liquid crystal material can be sufficiently controlled by electrical fields generated by two pairs of electrodes.

Note that the description in Embodiment Modes 1 to 28 can be applied to or combined with this embodiment mode.

Embodiment Mode 30

In this embodiment mode, a structure which is different from that in foregoing Embodiment Mode 29 in that a transparent electrode is formed in the transmissive region is described.

Figure 27:
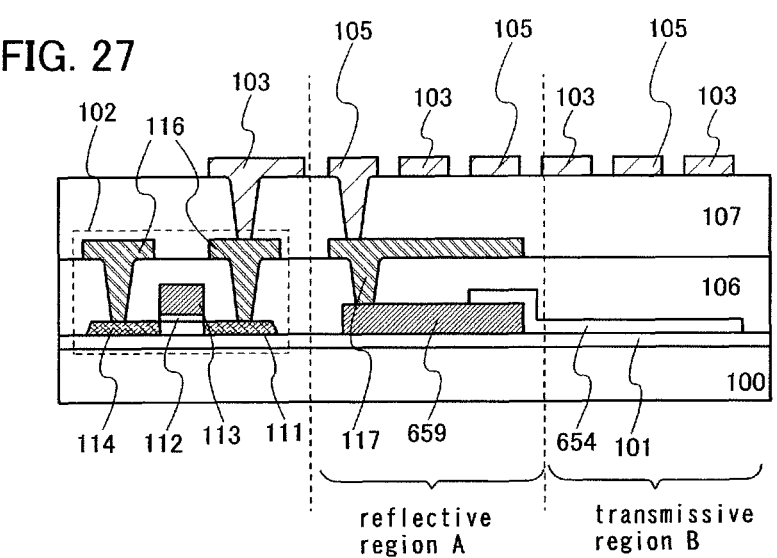
FIG. 27 is a cross-sectional view of a liquid crystal display device of the present invention.

As shown in FIG. 27, the conductive layer 659 is formed in the reflective region while the transparent electrode 654 connected to the conductive layer 659 is formed in the transmissive region. The electrode 117 is connected to the conductive layer 659. The conductive layer 659 serves as the reflective electrode and as the common wire.

With such a structure, the conductive layer 659 can be used as the common wire. The conductive layer 659 is placed so as to be approximately parallel to the gate wire, whereby an efficient layout can be achieved. In addition, since the conductive layer 659 can be formed at the same time as the gate wire, the number of steps can be reduced and the cost can be reduced.

The description of other structures is omitted because it is similar to that of FIG. 25.

In this embodiment mode, tilting of the liquid crystal material can be sufficiently controlled by electrical fields generated by two pairs of electrodes.

Note that the description in Embodiment Modes 1 to 29 can be applied to or combined with this embodiment mode.

Embodiment Mode 31

In this embodiment mode, a structure which is different from that in foregoing Embodiment Mode 30 in that a projection and a depression are formed in the insulating layer in the reflective region is described.

Figure 28:
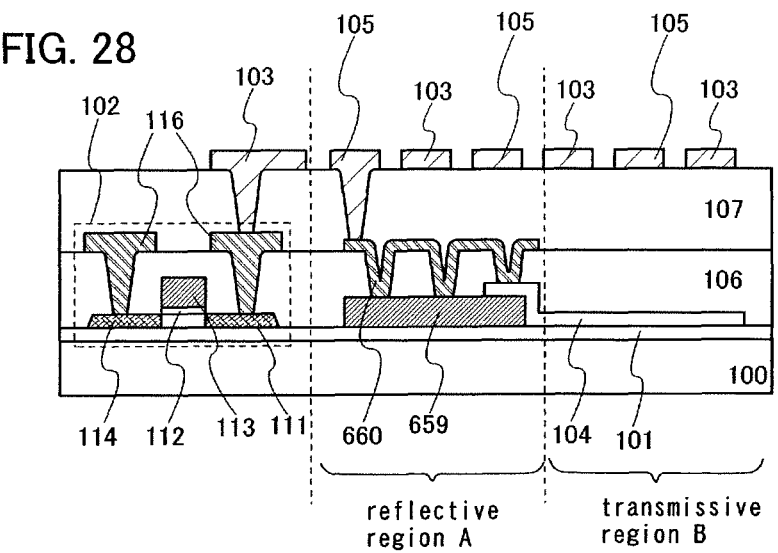
FIG. 28 is a cross-sectional view of a liquid crystal display device of the present invention.

As shown in FIG. 28, a projection and a depression are formed in the insulating layer 106 in the reflective region.

A conductive layer 660 is formed along the projection and the depression in the insulating layer 106. The conductive layer 660 is formed of a highly reflective material. The conductive layer 660 may be formed of the same material as the electrode 117. Reflectance can be improved with the conductive layer 660 formed along the projection and the depression in the insulating layer 106.

The projection and the depression can be formed at the same time as forming a contact hole in the insulating layer 106. Therefore, the projection and the depression can be formed in the reflective region without additional steps being required.

In the transmissive region, the transparent electrode 654 connected to the conductive layer 659 is formed. The transparent electrode 654 is also connected to the conductive layer 660. The conductive layer 659 serves as the reflective electrode.

The description of other structures is omitted because it is similar to that of FIG. 27.

In this embodiment mode, tilting of the liquid crystal material can be sufficiently controlled by electrical fields generated by two pairs of electrodes.

Note that the description in Embodiment Modes 1 to 30 can be applied to or combined with this embodiment mode.

Embodiment Mode 32

In this embodiment mode, a structure which is different from that in foregoing Embodiment Mode 31 in that a manufacturing order of the reflective electrode and the transparent electrode is changed is described.

Figure 29:
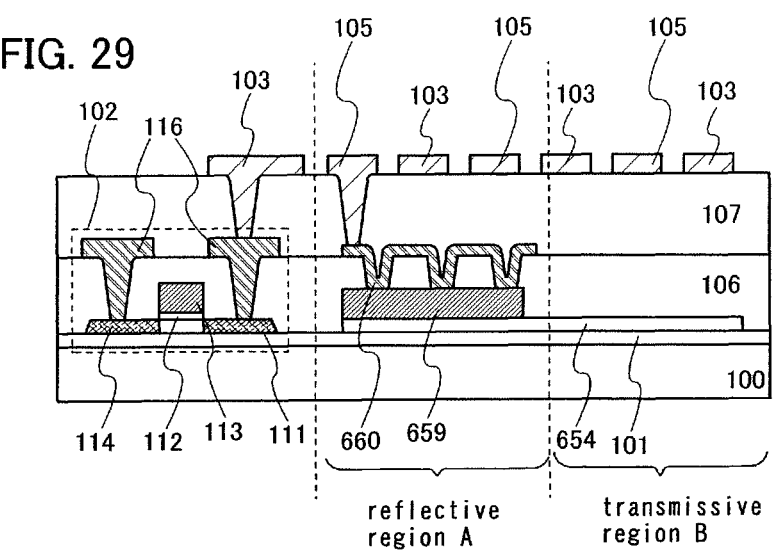
FIG. 29 is a cross-sectional view of a liquid crystal display device of the present invention.

As shown in FIG. 29, the transparent electrode 654 is formed first. Then, the conductive layer 659 connected to the transparent electrode 654 is formed only in the reflective region. The conductive layer 659 serves as the reflective electrode. After that, the projection and the depression are provided in the insulating layer 106. The conductive layer 660 is formed along the projection and the depression. The conductive layer 660 is connected to the conductive layer 659.

The projection and the depression can be formed at the same time as forming the contact hole in the insulating layer 106. Therefore, the projection and the depression can be formed in the reflective region without additional steps being required.

The description of other structures is omitted because it is similar to that of FIG. 28.

In this embodiment mode, tilting of the liquid crystal material can be sufficiently controlled by electrical fields generated by two pairs of electrodes.

Note that description in Embodiment Modes 1 to 31 can be applied to or combined with this embodiment mode.

Embodiment Mode 33

In this embodiment mode, a structure which is different from that in foregoing Embodiment Mode 32 in that the transparent electrode is not formed is described.

Figure 30:
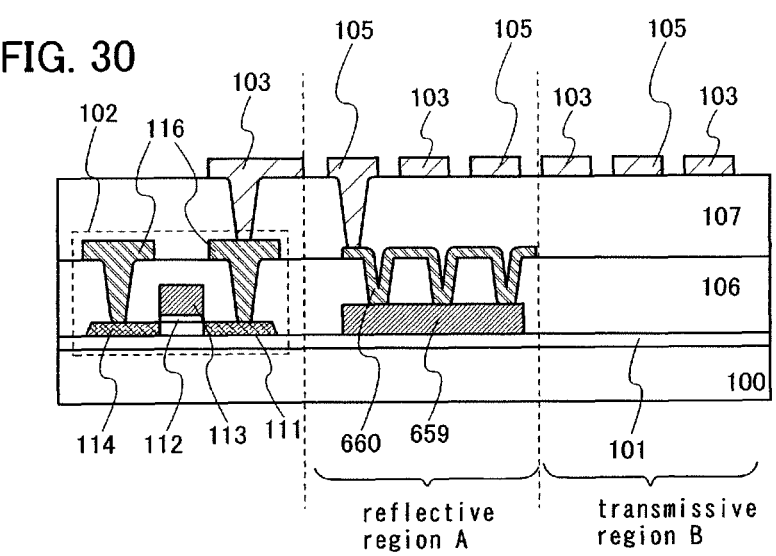
FIG. 30 is a cross-sectional view of a liquid crystal display device of the present invention.

As shown in FIG. 30, the conductive layer 659 is formed in the reflective region. The conductive layer 659 serves as the reflective electrode. The transparent electrode is not formed in the transmissive region. After that, the projection and the depression are provided in the insulating layer 106. The conductive layer 660 is provided along the projection and the depression and is connected to the conductive layer 659. At this time, a lower surface of the conductive layer 660, that is, a bottom surface of the conductive layer 660 in the depression is entirely in contact with the conductive layer 659.

The projection and the depression can be formed at the same time as forming the contact hole in the insulating layer 106. Therefore, the projection and the depression can be formed in the reflective region without additional steps being required.

The description of other structures is omitted because it is similar to that of FIG. 29.

In this embodiment mode, tilting of the liquid crystal material can be sufficiently controlled by electrical fields generated by two pairs of electrodes.

Note that the description in Embodiment Modes 1 to 32 can be applied to or combined with this embodiment mode.

Embodiment Mode 34

In this embodiment mode, a structure which is different from that in foregoing Embodiment Mode 33 in that the bottom surface of the conductive layer 660 in the depression is partially in contact with the conductive layer 659 is described.

Figure 31:
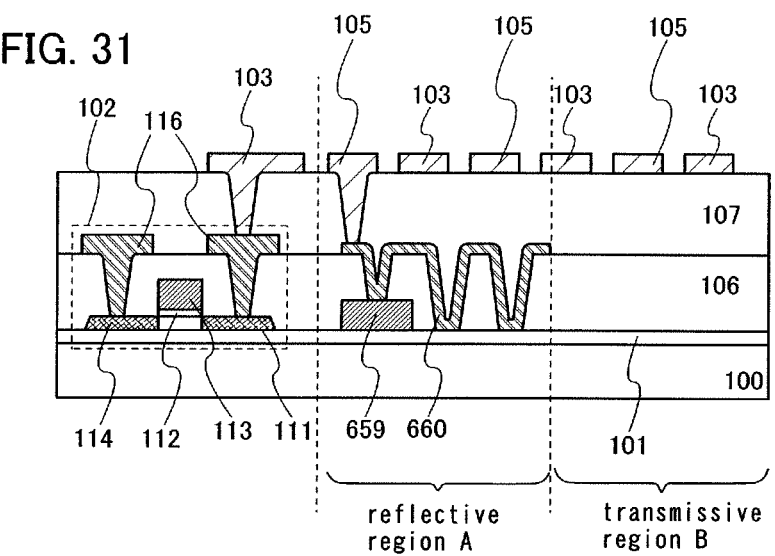
FIG. 31 is a cross-sectional view of a liquid crystal display device of the present invention.

As shown in FIG. 31, a part of the lower surface of the conductive layer 660, that is, a part of the bottom surface of the conductive layer 660 in the depression is partially in contact with the conductive layer 659. The other part of the bottom surface of the conductive layer 660 is in contact with the base layer 101.

The projection and the depression can be formed at the same time as forming the contact hole in the insulating layer 106. Therefore, the projection and the depression can be formed in the reflective region without additional steps being required.

Description of other structures is omitted because it is similar to that of FIG. 31.

In this embodiment mode, tilting of the liquid crystal material can be sufficiently controlled by electrical fields generated by two pairs of electrodes.

Note that description in Embodiment Modes 1 to 33 can be applied to or combined with this embodiment mode.

Embodiment Mode 35

In this embodiment mode, a structure which is different from that in foregoing Embodiment Mode 25 in that an opening is provided in the insulating layer 107 is described.

Figure 32:
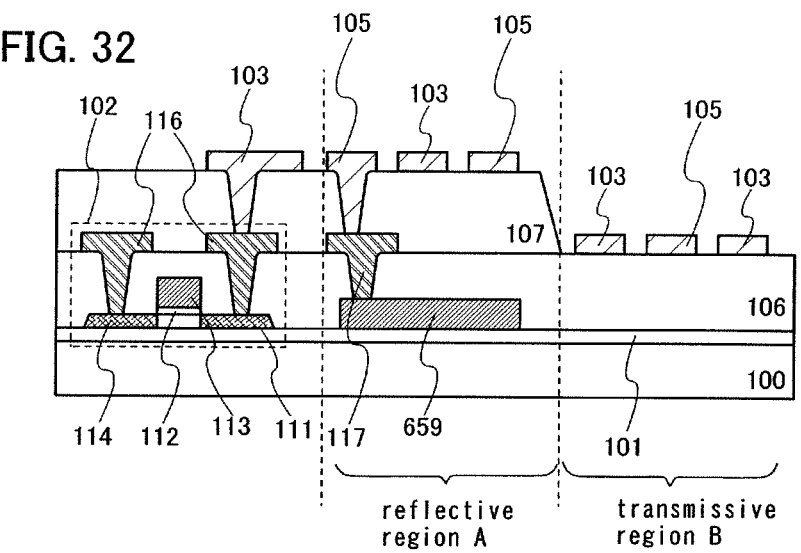
FIG. 32 is a cross-sectional view of a liquid crystal display device of the present invention.

As shown in FIG. 32, an opening is formed in the insulating layer 107. A region in which the opening is formed is the transmissive region.

With such a structure, a cell gap in the transmissive region can be thickened.

In addition, the conductive layer 659 provided in the reflective region serves as the reflective electrode and is connected to the third electrode 105 through the electrode 117.

The description of other structures is omitted because it is similar to that of FIG. 22.

In this embodiment mode, tilting of the liquid crystal material can be sufficiently controlled by electrical fields generated by two pairs of electrodes.

Note that the description in Embodiment Modes 1 to 34 can be applied to or combined with this embodiment mode.

Embodiment Mode 36

In this embodiment mode, a structure which is different from that in foregoing Embodiment Mode 35 in that a transparent electrode is formed in the transmissive region is described.

Figure 33:
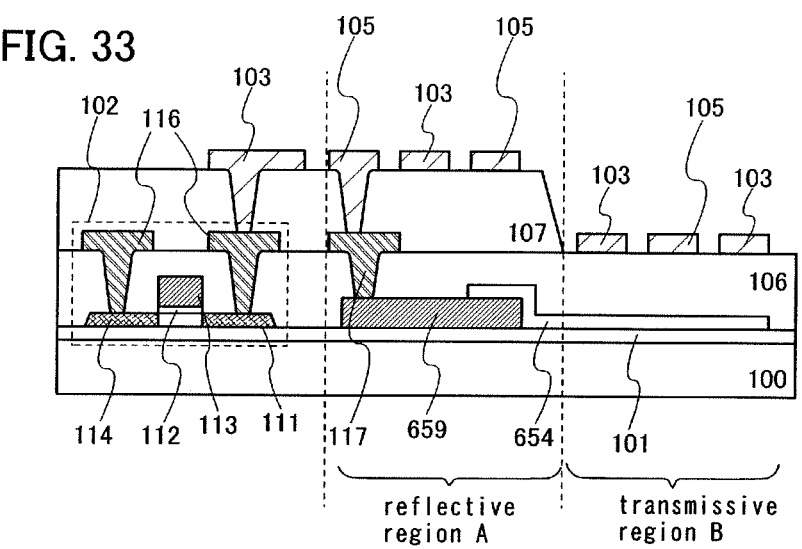
FIG. 33 is a cross-sectional view of a liquid crystal display device of the present invention.

As shown in FIG. 33, the transparent electrode 654 is formed in the transmissive region. The transparent electrode 654 is connected to the conductive layer 659 provided in the reflective region.

With such a structure, a cell gap in the transmissive region can be thickened.

The description of other structures is omitted because it is similar to that of FIG. 32.

In this embodiment mode, tilting of the liquid crystal material can be sufficiently controlled by electrical fields generated by two pairs of electrodes.

Note that description in Embodiment Modes 1 to 35 can be applied to or combined with this embodiment mode.

Embodiment Mode 37

In this embodiment mode, a structure which is different from that in foregoing Embodiment Mode 36 in that a manufacturing order of the reflective electrode and the transparent electrode is changed is described.

Figure 34:
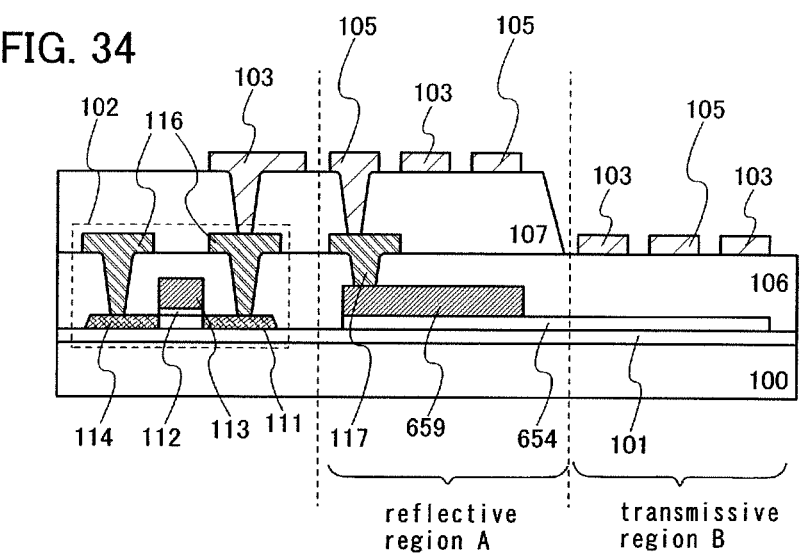
FIG. 34 is a cross-sectional view of a liquid crystal display device of the present invention.

As shown in FIG. 34, the transparent electrode 654 is formed over the base layer 101. After that, the conductive layer 659 is formed only in the reflective region. The conductive layer 659 serves as the reflective electrode.

With such a structure, a cell gap in the transmissive region can be thickened.

The description of other structures is omitted because it is similar to that of FIG. 33.

In this embodiment mode, tilting of the liquid crystal material can be sufficiently controlled by electrical fields generated by two pairs of electrodes.

Note that the description in Embodiment Modes 1 to 36 can be applied to or combined with this embodiment mode.

Embodiment Mode 38

In this embodiment mode, a structure which is different from that in foregoing Embodiment Mode 37 in that the reflective electrode is formed over the insulating layer 106 is described.

Figure 35:
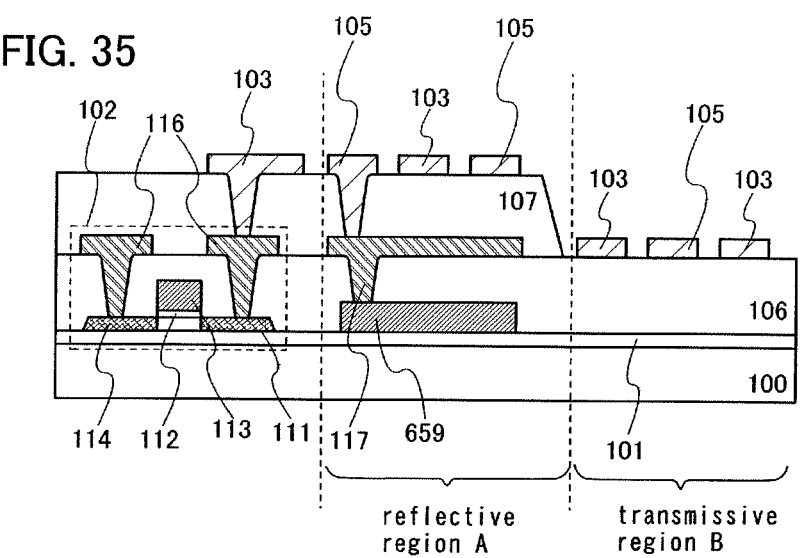
FIG. 35 is a cross-sectional view of a liquid crystal display device of the present invention.

As shown in FIG. 35, an opening is formed in the insulating layer 106 and the electrode 117 connected to the conductive layer 659 is formed. The electrode 117 is formed only in the reflective region so as to serve as the reflective electrode. After that, the insulating layer 107 is formed to cover the electrode 117 and the opening is formed in the insulating layer 107 in the transmissive region.

With such a structure, a cell gap in the transmissive region can be thickened.

The description of other structures is omitted because it is similar to that of FIG. 34.

In this embodiment mode, tilting of the liquid crystal material can be sufficiently controlled by electrical fields generated by two pairs of electrodes.

Note that the description in Embodiment Modes 1 to 37 can be applied to or combined with this embodiment mode.

Embodiment Mode 39

In this embodiment mode, a structure which is different from that in foregoing Embodiment Mode 38 in that the projection and the depression are provided in the insulating layer 106 is described.

Figure 36:
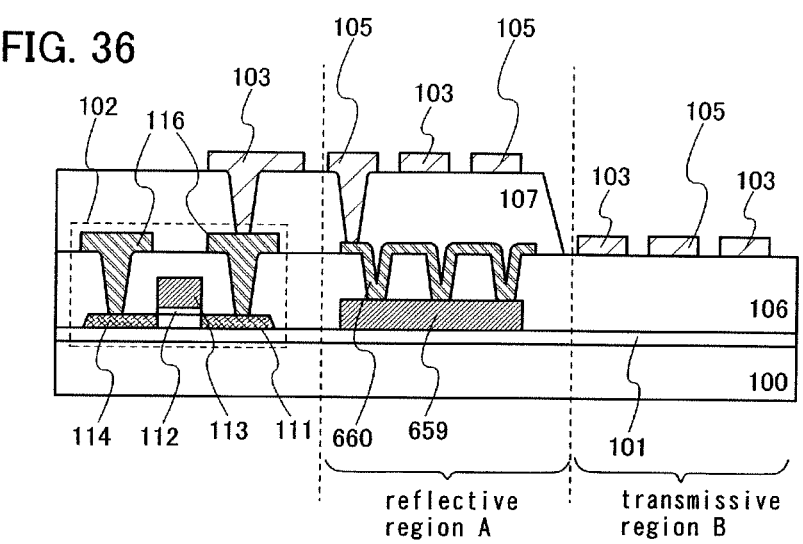
FIG. 36 is a cross-sectional view of a liquid crystal display device of the present invention.

As shown in FIG. 36, the conductive layer 659 is provided over the base layer 101 and the insulating layer 106 is formed to cover the conductive layer 659. The projection and the depression are formed in the insulating layer 106 above the conductive layer 659. The conductive layer 660 is formed along the projection and the depression. The conductive layer 660 is connected to the conductive layer 659. The conductive layer 660 may be formed of the same material as the electrode 117. At this time, the lower surface of the conductive layer 660, that is, the bottom surface of the conductive layer 660 in the depression is entirely in contact with the conductive layer 659.

With such a structure, a cell gap in the transmissive region can be thickened.

The description of other structures is omitted because it is similar to that of FIG. 35.

In this embodiment mode, tilting of the liquid crystal material can be sufficiently controlled by electrical fields generated by two pairs of electrodes.

Note that the description in Embodiment Modes 1 to 38 can be applied to or combined with this embodiment mode.

Embodiment Mode 40

In this embodiment mode, a structure which is different from that in foregoing Embodiment Mode 39 in that the bottom surface of the conductive layer 660 is partially in contact with the conductive layer 659 is described.

Figure 37:
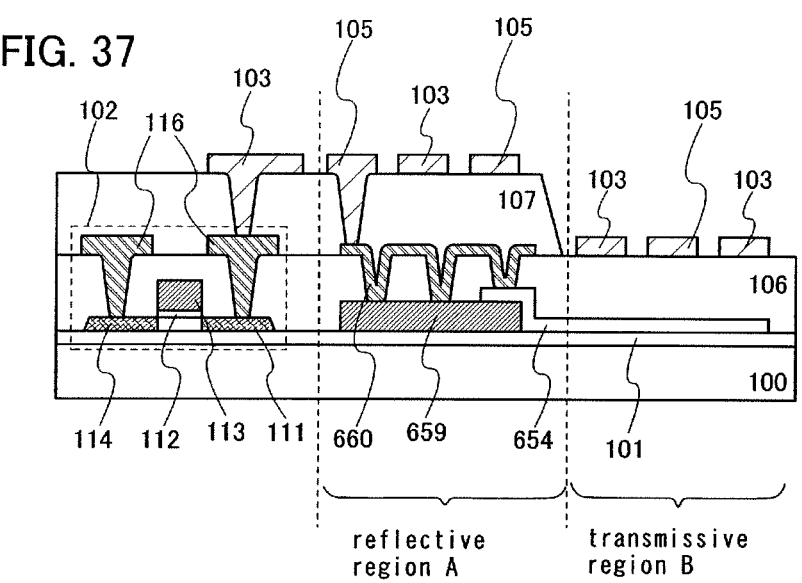
FIG. 37 is a cross-sectional view of a liquid crystal display device of the present invention.

As shown in FIG. 37, the projection and the depression are formed in the insulating layer 106 above the conductive layer 659. The conductive layer 660 is formed along the projection and the depression. A part of the lower surface of the conductive layer 660, that is, a part of the bottom surface of the conductive layer 660 in the depression is in contact with the conductive layer 659. The transparent electrode 654 is provided to be in contact with the conductive layer 659 and the other part of the bottom surface of the conductive layer 660 is in contact with the transparent electrode 654.

With such a structure, a cell gap in the transmissive region can be thickened.

Description of other structures is omitted because it is similar to that of FIG. 36.

In this embodiment mode, tilting of the liquid crystal material can be sufficiently controlled by electrical fields generated by two pairs of electrodes.

Note that description in Embodiment Modes 1 to 39 can be applied to or combined with this embodiment mode.

Embodiment Mode 41

In this embodiment mode, a structure which is different from that in foregoing Embodiment Mode 30 in that the conductive layer 660 is in contact with the conductive layer 659 and the transparent electrode 654 which are formed over one insulating layer is described.

Figure 38:
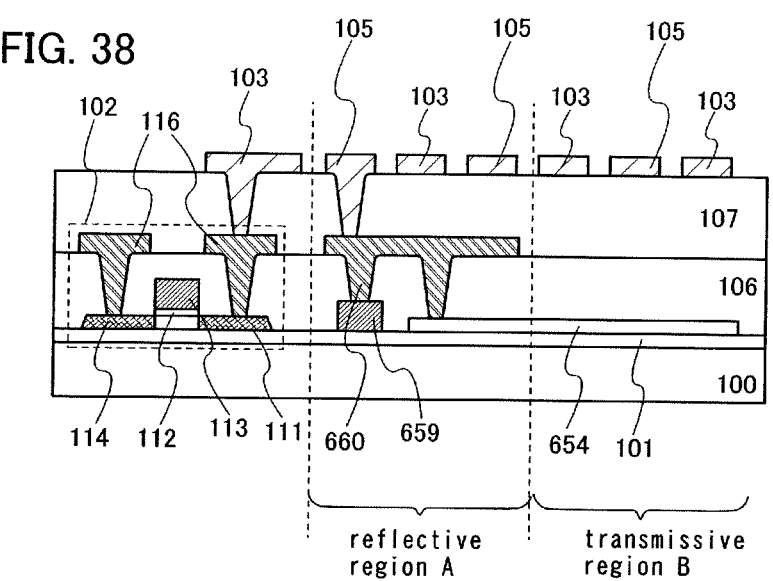
FIG. 38 is a cross-sectional view of a liquid crystal display device of the present invention.

As shown in FIG. 38, the insulating layer 106 is formed to cover the conductive layer 659 and the transparent electrode 654 which are formed over the base layer 101. The opening is formed in the insulating layer 106 so as to expose the conductive layer 659 and the transparent electrode 654. The conductive layer 660 is formed in the opening so as to be in contact with the conductive layer 659 and the transparent electrode 654.

With such a structure, the conductive layer 659 can be used as the common wire.

The description of other structures is omitted because it is similar to that of FIG. 27.

In this embodiment mode, tilting of the liquid crystal material can be sufficiently controlled by electrical fields generated by two pairs of electrodes.

Note that the description in Embodiment Modes 1 to 40 can be applied to or combined with this embodiment mode.

Embodiment Mode 42

In this embodiment mode, a structure which is different from that in foregoing Embodiment Mode 41 in that the opening is formed in the insulating layer 107 is described.

Figure 39:
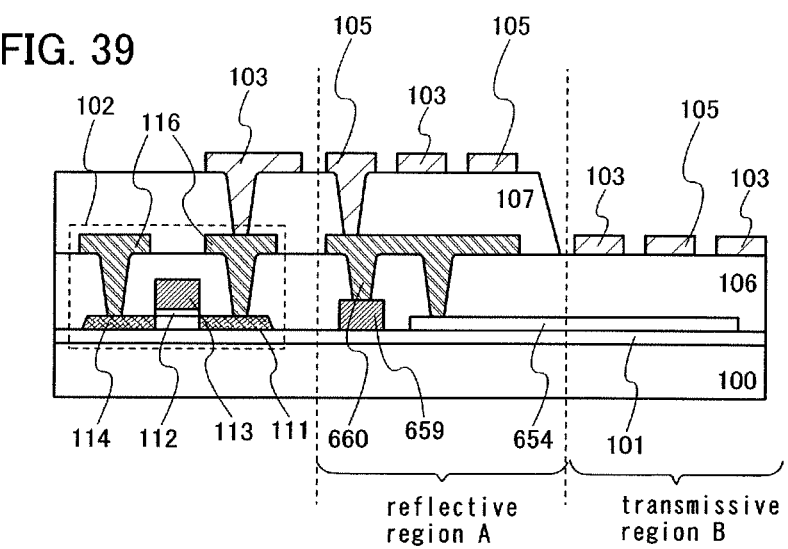
FIG. 39 is a cross-sectional view of a liquid crystal display device of the present invention.

As shown in FIG. 39, the opening is provided in the insulating layer 107 in the transmissive region. The first electrode 103 and the third electrode 105 are partially formed over the insulating layer 106.

With such a structure, the conductive layer 659 can be used as the common wire.

The description of other structures is omitted because it is similar to that of FIG. 38.

In this embodiment mode, tilting of the liquid crystal material can be sufficiently controlled by electrical fields generated by two pairs of electrodes.

Note that the description in Embodiment Modes 1 to 41 can be applied to or combined with this embodiment mode.

Embodiment Mode 43

In this embodiment mode, a structure which is different from that in foregoing Embodiment Mode 42 in that the projection and the depression are formed in the insulating layer 106 is described.

Figure 40:
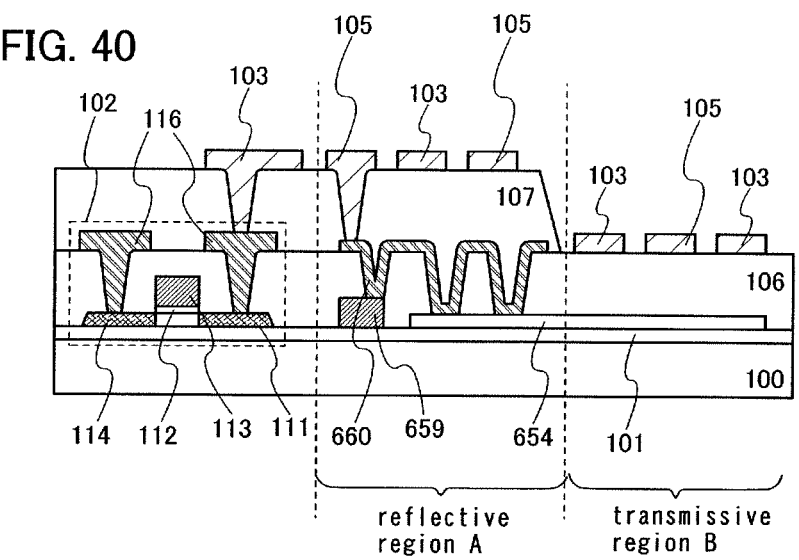
FIG. 40 is a cross-sectional view of a liquid crystal display device of the present invention.

As shown in FIG. 40, the projection and the depression are formed in the insulating layer 106 in the reflective region. The conductive layer 660 is formed along the projection and the depression. A part of the conductive layer 660 is connected to the third electrode 105 and another part of the conductive layer 660 is connected to the conductive layer 659 and the transparent electrode 654.

With such a structure, the conductive layer 659 can be used as the common wire.

The description of other structures is omitted because it is similar to that of FIG. 39.

In this embodiment mode, tilting of the liquid crystal material can be sufficiently controlled by electrical fields generated by two pairs of electrodes.

Note that the description in Embodiment Modes 1 to 42 can be applied to or combined with this embodiment mode.

Embodiment Mode 44

In this embodiment mode, a structure which is different from that shown in FIG. 2 in that the reflective region and the transmissive region is provided and the reflective electrode 652 is formed only in the reflective region is described.

Figure 41:
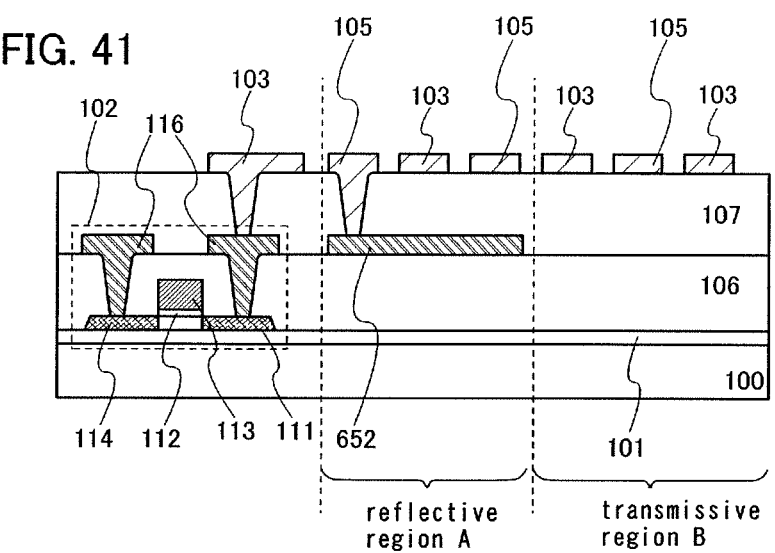
FIG. 41 is a cross-sectional view of a liquid crystal display device of the present invention.

As shown in FIG. 41, the reflective electrode 652 is formed over the insulating layer 106 in the reflective region. Then, the reflective electrode 652 and the third electrode 105 are connected.

The description of other structures is omitted because it is similar to that of FIG. 2.

In this embodiment mode, tilting of the liquid crystal material can be sufficiently controlled by electrical fields generated by two pairs of electrodes.

Note that the description in Embodiment Modes 1 to 43 can be applied to or combined with this embodiment mode.

Embodiment Mode 45

In this embodiment mode, a structure which is different from that in foregoing Embodiment Mode 44 in that the reflective electrode is formed in the insulating layer 106 having the projection and the depression is described.

Figure 42:
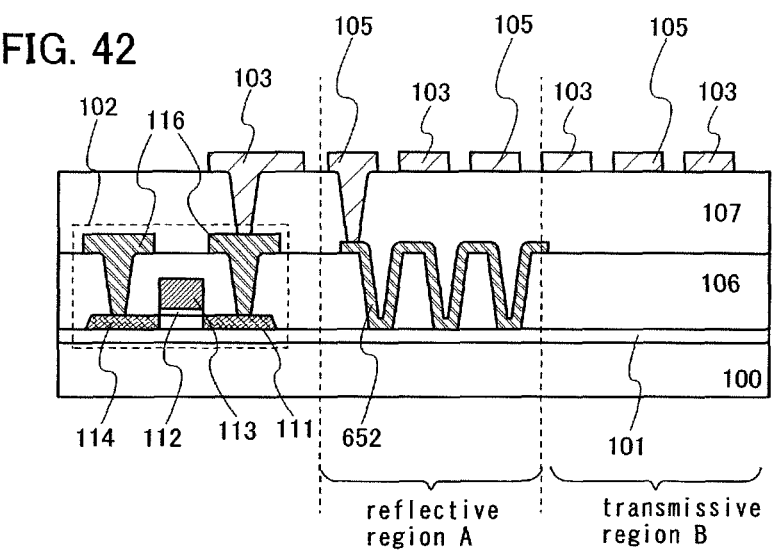
FIG. 42 is a cross-sectional view of a liquid crystal display device of the present invention.

As shown in FIG. 42, the projection and the depression are formed in the insulating layer 106 in the reflective region. The reflective electrode 652 is formed along the projection and the depression. The reflective electrode 652 and the third electrode 105 are connected.

The projection and the depression can be formed at the same time as forming the contact hole in the insulating layer 106. Therefore, the reflective electrode with the projection and the depression can be formed without additional steps being required.

The description of other structures is omitted because it is similar to that of FIG. 41.

In this embodiment mode, tilting of the liquid crystal material can be sufficiently controlled by electrical fields generated by two pairs of electrodes.

Note that the description in Embodiment Modes 1 to 44 can be applied to or combined with this embodiment mode.

Embodiment Mode 46

In this embodiment mode, a structure which is different from that in foregoing Embodiment Mode 44 in that the opening is formed in the insulating layer 107 is described.

Figure 43:
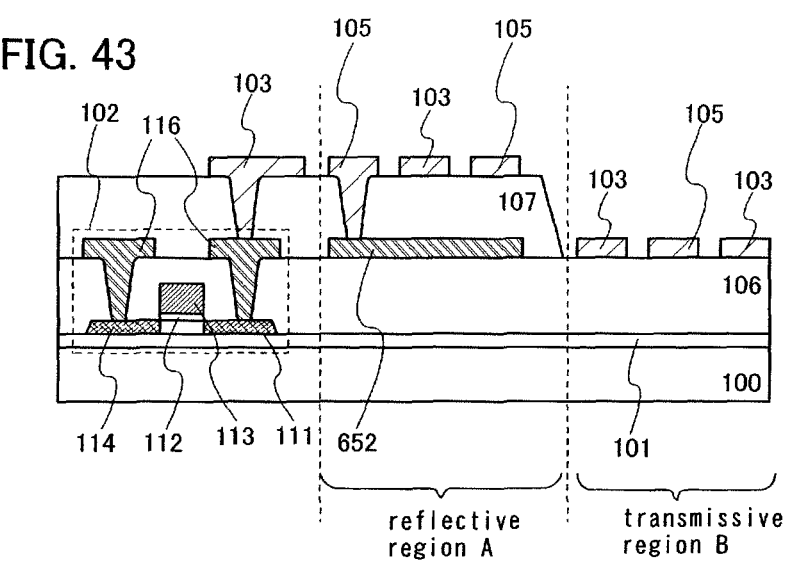
FIG. 43 is a cross-sectional view of a liquid crystal display device of the present invention.

As shown in FIG. 43, the opening is formed in the insulating layer 107 in the transmissive region. The reflective electrode 652 is formed over the insulating layer 106.

The description of other structures is omitted because it is similar to that of FIG. 41.

In this embodiment mode, tilting of the liquid crystal material can be sufficiently controlled by electrical fields generated by two pairs of electrodes.

Note that the description in Embodiment Modes 1 to 45 can be applied to or combined with this embodiment mode.

Embodiment Mode 47

In this embodiment mode, a structure which is different from that shown in FIG. 2 in that only the reflective region is provided is described.

Figure 44:
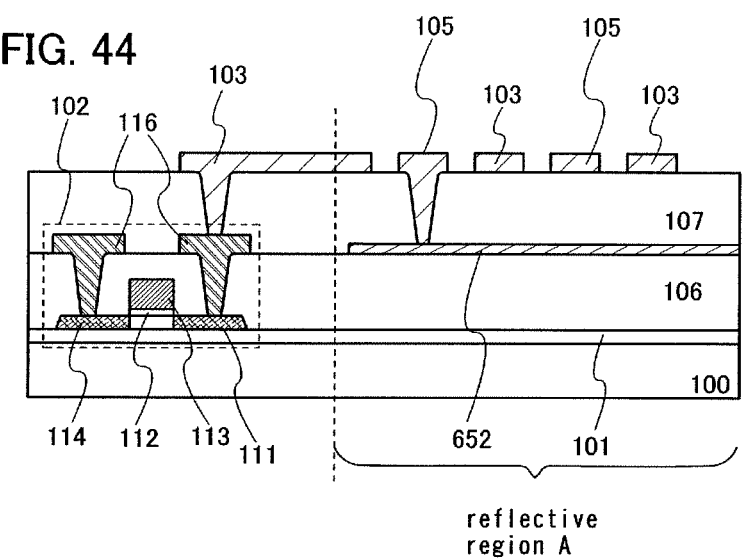
FIG. 44 is a cross-sectional view of a liquid crystal display device of the present invention.

As shown in FIG. 44, the wire 121 shown in FIG. 2 is not formed and the reflective electrode 652 is formed over the insulating layer 106 in the reflective region.

The description of other structures is omitted because it is similar to that of FIG. 2.

In this embodiment mode, tilting of the liquid crystal material can be sufficiently controlled by electrical fields generated by two pairs of electrodes.

Note that the description in Embodiment Modes 1 to 46 can be applied to or combined with this embodiment mode.

Embodiment Mode 48

In this embodiment mode, a structure which is different from that in foregoing Embodiment Mode 47 in that the projection and the depression are provided in the insulating layer 106 and the reflective electrode is formed along the projection and the depression is described.

Figure 45:
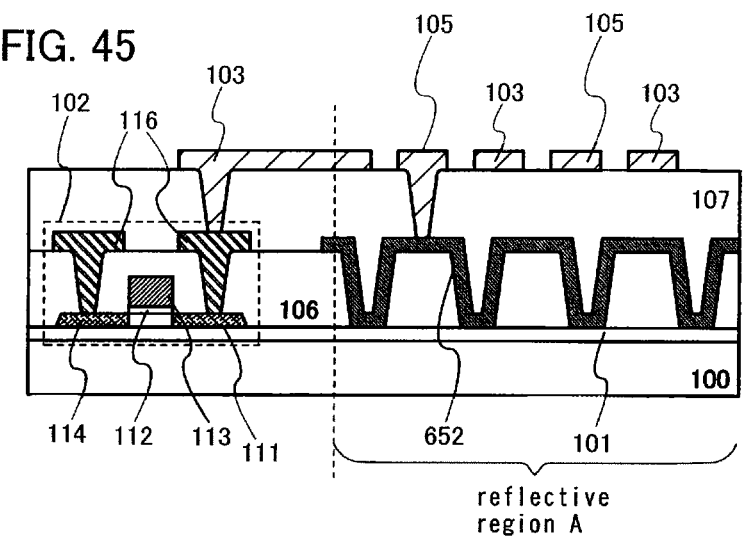
FIG. 45 is a cross-sectional view of a liquid crystal display device of the present invention.

As shown in FIG. 45, the projection and the depression are provided on the surface of the insulating layer 106 in the reflective region. The reflective electrode 652 is formed along the projection and the depression. A shape of the projection and the depression formed in the insulating layer 106 is not necessarily an opening. In addition, the projection and the depression can be formed at the same time as forming openings for a source electrode and a drain electrode of a thin film transistor. Note that the projection and the depression are formed for enhancing reflectance and any shape may be employed without departing from the scope.

The projection and the depression can be formed at the same time as forming the contact hole in the insulating layer 106. Therefore, the reflective electrode with the projection and the depression can be formed without additional steps being required.

The description of other structures is omitted because it is similar to that of FIG. 44.

In this embodiment mode, tilting of the liquid crystal material can be sufficiently controlled by electrical fields generated by two pairs of electrodes.

Note that the description in Embodiment Modes 1 to 47 can be applied to or combined with this embodiment mode.

Embodiment Mode 49

In this embodiment mode, a structure which is different from that in foregoing Embodiment Mode 47 in that a projection is formed over the insulating layer 106 is described.

Figure 46:
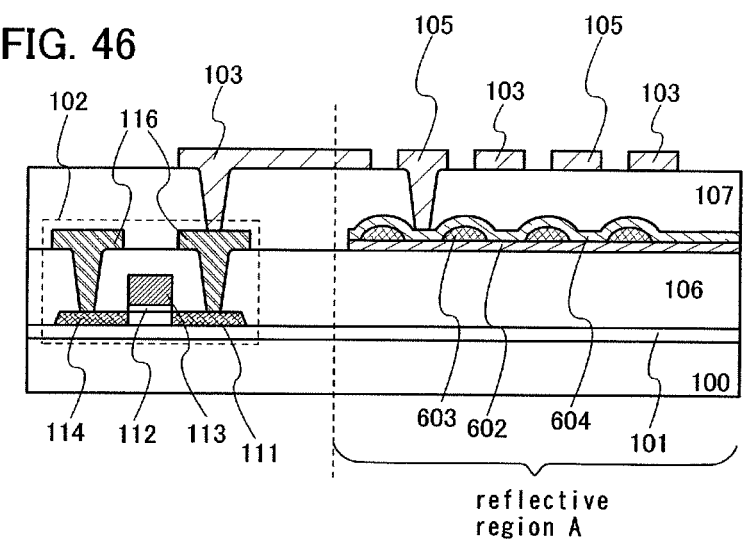
FIG. 46 is a cross-sectional view of a liquid crystal display device of the present invention.

As shown in FIG. 46, a conductive layer 602 is formed over the insulating layer 106 in the reflective region. The conductive layer 602 can be formed in the same layer as the source and drain electrodes 116.

A projection 603 is formed over the conductive layer 602 to form a projection and a depression. The projection 603 is formed by patterning an organic layer. A conductive layer 604 is formed to cover the projection 603. The conductive layer 602 and the conductive layer 604 are connected between the projections 603. The conductive layer 604 serves as the reflective electrode.

The conductive layer 604 is connected to the third electrode 105 through the opening provided in the insulating layer 107.

The description of other structures is omitted because it is similar to that of FIG. 44.

In this embodiment mode, tilting of the liquid crystal material can be sufficiently controlled by electrical fields generated by two pairs of electrodes.

Note that the description in Embodiment Modes 1 to 48 can be applied to or combined with this embodiment mode.

Embodiment Mode 50

In this embodiment mode, a structure which is different from that in foregoing Embodiment Mode 49 in that the conductive layer 602 is not formed is described.

Figure 47:
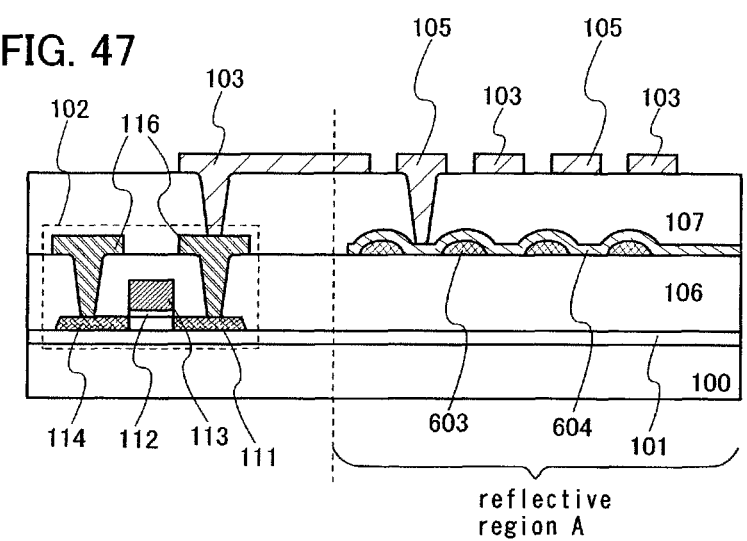
FIG. 47 is a cross-sectional view of a liquid crystal display device of the present invention.

As shown in FIG. 47, the projection 603 is formed over the insulating layer 106. The conductive layer 604 is formed to cover the projection 603. The conductive layer 604 serves as the reflective electrode.

The description of other structures is omitted because it is similar to that of FIG. 46.

In this embodiment mode, tilting of the liquid crystal material can be sufficiently controlled by electrical fields generated by two pairs of electrodes.

Note that the description in Embodiment Modes 1 to 49 can be applied to or combined with this embodiment mode.

Embodiment Mode 51

In this embodiment mode, a structure which is different from that in foregoing Embodiment Mode 47 in that the reflective region and the transmissive region are provided is described.

Figure 48:
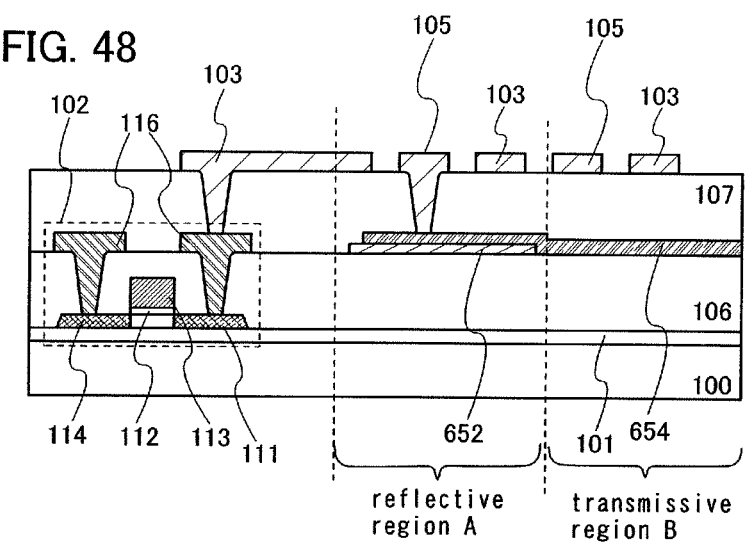
FIG. 48 is a cross-sectional view of a liquid crystal display device of the present invention.

As shown in FIG. 48, the reflective electrode 652 is formed over the insulating layer 106 in the reflective region. The transparent electrode 654 connected to the reflective electrode 652 is formed in the transmissive region.

The description of other structures is omitted because it is similar to that of FIG. 44.

In this embodiment mode, tilting of the liquid crystal material can be sufficiently controlled by electrical fields generated by two pairs of electrodes.

Note that the description in Embodiment Modes 1 to 50 can be applied to or combined with this embodiment mode.

Embodiment Mode 52

In this embodiment mode, a structure which is different from that in foregoing Embodiment Mode 51 in that a manufacturing order of the reflective electrode and the transparent electrode is changed is described.

Figure 49:
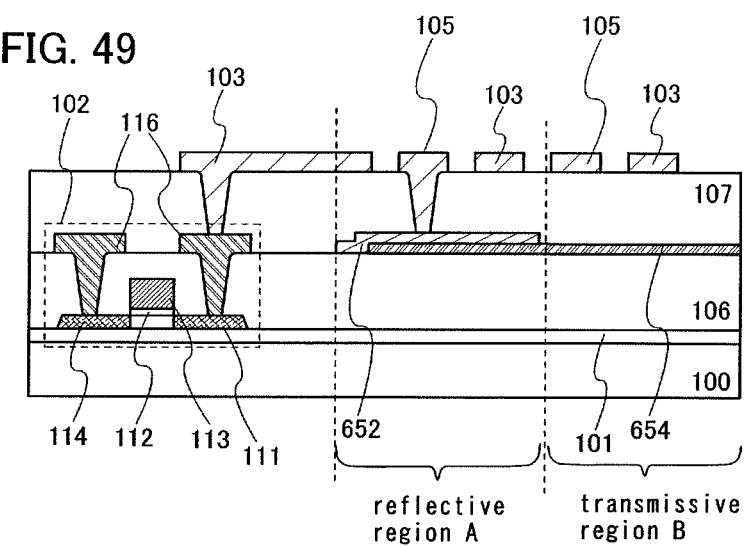
FIG. 49 is a cross-sectional view of a liquid crystal display device of the present invention.

As shown in FIG. 49, the transparent electrode 654 is formed in the reflective region and the transmissive region. Then, the reflective electrode 652 connected to the transparent electrode 654 is formed in the reflective region The description of other structures is omitted because it is similar to that of FIG. 48.

In this embodiment mode, tilting of the liquid crystal material can be sufficiently controlled by electrical fields generated by two pairs of electrodes.

Note that the description in Embodiment Modes 1 to 51 can be applied to or combined with this embodiment mode.

Embodiment Mode 53

In this embodiment mode, a structure which is different from that in foregoing Embodiment Mode 51 in that openings are provided in the insulating layers 106 and 107 in the transmissive region is described.

Figure 50:
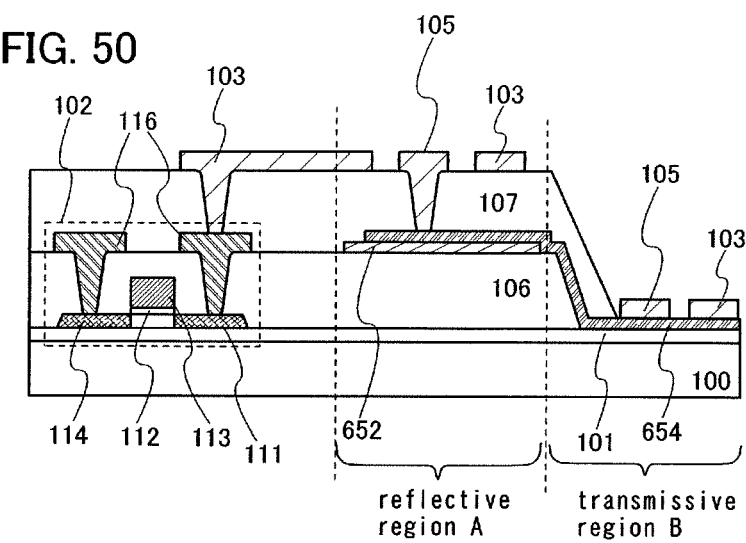
FIG. 50 is a cross-sectional view of a liquid crystal display device of the present invention.

As shown in FIG. 50, the opening is formed in the insulating layer 106 in the transmissive region. In the reflective region, the reflective electrode 652 is formed over the insulating layer 106. The transparent electrode 654 connected to the reflective electrode 652 is formed in the opening in the insulating layer 106.

After that, the opening is also formed in the insulating layer 107 in the transmissive region so as to expose the transparent electrode 654. Parts of the first electrode 103 and the third electrode 105 are formed over the exposed transparent electrode 654.

The description of other structures is omitted because it is similar to that of FIG. 48.

In this embodiment mode, tilting of the liquid crystal material can be sufficiently controlled by electrical fields generated by two pairs of electrodes.

Note that the description in Embodiment Modes 1 to 52 can be applied to or combined with this embodiment mode.

Embodiment Mode 54

In this embodiment mode, a structure which is different from that in foregoing Embodiment Mode 51 in that the projection and the depression are provided in the insulating layer 106 is described.

Figure 51:
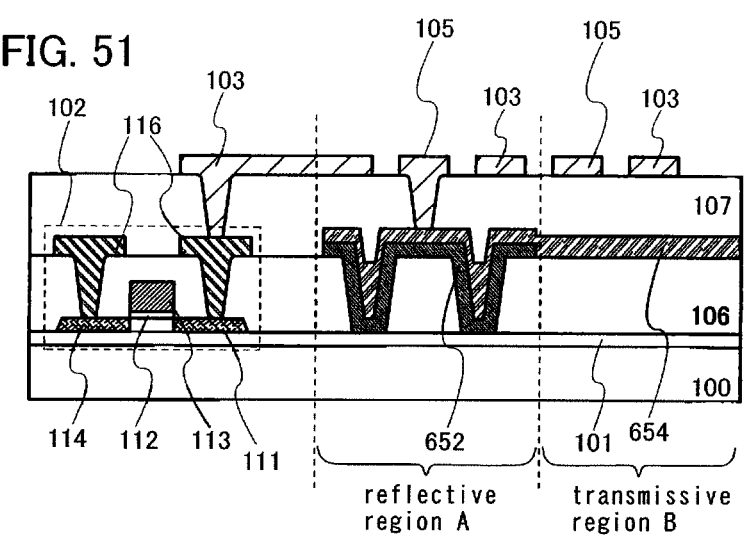
FIG. 51 is a cross-sectional view of a liquid crystal display device of the present invention.

As shown in FIG. 51, the projection and the depression are provided in the insulating layer 106 in the reflective region. The reflective electrode 652 is formed along the projection and the depression. Reflectance of the reflective electrode 652 can be enhanced with the projection and the depression provided.

The projection and the depression can be formed at the same time as forming the contact hole in the insulating layer 106. Therefore, the reflective electrode with the projection and the depression can be formed without additional steps being required.

Then, the transparent electrode 654 is formed in the reflective region and the transmissive region. The transparent electrode 654 is connected to the reflective electrode 652 provided in the reflective region. The transparent electrode 654 is connected to the third electrode 105.

The description of other structures is omitted because it is similar to that of FIG. 48.

In this embodiment mode, tilting of the liquid crystal material can be sufficiently controlled by electrical fields generated by two pairs of electrodes.

Note that the description in Embodiment Modes 1 to 53 can be applied to or combined with this embodiment mode.

Embodiment Mode 55

In this embodiment mode, a structure which is different from that in foregoing Embodiment Mode 51 in that a projection is formed in the reflective region is described.

Figure 52:
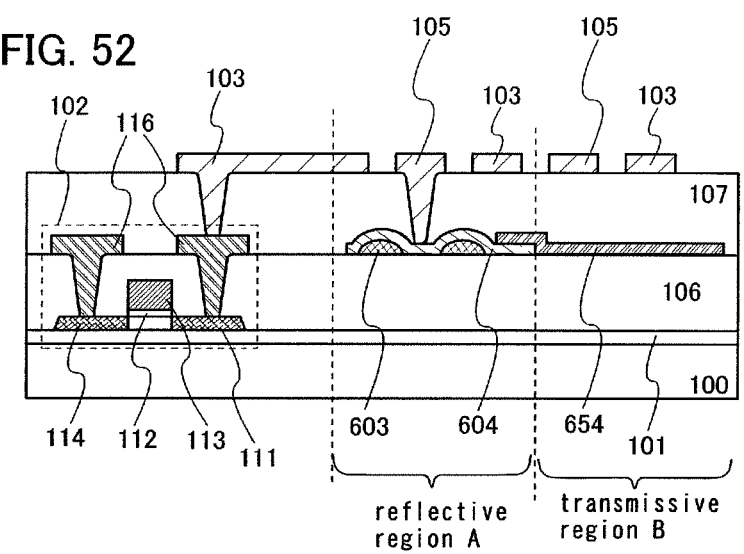
FIG. 52 is a cross-sectional view of a liquid crystal display device of the present invention.

As shown in FIG. 52, the projection 603 is formed over the insulating layer 106 in the reflective region. The conductive layer 604 is formed to cover the projection 603. The conductive layer 604 serves as the reflective electrode.

The transparent electrode 654 is formed in the transmissive region. The transparent electrode 654 is connected to the conductive layer 604 formed in the reflective region.

The description of other structures is omitted because it is similar to that of FIG. 48.

In this embodiment mode, tilting of the liquid crystal material can be sufficiently controlled by electrical fields generated by two pairs of electrodes.

Note that the description in Embodiment Modes 1 to 54 can be applied to or combined with this embodiment mode.

Embodiment Mode 56

In this embodiment mode, a structure which is different from that in foregoing Embodiment Mode 55 in that a manufacturing order of the reflective electrode 652 and the transparent electrode 654 is changed is described.

Figure 53:
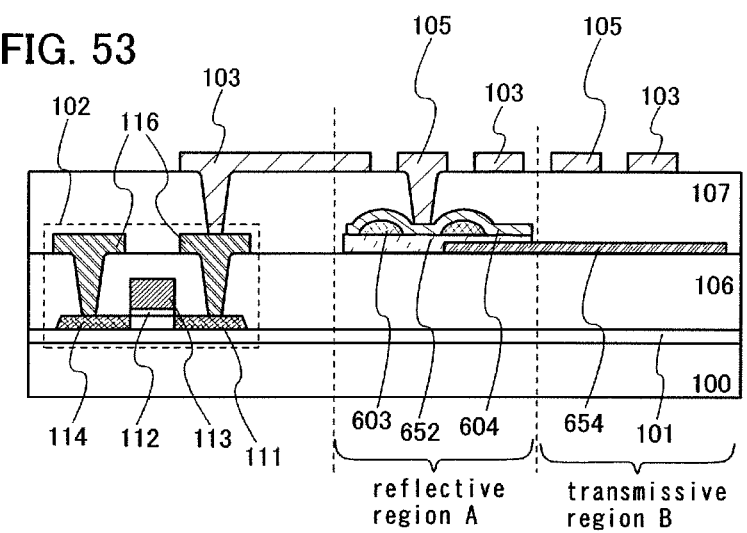
FIG. 53 is a cross-sectional view of a liquid crystal display device of the present invention.

As shown in FIG. 53, the transparent electrode 654 is formed over the reflective region and the transmissive region. The reflective electrode 652 is formed so as to be connected to the transparent electrode 654 in the reflective region. In this embodiment mode, the reflective electrode 652 is formed to be overlapped with a part of the transparent electrode 654.

The projection 603 is formed over the reflective electrode 652 in the reflective region. The conductive layer 604 is formed to cover the projection 603. The conductive layer 604 and the reflective electrode 652 are connected between the projections 603.

The description of other structures is omitted because it is similar to that of FIG. 52.

In this embodiment mode, tilting of the liquid crystal material can be sufficiently controlled by electrical fields generated by two pairs of electrodes.

Note that the description in Embodiment Modes 1 to 55 can be applied to or combined with this embodiment mode.

Embodiment Mode 57

In this embodiment mode, a structure which is different from that in foregoing Embodiment Mode 56 in that the reflective electrode 652 is not provided is described.

Figure 54:
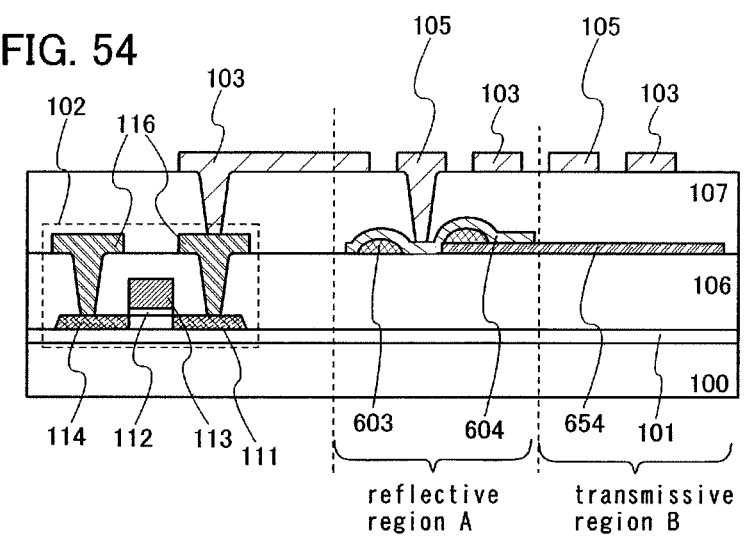
FIG. 54 is a cross-sectional view of a liquid crystal display device of the present invention.

As shown in FIG. 54, the transparent electrode 654 is formed over the reflective region and the transmissive region. The projection 603 is formed in the reflective region. A part of the projection 603 is formed over the transparent electrode 654.

The conductive layer 604 is formed to cover the projection 603. The conductive layer 604 serves as the reflective electrode.

The description of other structures is omitted because it is similar to that of FIG. 53.

In this embodiment mode, tilting of the liquid crystal material can be sufficiently controlled by electrical fields generated by two pairs of electrodes.

Note that the description in Embodiment Modes 1 to 56 can be applied to or combined with this embodiment mode.

Embodiment Mode 58

In this embodiment mode, a structure which is different from that in foregoing Embodiment Mode 51 in that the projection 603 is formed over the insulating layer 106 in the reflective region is described.

Figure 55:
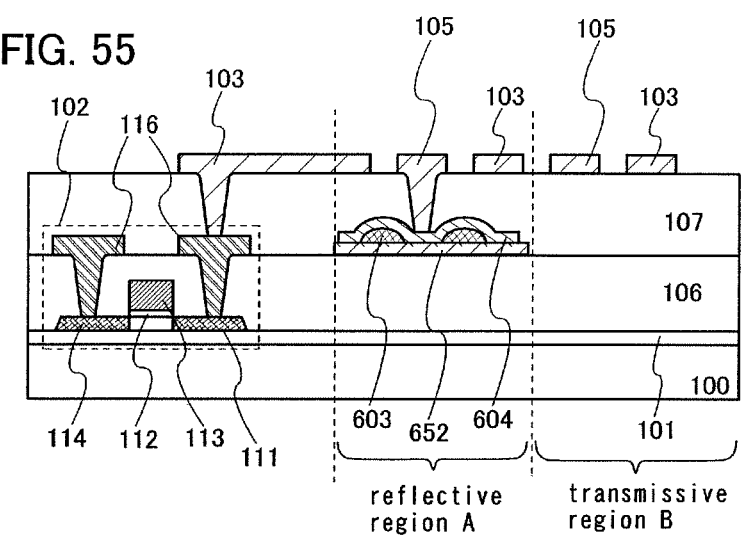
FIG. 55 is a cross-sectional view of a liquid crystal display device of the present invention.

As shown in FIG. 55, the reflective electrode 652 is formed over the insulating layer 106 in the reflective region. The projection 603 is formed over the reflective electrode 652. The conductive layer 604 is formed to cover the projection 603.

The description of other structures is omitted because it is similar to that of FIG. 48.

In this embodiment mode, tilting of the liquid crystal material can be sufficiently controlled by electrical fields generated by two pairs of electrodes.

Note that the description in Embodiment Modes 1 to 57 can be applied to or combined with this embodiment mode.

Embodiment Mode 59

In this embodiment mode, a structure which is different from that in foregoing Embodiment Mode 58 in that the reflective electrode 652 is not provided is described.

Figure 56:
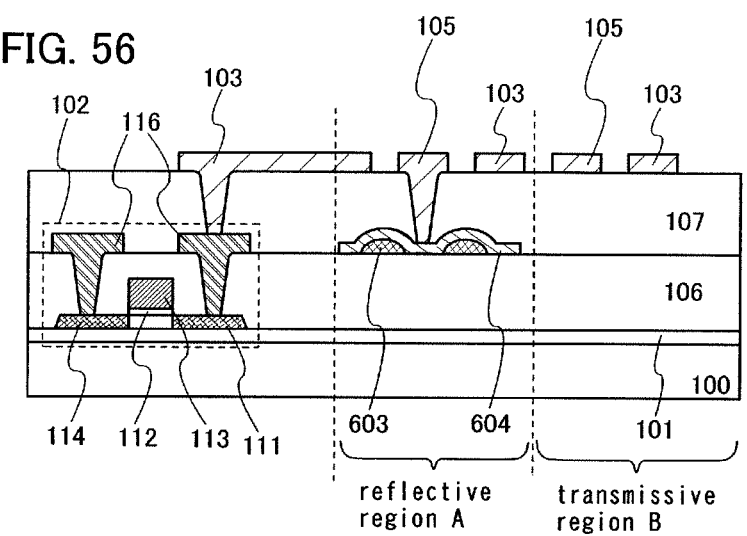
FIG. 56 is a cross-sectional view of a liquid crystal display device of the present invention.

As shown in FIG. 56, the projection 603 is formed in the reflective region. The conductive layer 604 is formed to cover the projection 603. The conductive layer 604 serves as the reflective electrode.

The description of other structures is omitted because it is similar to that of FIG. 55.

In this embodiment mode, tilting of the liquid crystal material can be sufficiently controlled by electrical fields generated by two pairs of electrodes.

Note that the description in Embodiment Modes 1 to 58 can be applied to or combined with this embodiment mode.

Embodiment Mode 60

In this embodiment mode, a structure which is different from that in foregoing Embodiment Mode 59 in that only reflective region is provided is described.

Figure 57:
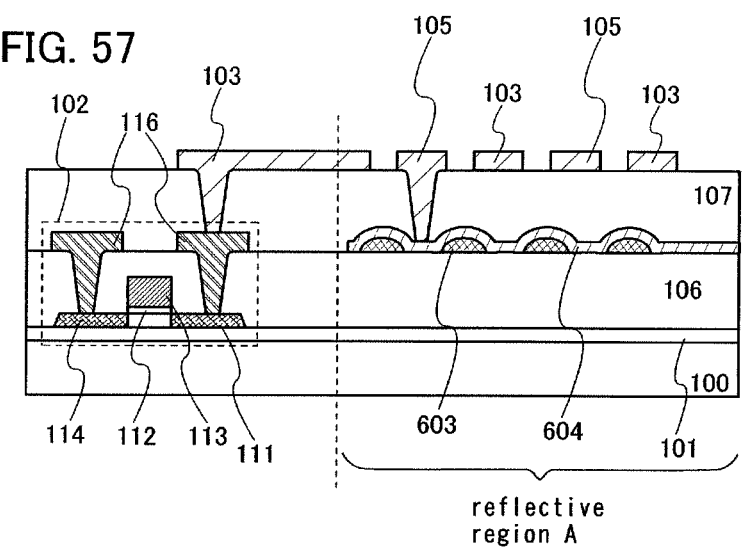
FIG. 57 is a cross-sectional view of a liquid crystal display device of the present invention.

As shown in FIG. 57, only the reflective region is provided and the projection 603 is formed in the reflective region. The conductive layer 604 is formed to cover the projection 603. The conductive layer 604 can be formed of the same layer as the source and drain electrodes 116.

The description of other structures is omitted because it is similar to that of to FIG. 56.

In this embodiment mode, tilting of the liquid crystal material can be sufficiently controlled by electrical fields generated by two pairs of electrodes.

Note that the description in Embodiment Modes 1 to 59 can be applied to or combined with this embodiment mode.

Embodiment Mode 61

In this embodiment mode, a structure which is different from that in foregoing Embodiment Mode 59 in that a conductive layer is formed in the transmissive region after the projection and the conductive layer is formed in the reflective region is described.

Figure 58:
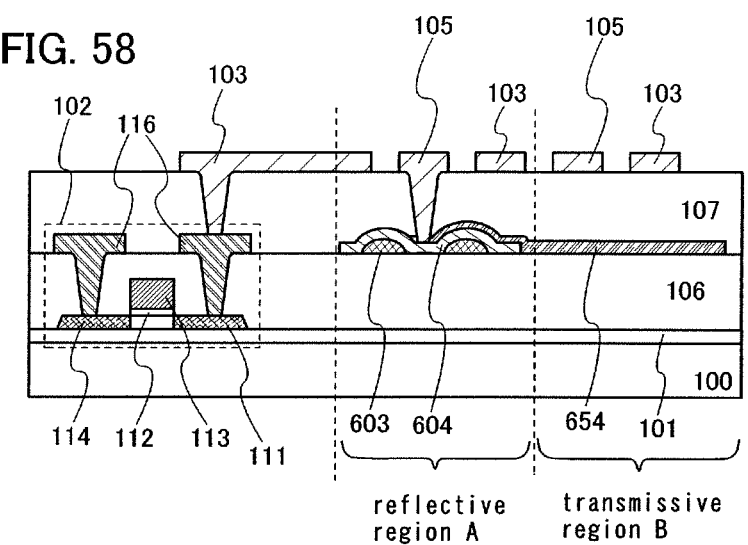
FIG. 58 is a cross-sectional view of a liquid crystal display device of the present invention.

As shown in FIG. 58, the projection 603 is formed in the reflective region. The conductive layer 604 is formed to cover the projection 603. The conductive layer 604 serves as the reflective electrode.

The transparent electrode 654 is formed over the reflective region and the transmissive region. The transparent electrode 654 is connected to the conductive layer 604.

The description of other structures is omitted because it is similar to that of FIG. 56.

In this embodiment mode, tilting of the liquid crystal material can be sufficiently controlled by electrical fields generated by two pairs of electrodes.

Note that the description in Embodiment Modes 1 to 60 can be applied to or combined with this embodiment mode.

Embodiment Mode 62

In this embodiment mode, a structure which is different from that in foregoing Embodiment Mode 61 in that a manufacturing order of the conductive layer 604 and the transparent electrode 654 is changed is described.

Figure 59:
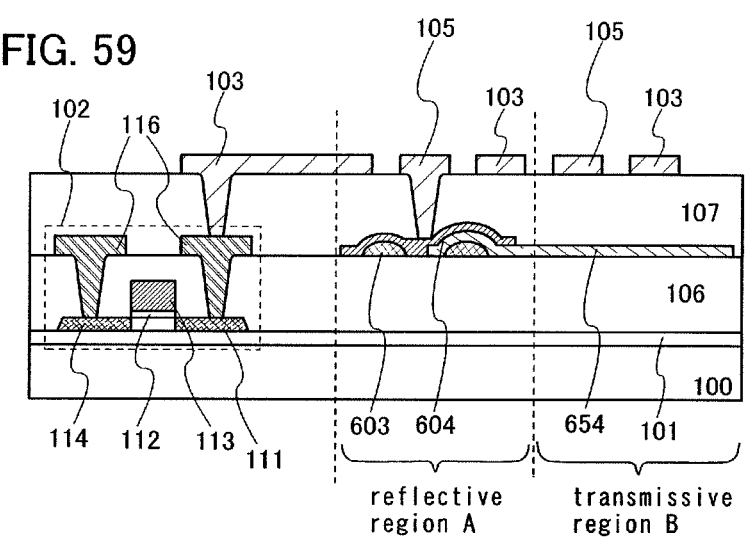
FIG. 59 is a cross-sectional view of a liquid crystal display device of the present invention.

As shown in FIG. 59, the projection 603 is formed in the reflective region. The transparent electrode 654 is formed in the transmissive region, covering the projection 603 partially. After that, the conductive layer 604 connected to the transparent electrode 654 is formed in the reflective region. The conductive layer 604 serves as the reflective electrode.

The description of other structures is omitted because it is similar to that of FIG. 58.

In this embodiment mode, tilting of the liquid crystal material can be sufficiently controlled by electrical fields generated by two pairs of electrodes.

Note that the description in Embodiment Modes 1 to 61 can be applied to or combined with this embodiment mode.

Embodiment Mode 63

In this embodiment mode, a structure which is different from that in foregoing Embodiment Mode 59 in that the projection 603 is formed in the reflective region and a conductive layer covering the projection 603 is formed in the same layer as the source and drain electrodes is described.

Figure 60:
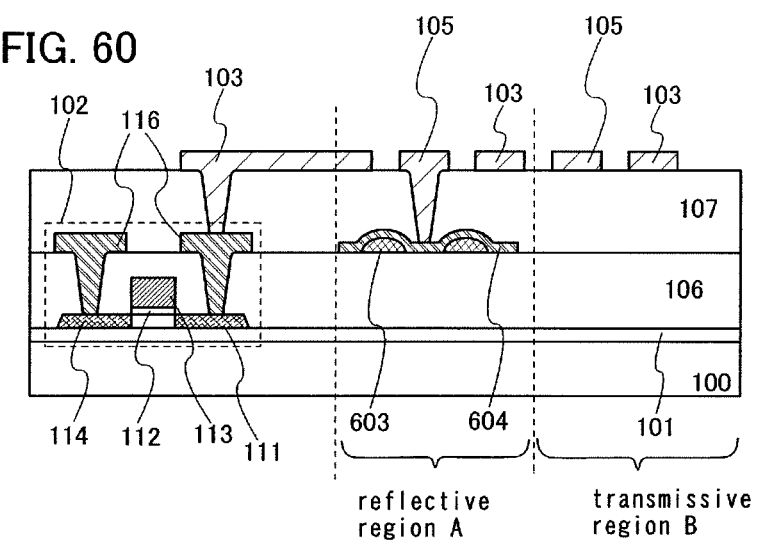
FIG. 60 is a cross-sectional view of a liquid crystal display device of the present invention.

As shown in FIG. 60, the projection 603 is formed in the reflective region. The conductive layer 604 is formed to cover the projection 603. The conductive layer 604 can be formed of the same layer as the source and drain electrodes and serves as the reflective electrode.

The description of other structures is omitted because it is similar to that of FIG. 56.

In this embodiment mode, tilting of the liquid crystal material can be sufficiently controlled by electrical fields generated by two pairs of electrodes.

Note that the description in Embodiment Modes 1 to 62 can be applied to or combined with this embodiment mode.

Embodiment Mode 64

In this embodiment mode, a structure which is different from that shown in FIG. 3 in that the reflective region is provided is described.

Figure 61:
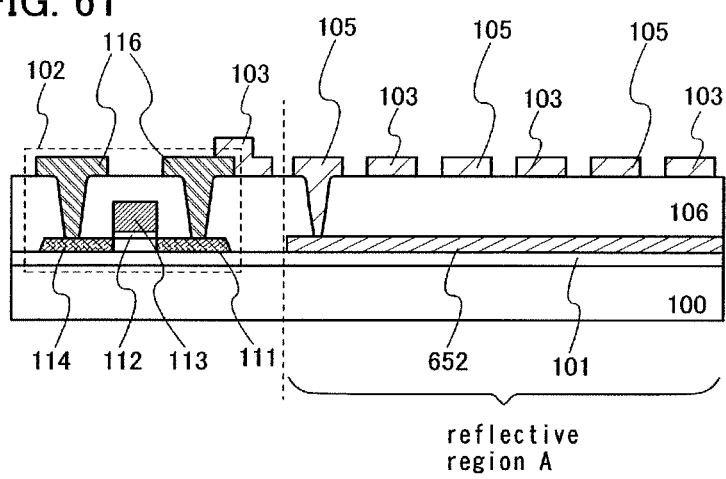
FIG. 61 is a cross-sectional view of a liquid crystal display device of the present invention.

As shown in FIG. 61, the wire 131 shown in FIG. 3 is not formed and the reflective electrode 652 is formed over the base layer 101.

The description of other structures is omitted because it is similar to that of FIG. 3.

In this embodiment mode, tilting of the liquid crystal material can be sufficiently controlled by electrical fields generated by two pairs of electrodes.

Note that the description in Embodiment Modes 1 to 63 can be applied to or combined with this embodiment mode.

Embodiment Mode 65

In this embodiment mode, a structure which is different from that in foregoing Embodiment Mode 64 in that the reflective region and the transmissive region are provided is described.

Figure 62:
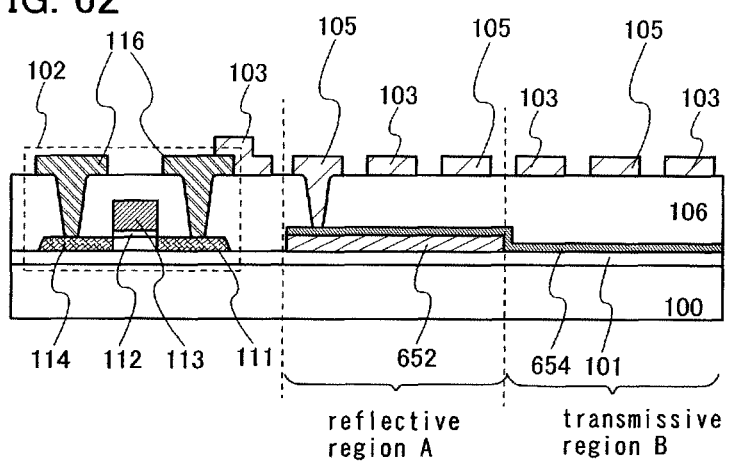
FIG. 62 is a cross-sectional view of a liquid crystal display device of the present invention.

As shown in FIG. 62, the reflective electrode 652 is formed in the reflective region. After that, the transparent electrode 654 is formed in the reflective region and the transmissive region.

The description of other structures is omitted because it is similar to that of FIG. 61.

In this embodiment mode, tilting of the liquid crystal material can be sufficiently controlled by electrical fields generated by two pairs of electrodes.

Note that the description in Embodiment Modes 1 to 64 can be applied to or combined with this embodiment mode.

Embodiment Mode 66

In this embodiment mode, a structure which is different from that in foregoing Embodiment Mode 65 in that a manufacturing order of the reflective electrode and the transparent electrode is changed is described.

Figure 63:
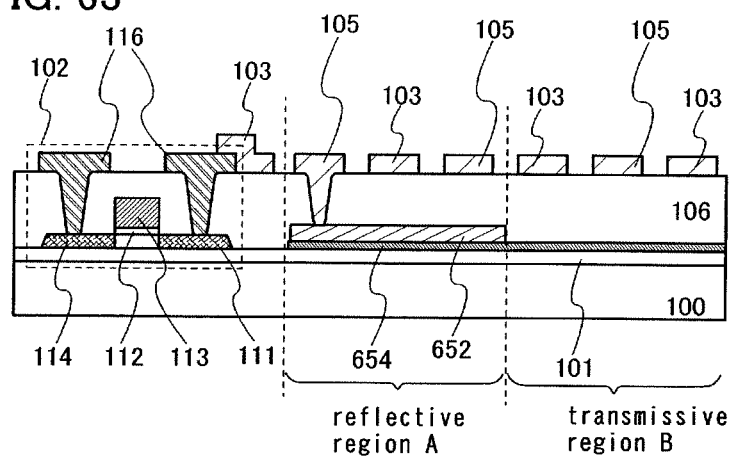
FIG. 63 is a cross-sectional view of a liquid crystal display device of the present invention.

As shown in FIG. 63, the transparent electrode 654 is formed in the reflective region and the transmissive region. Then, the reflective electrode 652 is formed only in the reflective region.

The description of other structures is omitted because it is similar to that of FIG. 62.

In this embodiment mode, tilting of the liquid crystal material can be sufficiently controlled by electrical fields generated by two pairs of electrodes.

Note that the description in Embodiment Modes 1 to 65 can be applied to or combined with this embodiment mode.

Embodiment Mode 67

In this embodiment mode, a structure which is different from that in foregoing Embodiment Mode 65 in that the reflective electrode is selectively formed only in the reflective region is described.

Figure 64:
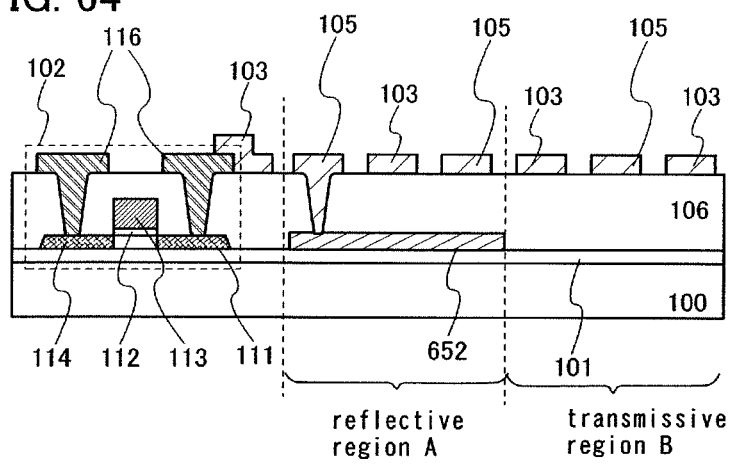
FIG. 64 is a cross-sectional view of a liquid crystal display device of the present invention.

As shown in FIG. 64, the reflective electrode 652 is formed only in the reflective region.

The description of other structures is omitted because it is similar to that of FIG. 61.

In this embodiment mode, tilting of the liquid crystal material can be sufficiently controlled by electrical fields generated by two pairs of electrodes.

Note that description in Embodiment Modes 1 to 66 can be applied to or combined with this embodiment mode.

Embodiment Mode 68

In this embodiment mode, a structure which is different from that shown in FIG. 4 in that the reflective region is provided is described.

Figure 65:
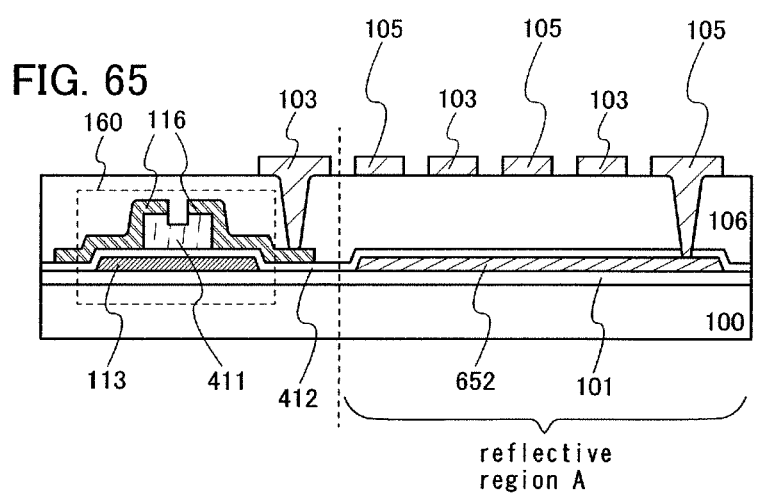
FIG. 65 is a cross-sectional view of a liquid crystal display device of the present invention.

As shown in FIG. 65, the conductive layer 402 shown in FIG. 4 is not formed and the reflective electrode 652 is formed in the reflective region. After that, the reflective electrode 652 is covered with a gate insulating layer 412 of the thin film transistor 160. An opening is formed in the gate insulating layer 412 and the insulating layer 106, and the reflective electrode 652 and the third electrode 105 are connected through the opening.

With such a structure, the reflective electrode 652 can be used as the common wire.

The description of other structures is omitted because it is similar to that of FIG. 4.

In this embodiment mode, tilting of the liquid crystal material can be sufficiently controlled by electrical fields generated by two pairs of electrodes.

Note that the description in Embodiment Modes 1 to 67 can be applied to or combined with this embodiment mode.

Embodiment Mode 69

In this embodiment mode, a structure which is different from that in foregoing Embodiment Mode 68 in that the reflective region and the transmissive region are provided is described.

Figure 66:
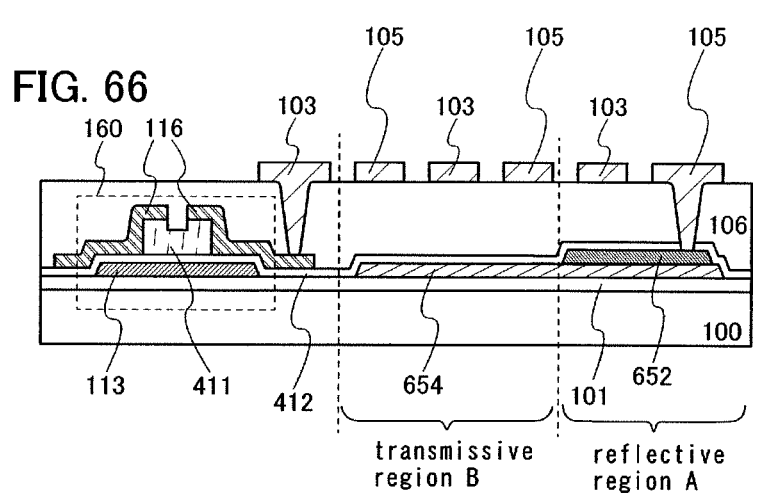
FIG. 66 is a cross-sectional view of a liquid crystal display device of the present invention.

As shown in FIG. 66, the transparent electrode 654 is formed in the reflective region and the transmissive region. Then, the reflective electrode 652 connected to the transparent electrode 654 is formed only in the reflective region. The transparent electrode 654 and the reflective electrode 652 are covered with the gate insulating layer 412. The opening is provided in the gate insulating layer 412 and the insulating layer 106, and the reflective electrode 652 and the third electrode 105 are connected through the opening.

With such a structure, the reflective electrode 652 can be used as the common wire.

The description of other structures is omitted because it is similar to that of FIG. 65.

In this embodiment mode, tilting of the liquid crystal material can be sufficiently controlled by electrical fields generated by two pairs of electrodes.

Note that the description in Embodiment Modes 1 to 68 can be applied to or combined with this embodiment mode.

Embodiment Mode 70

In this embodiment mode, a structure which is different from that in foregoing Embodiment Mode 68 in that the reflective electrode is selectively formed only in the reflective region is described.

Figure 67:
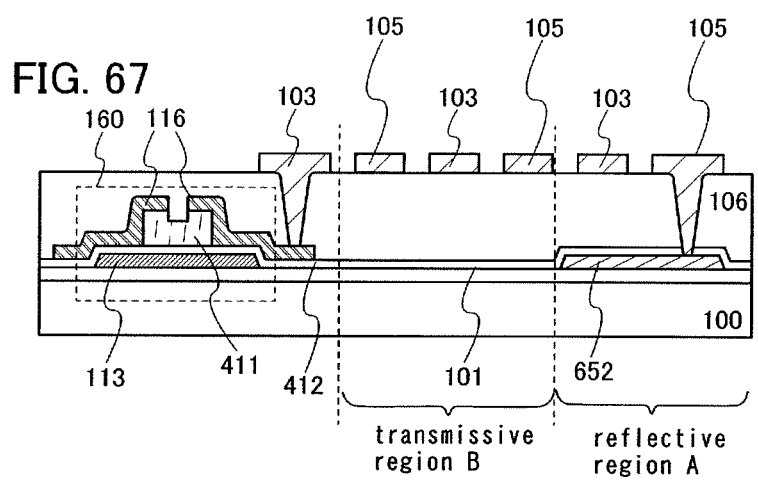
FIG. 67 is a cross-sectional view of a liquid crystal display device of the present invention.

As shown in FIG. 67, the reflective electrode 652 is formed selectively formed only in the reflective region. The reflective electrode 652 is covered with the gate insulating layer 412. The opening is provided in the gate insulating layer 412 and the insulating layer 106, and the reflective electrode 652 and the third electrode 105 are connected through the opening.

With such a structure, the reflective electrode 652 can be used as the common wire.

The description of other structures is omitted because it is similar to that of FIG. 65.

In this embodiment mode, tilting of the liquid crystal material can be sufficiently controlled by electrical fields generated by two pairs of electrodes.

Note that the description in Embodiment Modes 1 to 69 can be applied to or combined with this embodiment mode.

Embodiment Mode 71

In this embodiment mode, a structure which is different from that in foregoing Embodiment Mode 69 in that the opening is formed in the insulating layer 106 in the transmissive region is described.

Figure 68:
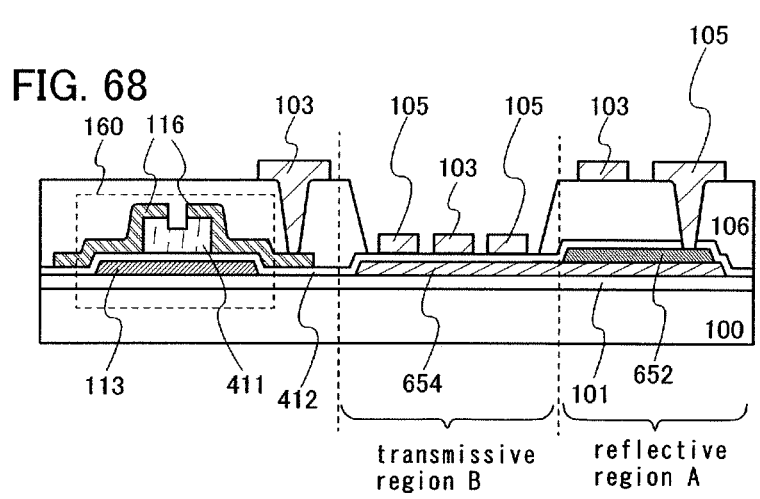
FIG. 68 is a cross-sectional view of a liquid crystal display device of the present invention.

As shown in FIG. 68, the transparent electrode 654 is formed in the transmissive region and the reflective region. Then, the reflective electrode 652 is selectively formed only in the reflective region. The transparent electrode 654 and the reflective electrode 652 are covered with the gate insulating layer 412.

The opening is formed in the insulating layer 106 in the transmissive region. In the opening, parts of the first electrode 103 and the third electrode 105 are formed over the gate insulating layer 412.

With such a structure, the reflective electrode 652 can be used as the common wire.

The description of other structures is omitted because it is similar to that of FIG. 66.

In this embodiment mode, tilting of the liquid crystal material can be sufficiently controlled by electrical fields generated by two pairs of electrodes.

Note that the description in Embodiment Modes 1 to 70 can be applied to or combined with this embodiment mode.

Embodiment Mode 72

In this embodiment mode, a structure which is different from that in foregoing Embodiment Mode 69 in that the opening is formed in the insulating layer 106 in the transmissive region and the transparent electrode is not formed is described.

Figure 69:
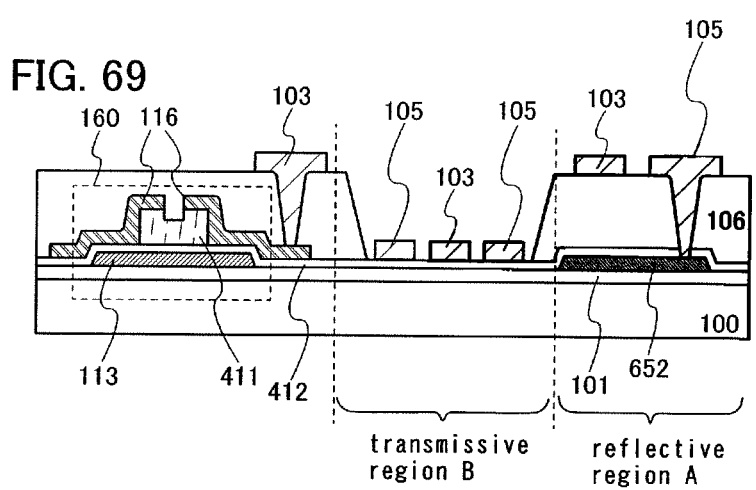
FIG. 69 is a cross-sectional view of a liquid crystal display device of the present invention.

As shown in FIG. 69, the reflective electrode 652 is formed only in the reflective region. The reflective electrode 652 is covered with the gate insulating layer 412.

The opening is formed in the insulating layer 106 in the transmissive region. In the opening, parts of the first electrode 103 and the third electrode 105 are formed over the gate insulating layer 412. In this embodiment mode, the transparent electrode is not formed in the transmissive region.

With such a structure, the reflective electrode 652 can be used as the common wire.

The description of other structures is omitted because it is similar to that of FIG. 66.

In this embodiment mode, tilting of the liquid crystal material can be sufficiently controlled by electrical fields generated by two pairs of electrodes.

Note that the description in Embodiment Modes 1 to 71 can be applied to or combined with this embodiment mode.

Embodiment Mode 73

In this embodiment mode, a structure which is different from that shown in FIG. 5 in that the reflective region is provided is described.

Figure 70:
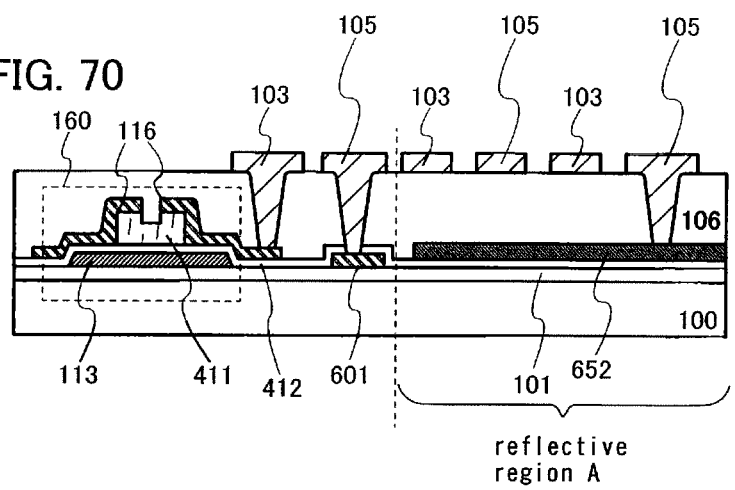
FIG. 70 is a cross-sectional view of a liquid crystal display device of the present invention.

As shown in FIG. 70, the conductive layer 502 shown in FIG. 5 is not formed and the reflective electrode 652 is formed in the reflective region. The reflective electrode 652 is provided over the gate insulating layer 412 of the thin film transistor 160. The opening is formed in the insulating layer 106, and the reflective electrode 652 and the third electrode 105 are connected through the opening.

The conductive layer 601 is formed as a common wire. The conductive layer 601 is connected to the third electrode 105 through the opening in the gate insulating layer 412 and the insulating layer 106.

The description of other structures is omitted because it is similar to that of FIG. 5.

In this embodiment mode, tilting of the liquid crystal material can be sufficiently controlled by electrical fields generated by two pairs of electrodes.

Note that the description in Embodiment Modes 1 to 72 can be applied to or combined with this embodiment mode.

Embodiment Mode 74

In this embodiment mode, a structure which is different from that in foregoing Embodiment Mode 73 in that a projection is provided in the reflective region is described.

Figure 71:
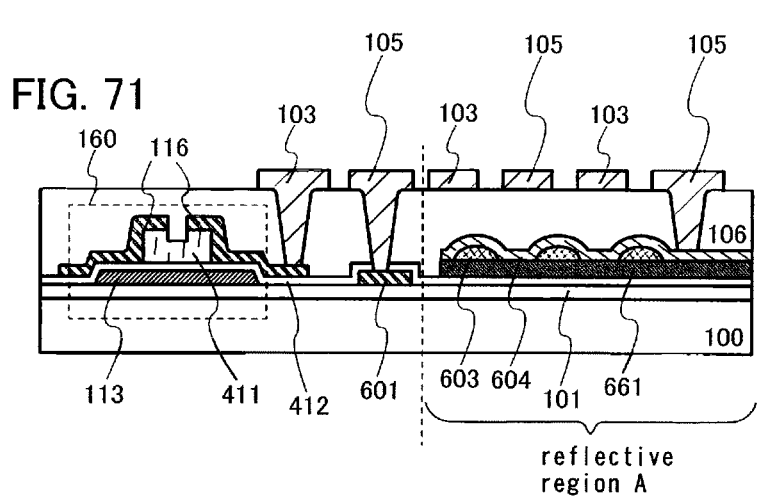
FIG. 71 is a cross-sectional view of a liquid crystal display device of the present invention.

As shown in FIG. 71, a conductive layer 661 is formed in the reflective region. The conductive layer 661 can be formed of the same layer as the source and drain electrodes 116.

The projection 603 is formed over the conductive layer 661. The conductive layer 604 is formed to cover the projection 603. The conductive layer 604 serves as the reflective electrode. The conductive layer 604 and the conductive layer 661 are connected between the projections 603.

The opening is formed in the insulating layer 106 provided to cover the conductive layer 604. The conductive layer 604 and the third electrode 105 are connected through the opening.

The description of other structures is omitted because it is similar to that of FIG. 70.

In this embodiment mode, tilting of the liquid crystal material can be sufficiently controlled by electrical fields generated by two pairs of electrodes.

Note that the description in Embodiment Modes 1 to 73 can be applied to or combined with this embodiment mode.

Embodiment Mode 75

In this embodiment mode, a structure which is different from that in foregoing Embodiment Mode 74 in that the conductive layer 661 is not formed is described.

Figure 72:
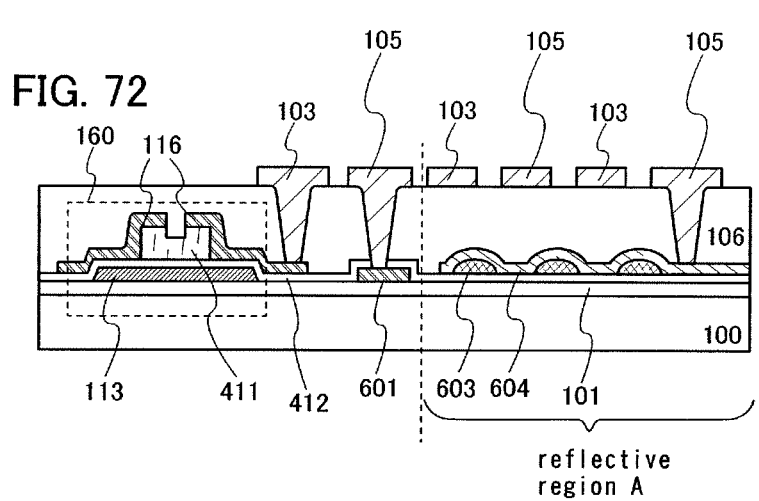
FIG. 72 is a cross-sectional view of a liquid crystal display device of the present invention.

As shown in FIG. 72, the projection 603 is formed over the gate insulating layer 412 in the reflective region. The conductive layer 604 is formed to cover the projection 603. The opening is formed in the insulating layer 106 provided to cover the conductive layer 604. The conductive layer 604 and the third electrode 105 are connected through the opening.

The description of other structures is omitted because it is similar to that of FIG. 71.

In this embodiment mode, tilting of the liquid crystal material can be sufficiently controlled by electrical fields generated by two pairs of electrodes.

Note that the description in Embodiment Modes 1 to 74 can be applied to or combined with this embodiment mode.

Embodiment Mode 76

In this embodiment mode, a structure which is different from that in foregoing Embodiment Mode 73 in that the transmissive region and the reflective region are provided and the reflective electrode is formed only in the reflective region is described.

Figure 73:
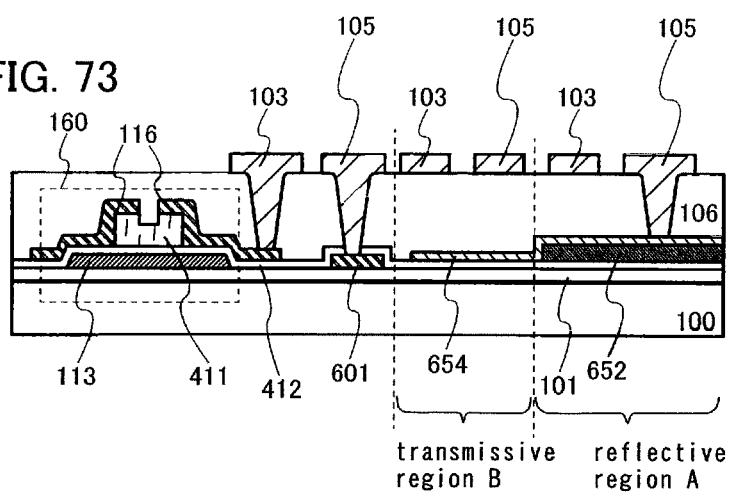
FIG. 73 is a cross-sectional view of a liquid crystal display device of the present invention.

As shown in FIG. 73, the reflective electrode 652 is selectively formed over the gate insulating layer 412 only in the reflective region. Then, the transparent electrode 654 is formed in the reflective region and the transmissive region.

With such a structure, the conductive layer 601 formed at the same time as the gate electrode 113 can be used as the common wire.

The description of other structures is omitted because it is similar to that of FIG. 70.

In this embodiment mode, tilting of the liquid crystal material can be sufficiently controlled by electrical fields generated by two pairs of electrodes.

Note that the description in Embodiment Modes 1 to 75 can be applied to or combined with this embodiment mode.

Embodiment Mode 77

In this embodiment mode, a structure which is different from that in foregoing Embodiment Mode 76 in that the reflective electrode is formed only in the reflective region and the transparent electrode is not formed is described.

Figure 74:
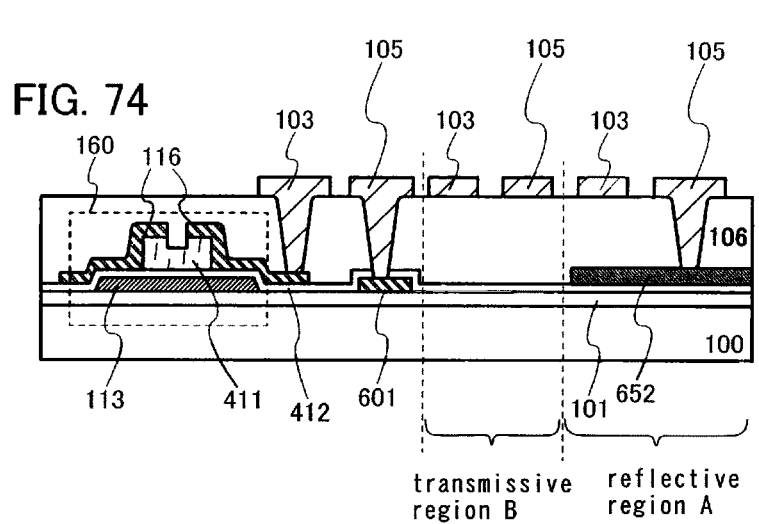
FIG. 74 is a cross-sectional view of a liquid crystal display device of the present invention.

As shown in FIG. 74, the reflective electrode 652 is selectively formed over the gate insulating layer 412 only in the reflective region. The transparent electrode 654 is not formed in the transmissive region.

With such a structure, the conductive layer 601 formed at the same time as the gate electrode 113 can be used as the common wire.

The description of other structures is omitted because it is similar to that of FIG. 73.

In this embodiment mode, tilting of the liquid crystal material can be sufficiently controlled by electrical fields generated by two pairs of electrodes.

Note that the description in Embodiment Modes 1 to 76 can be applied to or combined with this embodiment mode.

Embodiment Mode 78

In this embodiment mode, a structure which is different from that in foregoing Embodiment Mode 77 in that the reflective electrode is formed only in the reflective region and the projection is formed over the reflective electrode is described.

Figure 75:
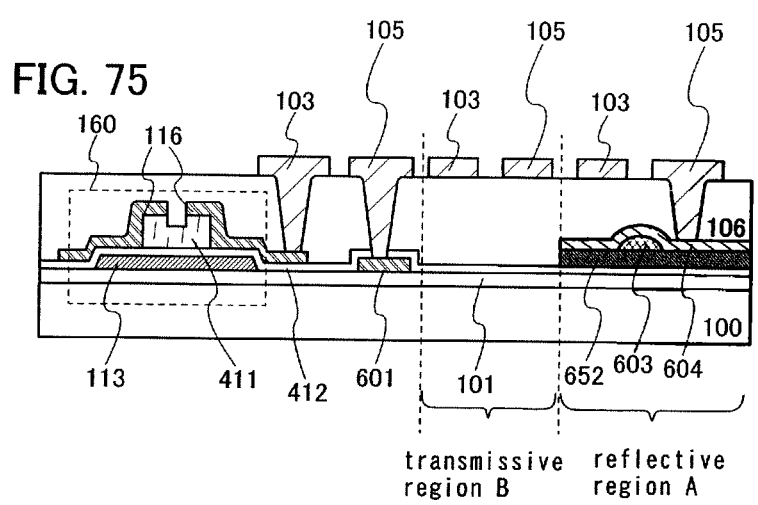
FIG. 75 is a cross-sectional view of a liquid crystal display device of the present invention.

As shown in FIG. 75, the reflective electrode 652 is selectively formed over the gate insulating layer 412 only in the reflective region. The projection 603 is formed over the reflective electrode 652. The conductive layer 604 is formed to cover the projection 603. The conductive layer 604 is connected to the third electrode 105.

With such a structure, the conductive layer 601 formed at the same time as the gate electrode 113 can be used as the common wire.

The description of other structures is omitted because it is similar to that of FIG. 74.

In this embodiment mode, tilting of the liquid crystal material can be sufficiently controlled by electrical fields generated by two pairs of electrodes.

Note that the description in Embodiment Modes 1 to 77 can be applied to or combined with this embodiment mode.

Embodiment Mode 79

In this embodiment mode, a structure which is different from that in foregoing Embodiment Mode 78 in that the reflective electrode 652 is not formed is described.

Figure 76:
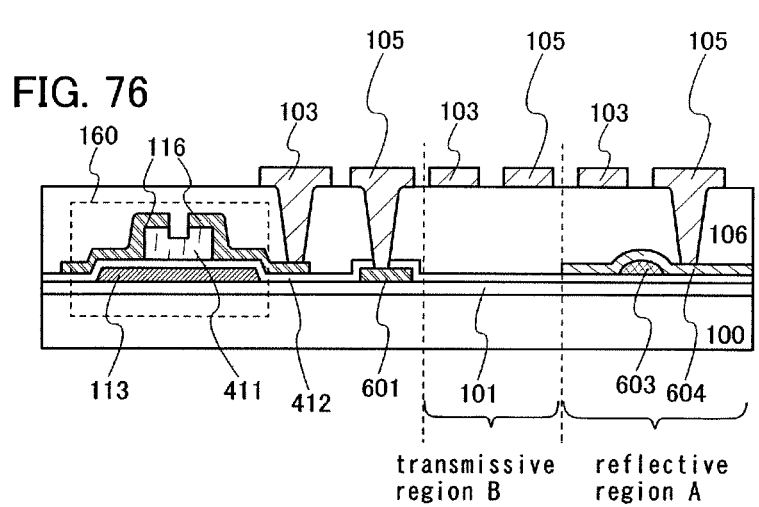
FIG. 76 is a cross-sectional view of a liquid crystal display device of the present invention.

As shown in FIG. 76, the projection 603 is formed over the gate insulating layer 412 in the reflective region. The conductive layer 604 is formed to cover the projection 603. The conductive layer 604 serves as the reflective electrode.

With such a structure, the conductive layer 601 formed at the same time as the gate electrode 113 can be used as the common wire.

The description of other structures is omitted because it is similar to that of FIG. 75.

In this embodiment mode, tilting of the liquid crystal material can be sufficiently controlled by electrical fields generated by two pairs of electrodes.

Note that the description in Embodiment Modes 1 to 78 can be applied to or combined with this embodiment mode.

Embodiment Mode 80

The top views shown in FIGS. 13 and 14 show examples where at least one of the electrode (the first electrode 103) of a liquid crystal element to which an electric potential is transmitted from the source line and the electrode (the third electrode 105) of the liquid crystal element to which an electric potential is transmitted from the common line is comb-shaped. However, the shapes of the first electrode and the third electrode are not limited to those shown in FIGS. 13 and 14. For example, they may be zigzag shaped or wavy shaped. This embodiment mode shows an example of a liquid crystal display device which includes a different electrode shape from those shown in FIGS. 13 and 14 with reference to FIGS. 106 and 107.

Figure 106:
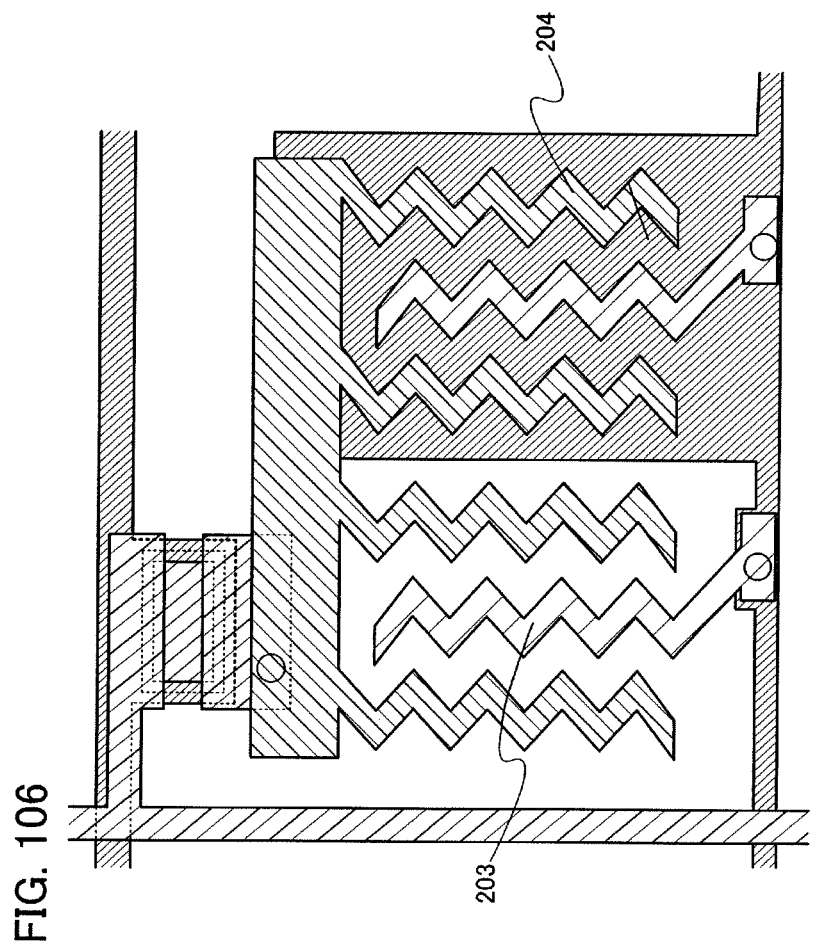
FIG. 106 is a view of a liquid crystal display device of the present invention.

FIG. 106 shows an example of a liquid crystal display device in which both an electrode 204 of a liquid crystal element to which an electric potential is transmitted from the source line and an electrode 203 of the liquid crystal element to which an electric potential is transmitted from the common wire are zigzag shaped. Note that although the shape of the electrode of the liquid crystal element in the liquid crystal display device in FIG. 106 are different from those in the liquid crystal display device shown in FIGS. 13 and 14, other structures are similar thereto.

Figure 107A:
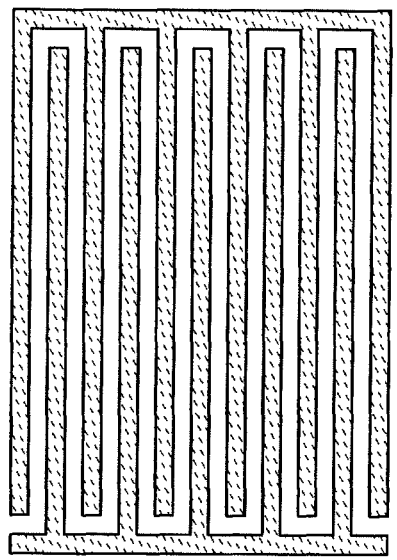
FIGS. 107A to 107D are views of a liquid crystal display device of the present invention.
Figure 107B:
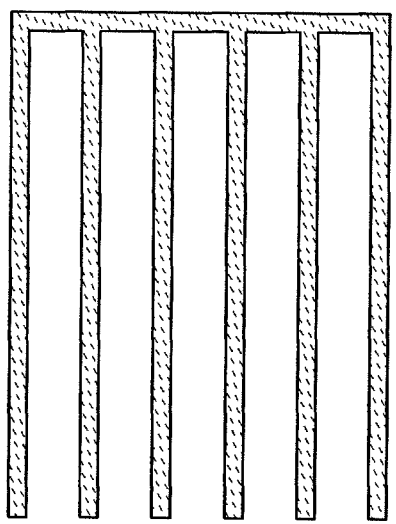
Figure 107C:
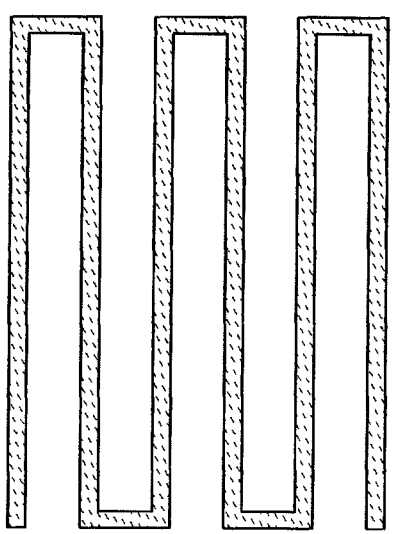
Figure 107D:
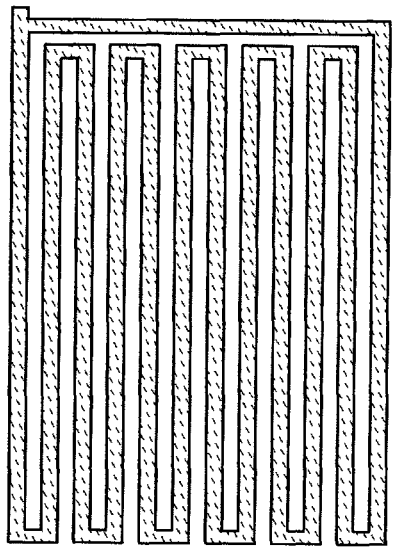

In addition, as shown in FIG. 107A, each of the first electrode 103 and the third electrode 105 may be comb-shaped. Alternatively, as shown in FIG. 107B, either the first electrode 103 or the third electrode 105 may be comb-shaped and one end of a tooth thereof may be connected to one end of a neighboring tooth. Further alternatively, as shown in FIG. 107C, either the first electrode or the third electrode may be comb-shaped and one end of a tooth may be connected to one end of a neighboring tooth and the other end thereof may be connected to the other neighboring tooth. Still further alternatively, the shape shown in 107C may be changed to that in FIG. 107D by connecting one end of the first tooth and one end of the last tooth.

With such an arrangement, a rotation direction or the like of the liquid crystal molecule can be varied by regions in one pixel. That is, a multi-domain liquid crystal display device can be manufactured. The multi-domain liquid crystal display device can reduce the possibility that an image cannot be recognized accurately when seen at a certain angle.

Note that description in Embodiment Modes 1 to 79 can be applied to or combined with this embodiment mode.

Embodiment Mode 81

Figure 108:
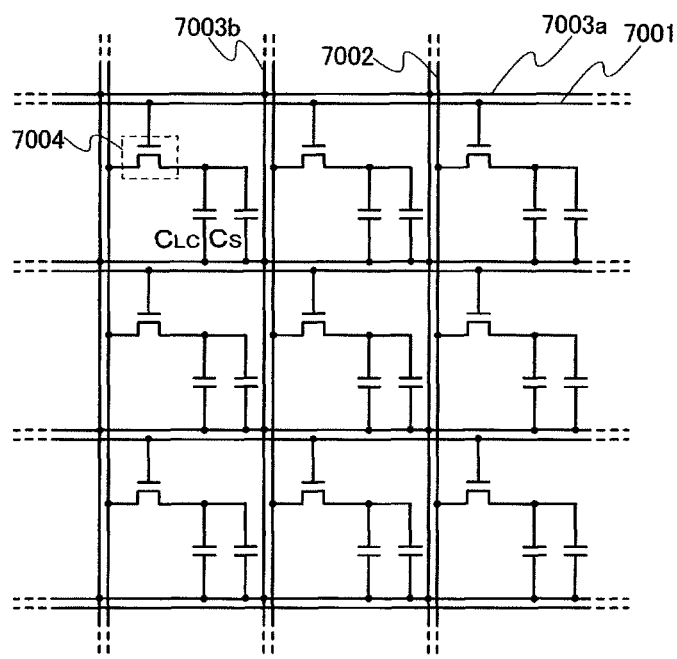
FIG. 108 is a view of a liquid crystal display device of the present invention.

A pixel structure included in a liquid crystal display device of the present invention is described with reference to the top views of FIGS. 13 and 14. A method for leading a wire in the pixel portion may be modified as long as a circuit shown in FIG. 108 is included therein and it does not depart from the purpose and the scope of the present invention. A pixel circuit of a liquid crystal display device of the present invention is described with reference to FIG. 108.

In FIG. 108, a gate line 7001 and a source line 7002 intersect. In addition, a common wire 7003a and a common wire 7003b are led vertically and horizontally. The gate line 7001 is connected to a gate electrode of a transistor 7004. In addition, the source line 7002 is connected to either source or drain electrodes of the transistor 7004. Note that when the liquid crystal display device is an AC driving liquid crystal display device, the source electrode and the drain electrode of the transistor 7004 are switched according to an electric potential transmitted from the source line 7002; therefore, the electrodes are referred to as the source and drain electrodes in this embodiment mode. A liquid crystal element $C_{LC}$ is provided between the source and drain electrode of the transistor 7004 and the common wire 7003a. When the transistor 7004 is in an on state, the electric potential from the source line 7002 is transmitted to the liquid crystal element $C_{LC}$, while when the transistor 7004 is in an off state, the electric potential from the source line 7002 is not transmitted to the liquid crystal element $C_{LC}$. In the case where light needs to pass the liquid crystal layer although the transistor 7004 is in the off state and the electric potential from the source line 7002 is not transmitted to the liquid crystal element $C_{LC}$; a capacitor $C_S$ is desirably provided in parallel with the liquid crystal element $C_{LC}$. When the capacitor holds voltage, light can pass through the liquid crystal layer even if the transistor 7004 is in the off state.

FIG. 109A shows a top view of the display device described in this embodiment mode. FIG. 109B shows a cross-sectional view corresponding to a line K-L in FIG. 109A. The display device shown in FIGS. 109A and 109B includes an external terminal connecting region 852, a sealing region 853, and a scan line driver circuit 854 including a signal line driver circuit.

The display device shown in FIGS. 109A and 109B in this embodiment mode includes a substrate 851, a thin film transistor 827, a thin film transistor 829, a thin film transistor 825, a sealant 834, a counter substrate 830, an alignment film 831, a counter electrode 832, a spacer 833, a polarizing plate 835a, a polarizing plate 835b, a first terminal electrode layer 838a, a second terminal electrode layer 838b, an anisotropic conductive layer 836, and an FPC 837. The display device includes the external terminal connecting region 852, the sealing region 853, the scan line driver circuit 854, a pixel region 856, and a signal line driver circuit 857.

The sealant 834 is provided to surround the pixel region 856 and the scan line driver circuit 854 provided over the substrate 851. The counter substrate 830 is provided over the pixel region 856 and the scan line driver circuit 854. Therefore, the pixel region 856 and the scan line driver circuit 854 are sealed as well as the liquid crystal material by the substrate 851, the sealant 834, and the counter substrate 830.

The pixel region 856 and the scan line driver circuit 854 provided over the substrate 851 include a plurality of thin film transistors. In FIG. 109B, the thin film transistor 825 in the pixel region 856 is shown as an example.

Note that description in Embodiment Modes 1 to 80 can be applied to or combined with this embodiment mode.

Embodiment Mode 82

Figure 110A:
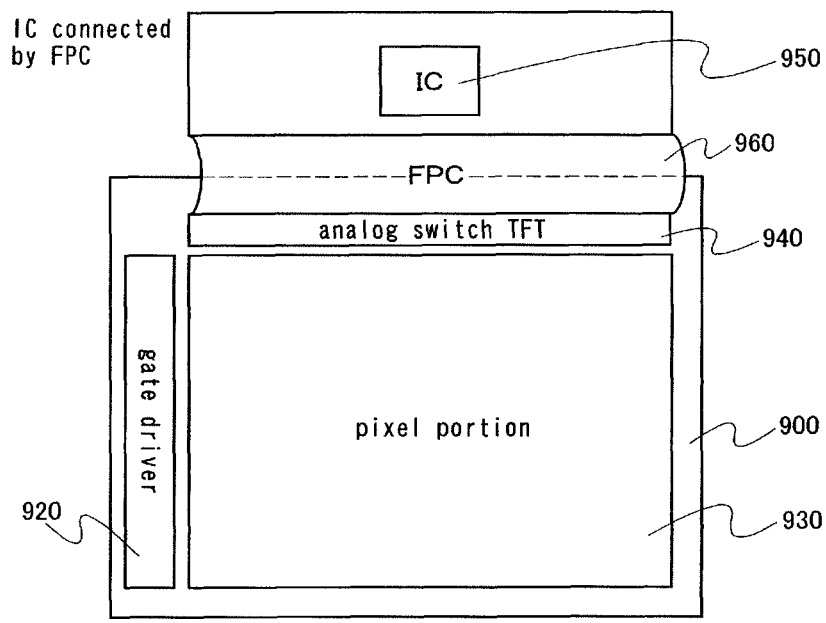
FIGS. 110A and 110B are views of a liquid crystal display device of the present invention.
Figure 110B:
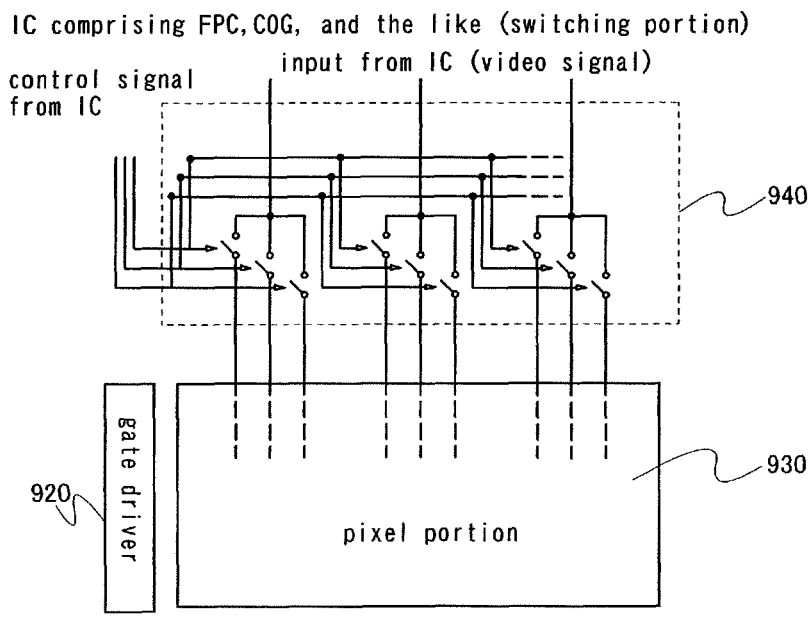

FIGS. 110A and 110B show an example of a module including a liquid crystal display device of the present invention described in Embodiment Modes 1 to 81. A pixel portion 930, a gate driver 920, and a source driver 940 are provided over a substrate 900. A signal is inputted to the gate driver 920 and the source driver 940 from an integrated circuit 950 through a flexible printed circuit 960. An image is displayed by the pixel portion 930 according to the inputted signal.

Embodiment Mode 83

An electronic appliance including a liquid crystal display device of the present invention in its display portion is described with reference to FIGS. 111A to 111H.

Figure 111A:
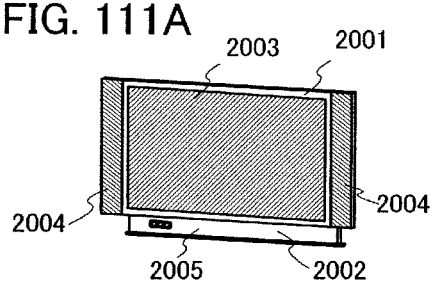
FIGS. 111A to 111H are views of examples of electronic appliances to which the present invention is applied.

FIG. 111A shows a display which has a housing 2001, a support base 2002, a display portion 2003, a speaker portion 2004, a video input terminal 2005, and the like. The display portion 2003 includes a liquid crystal display device of the present invention described in Embodiment Modes 1 to 82.

Figure 111B:
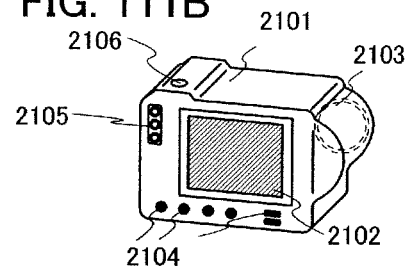

FIG. 111B shows a camera which has a main body 2101, a display portion 2102, an image receiving portion 2103, an operating key 2104, an external connecting port 2105, a shutter 2106, and the like. The display portion 2102 includes a liquid crystal display device of the present invention described in Embodiment Modes 1 to 82.

Figure 111C:
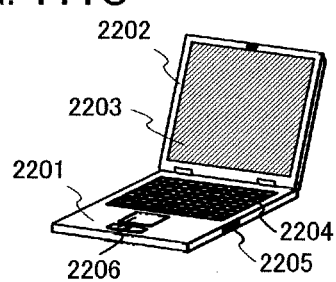

FIG. 111C shows a computer which has a main body 2201, a housing 2202, a display portion 2203, a keyboard 2204, an external connecting port 2205, a pointing mouse 2206, and the like. The display portion 2203 includes a liquid crystal display device of the present invention described in Embodiment Modes 1 to 82.

Figure 111D:
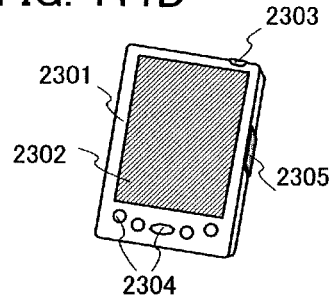

FIG. 111D shows a mobile computer which has a main body 2301, a display portion 2302, a switch 2303, an operation key 2304, an infrared port 2305, and the like. The display portion 2302 includes a liquid crystal display device of the present invention described in Embodiment Modes 1 to 82.

Figure 111E:
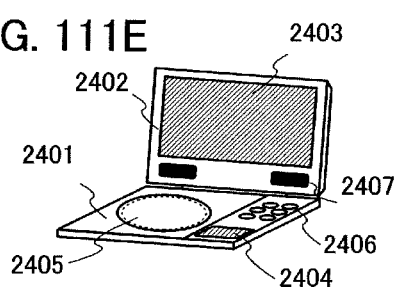

FIG. 111E shows a portable image reproducing device provided with a recording medium (specifically, a DVD reproducing device), which has a main body 2401, a housing 2402, a display portion A 2403, a display portion B 2404, a recording medium (e.g., DVD) reading portion 2405, an operating key 2406, a speaker portion 2407, and the like. The display portion A 2403 includes a liquid crystal display device of the present invention described in Embodiment Modes 1 to 82.

Figure 111F:
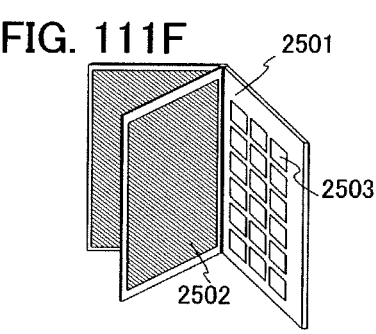

FIG. 111F shows an electronic book which has a main body 2501, a display portions 2502, an operation key 2503, and the like. The display portion 2502 includes a liquid crystal display device of the present invention described in Embodiment Modes 1 to 82.

Figure 111G:
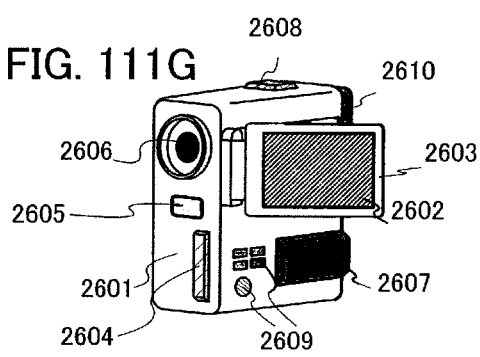

FIG. 111G shows a video camera which has a main body 2601, a display portion 2602, a housing 2603, an external connecting port 2604, a remote control receiving portion 2605, an image receiving portion 2606, a battery 2607, an audio input portion 2608, an operation key 2609, and the like. The display portion 2602 includes a liquid crystal display device of the present invention described in Embodiment Modes 1 to 82.

Figure 111H:
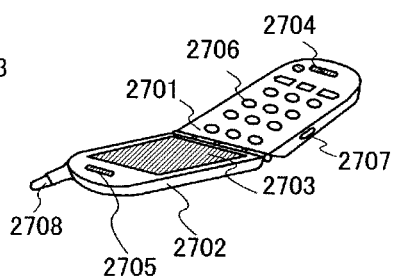

FIG. 111H shows a mobile phone which has a main body 2701, a housing 2702, a display portion 2703, an audio input portion 2704, an audio output portion 2705, an operation key 2706, an external connecting port 2707, an antenna 2708, and the like. The display portion 2703 includes a liquid crystal display device of the present invention described in Embodiment Modes 1 to 82.

As described above, an electronic appliance of the present invention is completed by incorporating a liquid crystal display device of the present invention in a display portion. Such an electronic appliance of the present invention can display an image favorably both indoors and outdoors. In particular, an electronic appliance such as a camera, an image taking device, or the like which is often used both outdoors and indoors makes the most of advantages that a wide viewing angle and less color-shift due to change in an angle at which a display screen is seen can be achieved both indoors and outdoors.

This application is based on Japanese Patent Application serial no. 2005-350147 filed in Japan Patent Office on Dec. 5, 2005, the entire contents of which are hereby incorporated by reference.

What is claimed is:

1. A liquid crystal display device, comprising:
   a substrate;
   a gate electrode and a semiconductor layer over the substrate;
   a source electrode and a drain electrode over the semiconductor layer;
   a first insulating layer over the gate electrode;
   a first common electrode over the first insulating layer;
   a second insulating layer over the first common electrode;
   a second common electrode over the second insulating layer;
   a pixel electrode over the second insulating layer, the pixel electrode being electrically connected to one of the source electrode and the drain electrode; and
   a liquid crystal material over the pixel electrode and the second common electrode,
   wherein a part of the first common electrode overlaps with the second common electrode.

2. The liquid crystal display device according to claim 1, wherein tilting of the liquid crystal material is controlled by an electrical field between the pixel electrode and the first common electrode, and an electrical field between the pixel electrode and the second common electrode.

3. The liquid crystal display device according to claim 1, wherein the semiconductor layer is an amorphous semiconductor layer.

4. The liquid crystal display device according to claim 1,
   wherein a reflective electrode is formed over the first insulating layer, and
   wherein the reflective electrode is electrically connected to the first common electrode.

5. The liquid crystal display device according to claim 1, wherein the pixel electrode is over the second insulating layer.

6. A liquid crystal display device, comprising:
   a substrate;
   a gate electrode and a semiconductor layer over the substrate;
   a source electrode and a drain electrode over the semiconductor layer;
   a first insulating layer over the gate electrode;
   a first common electrode over the first insulating layer;
   a second insulating layer over the first common electrode;
   a second common electrode over the second insulating layer;
   a pixel electrode over the second insulating layer, the pixel electrode being electrically connected to one of the source electrode and the drain electrode; and
   a liquid crystal material over the pixel electrode and the second common electrode,
   wherein a part of the first common electrode overlaps with the second common electrode, and
   wherein the first common electrode is a transmissive electrode.

7. The liquid crystal display device according to claim 6, wherein tilting of the liquid crystal material is controlled by an electrical field between the pixel electrode and the first common electrode, and an electrical field between the pixel electrode and the second common electrode.

8. The liquid crystal display device according to claim 6, wherein the semiconductor layer is an amorphous semiconductor layer.

9. The liquid crystal display device according to claim 6, wherein a reflective electrode is formed over the first insulating layer, and
wherein the reflective electrode is electrically connected to the first common electrode.

10. The liquid crystal display device according to claim 6, wherein the pixel electrode is over the second insulating layer.

11. A liquid crystal display device, comprising:
a substrate;
a gate electrode and a semiconductor layer over the substrate;
a source electrode and a drain electrode over the semiconductor layer;
a first insulating layer over the gate electrode;
a first common electrode over the first insulating layer;
a second insulating layer over the first common electrode;
a second common electrode over the second insulating layer;
a pixel electrode over the second insulating layer, the pixel electrode being electrically connected to one of the source electrode and the drain electrode; and
a liquid crystal material over the pixel electrode and the second common electrode,
wherein a part of the first common electrode overlaps with the second common electrode, and
wherein the second common electrode is comb-shaped.

12. The liquid crystal display device according to claim 11, wherein tilting of the liquid crystal material is controlled by an electrical field between the pixel electrode and the first common electrode, and an electrical field between the pixel electrode and the second common electrode.

13. The liquid crystal display device according to claim 11, wherein the semiconductor layer is an amorphous semiconductor layer.

14. The liquid crystal display device according to claim 11, wherein a reflective electrode is formed over the first insulating layer, and
wherein the reflective electrode is electrically connected to the first common electrode.

15. The liquid crystal display device according to claim 11, wherein the pixel electrode is over the second insulating layer.

16. A liquid crystal display device, comprising:
a substrate;
a gate electrode and a semiconductor layer over the substrate;
a source electrode and a drain electrode over the semiconductor layer;
a first insulating layer over the gate electrode;
a first common electrode over the first insulating layer;
a second insulating layer over the first common electrode;
a second common electrode over the second insulating layer;
a pixel electrode over the second insulating layer, the pixel electrode being electrically connected to one of the source electrode and the drain electrode; and
a liquid crystal material over the pixel electrode and the second common electrode,
wherein a part of the first common electrode overlaps with the second common electrode, and
wherein the first common electrode is a transmissive electrode, and
wherein the second common electrode is comb-shaped.

17. The liquid crystal display device according to claim 16, wherein tilting of the liquid crystal material is controlled by an electrical field between the pixel electrode and the first common electrode, and an electrical field between the pixel electrode and the second common electrode.

18. The liquid crystal display device according to claim 16, wherein the semiconductor layer is an amorphous semiconductor layer.

19. The liquid crystal display device according to claim 16, wherein a reflective electrode is formed over the first insulating layer, and
wherein the reflective electrode is electrically connected to the first common electrode.

20. The liquid crystal display device according to claim 16, wherein the pixel electrode is over the second insulating layer.

21. A liquid crystal display device comprising:
a substrate;
a gate electrode and a semiconductor layer over the substrate;
a first insulating layer over the gate electrode;
a source electrode and a drain electrode over and electrically connected to the semiconductor layer, wherein each of the source electrode and the drain electrode comprises a first metal;
a conductive layer comprising a second metal over and in contact with the first insulating layer, wherein the second metal is the same as the first metal;
a first transparent conductive layer under and in contact with the conductive layer, wherein the first transparent conductive layer is over and in contact with the first insulating layer;
a second insulating layer over the first transparent conductive layer;
a second transparent conductive layer over the second insulating layer, the second transparent conductive layer having a slit; and
a liquid crystal layer over the second transparent conductive layer, wherein the first transparent conductive layer and the second transparent conductive layer overlap with each other.

22. The liquid crystal display device according to claim 21, wherein the first transparent conductive layer is a first common electrode, and
wherein the second transparent conductive layer is a pixel electrode.

23. The liquid crystal display device according to claim 21, wherein the second transparent conductive layer is electrically connected to one of the source electrode and the drain electrode.

24. The liquid crystal display device according to claim 21, further comprising:
a third transparent conductive layer having a slit over and in contact with a surface,
wherein the second transparent conductive layer is over and in contact with the surface.

25. The liquid crystal display device according to claim 21, wherein the gate electrode is provided over the semiconductor layer.

26. The liquid crystal display device according to claim 21, wherein the gate electrode is provided under the semiconductor layer.

27. The liquid crystal display device according to claim 21, wherein the semiconductor layer comprises amorphous silicon.

28. The liquid crystal display device according to claim 21, wherein the second transparent conductive layer is a second common electrode.

29. The liquid crystal display device according to claim 21, wherein the second insulating layer is provided over the semiconductor layer.

30. The liquid crystal display device according to claim 21, wherein a part of the first transparent conductive layer and the second transparent conductive layer overlap with each other.

31. The liquid crystal display device according to claim 21, wherein the slit has a comb-shape.

32. The liquid crystal display device according to claim 21, wherein the first metal and the second metal are molybdenum.

33. A mobile computer comprising:
a display portion comprising the liquid crystal display device according to claim 21.

34. An electronic book comprising:
a display portion comprising the liquid crystal display device according to claim 21.

35. A liquid crystal display device comprising:
a gate electrode;
a first insulating layer over the gate electrode;
a conductive layer comprising a metal over and in contact with the first insulating layer;
a first transparent conductive layer under and in contact with the conductive layer, wherein the first transparent conductive layer is over and in contact with the first insulating layer;
a second insulating layer over the first transparent conductive layer;
a second transparent conductive layer over the second insulating layer, the second transparent conductive layer having a slit; and
a liquid crystal layer over the second transparent conductive layer, wherein the first transparent conductive layer and the second transparent conductive layer overlap with each other.

36. The liquid crystal display device according to claim 35, further comprising:
a source electrode and a drain electrode, wherein each of the source electrode and the drain electrode comprises a first metal,
wherein the conductive layer comprises a second metal, and
wherein the second metal is the same as the first metal.

37. The liquid crystal display device according to claim 35,
wherein the first transparent conductive layer is a first common electrode, and
wherein the second transparent conductive layer is a pixel electrode.

38. The liquid crystal display device according to claim 36, wherein the second transparent conductive layer is electrically connected to one of the source electrode and the drain electrode.

39. The liquid crystal display device according to claim 35, further comprising:
a third transparent conductive layer having a slit over and in contact with a surface,
wherein the second transparent conductive layer is over and in contact with the surface.

40. The liquid crystal display device according to claim 35, wherein a part of the first transparent conductive layer and the second transparent conductive layer overlap with each other.

41. The liquid crystal display device according to claim 35, wherein the slit has a comb-shape.

42. A mobile computer comprising:
a display portion comprising the liquid crystal display device according to claim 35.

43. An electronic book comprising:
a display portion comprising the liquid crystal display device according to claim 35.

* * * * *

UNITED STATES PATENT AND TRADEMARK OFFICE
CERTIFICATE OF CORRECTION

| | |
|---|---|
| PATENT NO. | : 8,619,227 B2 |
| APPLICATION NO. | : 13/442932 |
| DATED | : December 31, 2013 |
| INVENTOR(S) | : Hajime Kimura and Hideki Uochi |

It is certified that error appears in the above-identified patent and that said Letters Patent is hereby corrected as shown below:

In the Specification

Column 14, line 31, replace "93036" with --9303b--;

Column 56, line 64, before "FIG." delete "to";

In the Claims

Column 66, line 14, in claim 1 after "drain electrode over" insert --and electrically connected to--;

Column 66, lines 21-22, in claim 1 delete "over the second insulating layer, the pixel electrode being";

Column 66, line 47, in claim 6 after "drain electrode over" insert --and electrically connected to--;

Column 66, line 50, in claim 6 replace "common" with --transparent--;

Column 66, line 51, in claim 6 replace "common" with --transparent--;

Column 66, line 52, in claim 6 replace "common" with --transparent--;

Column 66, line 54, in claim 6 delete "over the second insulating layer, the pixel electrode being";

Column 66, line 58, in claim 6 replace "common" with --transparent--;

Column 66, line 59, in claim 6 replace "common" with --transparent--;

Column 66, line 60, in claim 6 replace "common" with --transparent-- and after "elecrode" delete ", and";

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,619,227 B2

Column 66, lines 61-62, in claim 6 delete "wherein the first common electrode is a transmissive electrode";

Column 66, line 66, in claim 7 replace "common" with --transparent--;

Column 66, line 67, in claim 7 replace "common" with --transparent--;

Column 67, line 8, in claim 9 replace "common" with --transparent--;

Column 67, line 15, in claim 11 before "the semiconductor" insert --and electrically connected to--;

Column 67, lines 22-23, in claim 11 delete "over the second insulating layer, the pixel electrode being";

Column 67, line 49, in claim 16 after "over" insert --and electrically connected to--;

Column 67, line 52, in claim 16 replace "common" with --transparent--;

Column 67, line 53, in claim 16 replace "common" with --transparent--;

Column 67, line 54, in claim 16 replace "common" with --transparent--;

Column 67, line 60, in claim 16 replace "common" with --transparent--;

Column 67, line 61, in claim 16 replace "common" with --transparent--;

Column 67, line 62, in claim 16 replace "common" with --transparent--;

Column 67, lines 63-64, in claim 16 delete "wherein the first common elecrode is a transmissive electrode, and";

Column 67, line 65, in claim 16 replace "common" with --transparent--;

Column 68, line 2, in claim 17 replace "common" with --transparent--;

Column 68, line 3, in claim 17 replace "common" with --transparent--;

Column 68, line 12, in claim 19 replace "common" with --transparent--.